(12) United States Patent
Koseki et al.

(10) Patent No.: US 6,840,235 B2
(45) Date of Patent: Jan. 11, 2005

(54) INTERNAL EXHAUST GAS RECIRCULATION AMOUNT ESTIMATION SYSTEM OF INTERNAL COMBUSTION ENGINES

(75) Inventors: Takahisa Koseki, Yokohama (JP); Youichi Oshimi, Tokyo (JP); Hatsuo Nagaishi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/623,295

(22) Filed: Jul. 21, 2003

(65) Prior Publication Data

US 2004/0139949 A1 Jul. 22, 2004

(30) Foreign Application Priority Data

Sep. 19, 2002 (JP) .................................. 2002-272670
Jan. 27, 2003 (JP) .................................. 2003-016828

(51) Int. Cl.⁷ .......................... F02M 25/07; F01L 1/34
(52) U.S. Cl. ........................ 123/568.14; 123/90.15; 73/117.3
(58) Field of Search ..................... 123/58.8, 90.15, 123/90.16, 90.17, 90.18, 321, 322, 347, 348, 568.14, 676, 435, 436; 73/117.3, 118.1, 118.2

(56) References Cited

U.S. PATENT DOCUMENTS

| 5,515,832 | A | * | 5/1996 | Bidner et al. | 123/568.14 |
| 5,960,755 | A | * | 10/1999 | Diggs et al. | 123/568.14 |
| 6,321,731 | B1 | * | 11/2001 | Russ et al. | 123/568.14 |
| 6,386,177 | B2 | * | 5/2002 | Urushihara et al. | 123/568.14 |
| 6,412,458 | B2 | * | 7/2002 | Kawasaki et al. | 123/568.14 |
| 6,612,294 | B2 | * | 9/2003 | Hiraya et al. | 123/568.14 |
| 6,688,287 | B2 | * | 2/2004 | Machida | 123/568.14 |
| 2001/0042529 | A1 | * | 11/2001 | Kawasaki et al. | 123/90.15 |

FOREIGN PATENT DOCUMENTS

| EP | 001211402 A2 | * | 6/2002 | 123/568.14 |
| JP | 2001-221105 A | * | 8/2001 | 123/568.14 |

* cited by examiner

*Primary Examiner*—Willis R. Wolfe, Jr.
(74) *Attorney, Agent, or Firm*—Foley & Lardner LLP

(57) ABSTRACT

An internal exhaust gas recirculation amount estimation system calculates an in-cylinder temperature at an exhaust valve closure timing, an in-cylinder pressure at the exhaust valve closure timing, and a gas constant corresponding to a change in a composition of exhaust gas, based on an air-fuel mixture ratio. An exhaust valve closure timing in-cylinder residual gas amount is calculated based on at least the in-cylinder temperature, the in-cylinder pressure, and the gas constant. Also calculated is a valve overlap period blow-back gas amount, which is defined as a quantity of gas flow from one of intake and exhaust ports via a combustion chamber to the other port during a valve overlap period. An internal exhaust gas recirculation amount is calculated based on the exhaust valve closure timing in-cylinder residual gas amount and the valve overlap period blow-back gas amount.

32 Claims, 24 Drawing Sheets

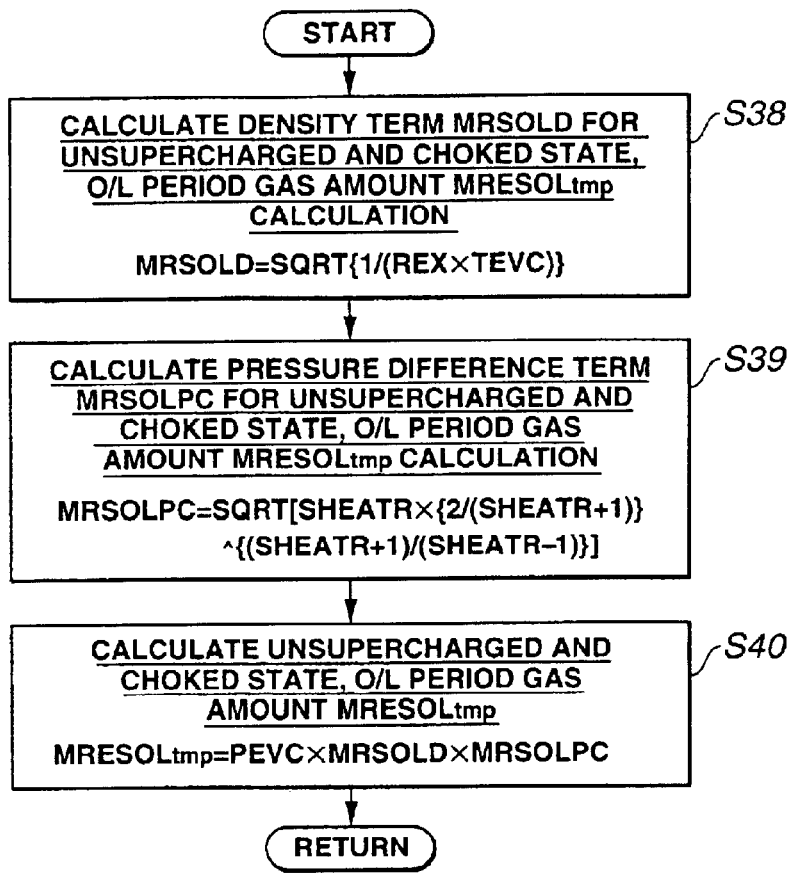

FIG.14

START

S38 CALCULATE DENSITY TERM MRSOLD FOR UNSUPERCHARGED AND CHOKED STATE, O/L PERIOD GAS AMOUNT MRESOLtmp CALCULATION

MRSOLD=SQRT{1/(REX×TEVC)}

S39 CALCULATE PRESSURE DIFFERENCE TERM MRSOLPC FOR UNSUPERCHARGED AND CHOKED STATE, O/L PERIOD GAS AMOUNT MRESOLtmp CALCULATION

MRSOLPC=SQRT[SHEATR×{2/(SHEATR+1)}
^{(SHEATR+1)/(SHEATR−1)}]

S40 CALCULATE UNSUPERCHARGED AND CHOKED STATE, O/L PERIOD GAS AMOUNT MRESOLtmp MRESOLtmp=PEVC×MRSOLD×MRSOLPC

RETURN

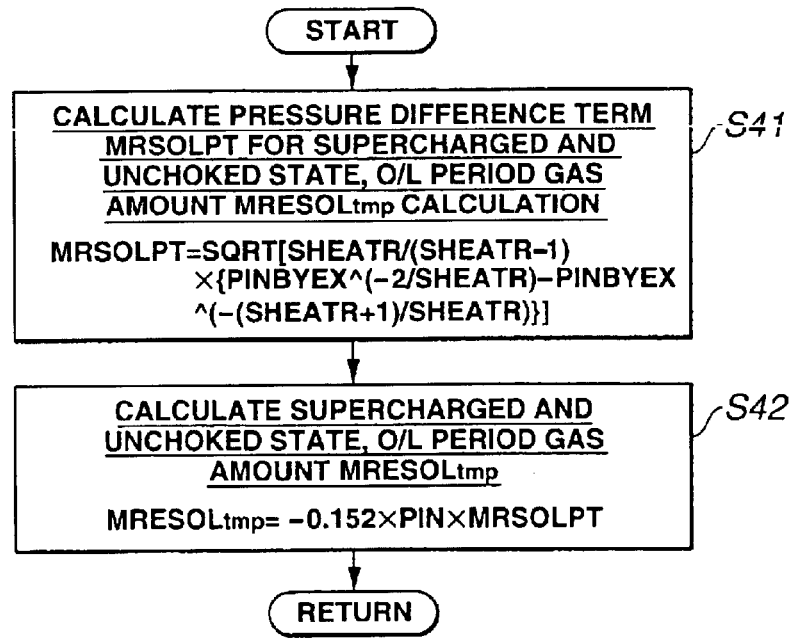

FIG.15

START

S41 CALCULATE PRESSURE DIFFERENCE TERM MRSOLPT FOR SUPERCHARGED AND UNCHOKED STATE, O/L PERIOD GAS AMOUNT MRESOLtmp CALCULATION MRSOLPT=SQRT[SHEATR/(SHEATR−1)
×{PINBYEX^(−2/SHEATR)−PINBYEX
^(−(SHEATR+1)/SHEATR)}]

S42 CALCULATE SUPERCHARGED AND UNCHOKED STATE, O/L PERIOD GAS AMOUNT MRESOLtmp MRESOLtmp= −0.152×PIN×MRSOLPT

RETURN

US 6,840,235 B2

INTERNAL EXHAUST GAS RECIRCULATION AMOUNT ESTIMATION SYSTEM OF INTERNAL COMBUSTION ENGINES

TECHNICAL FIELD

The present invention relates to an internal exhaust gas recirculation (internal EGR) amount estimation system for internal combustion engines, and specifically to the improvement of estimation of internal EGR relating to a valve overlap period during which both of intake and exhaust valves are open together.

BACKGROUND ART

As is generally known, in order to attain both a reduction in the amount of nitrogen oxides (NOx) produced by an internal combustion engine, based on an increase in inert gases contributing to a reduced combustion temperature, and a reduction in pumping loss contributing to a reduced fuel consumption, a spark-ignition internal combustion engine often uses a variable valve operating mechanism so as to actively increase a valve overlap that the open periods of intake and exhaust valves are overlapped, and consequently to increase the amount of internal EGR. In such a case, it is more desirable to simultaneously optimize or compensate for an ignition timing, a fuel-injection amount, a valve open timing and a valve closure timing of at least one of intake and exhaust valves, and the like, responsively to a change in internal EGR. One such internal EGR estimation method has been disclosed in Japanese Patent Provisional Publication No. 2001-221105 (hereinafter is referred to as "JP2001-221105"). According to the internal EGR estimation method of JP2001-221105, a basic value of internal EGR, corresponding to the amount of burned gas remaining in the engine cylinder under a non-overlapped condition of the open periods of intake and exhaust valves, is calculated based on engine operating conditions such as engine load, engine speed, an air/fuel mixture ratio (A/F), an EGR ratio of the amount of exhaust gas recirculated to the total gas amount per cylinder, and an intake-manifold pressure. During the valve overlap, the estimate of internal EGR is increasingly compensated for by adding a valve-overlap correction value, which is based on a valve overlap period, a phase of a central crank angle between the beginning-of-valve-overlap crank angle and the end-of-valve-overlap crank angle, and intake-manifold pressure, to the basic value of internal EGR calculated. However, in particular in a transient engine operating state that at least one of the engine load, engine speed, air/fuel mixture ratio, and intake-manifold pressure remarkably varies, it is difficult to univocally exactly estimate the amount of internal EGR from the valve overlap period. Thus, it is desirable to more precisely estimate the amount of internal EGR depending on variations in engine operating conditions.

Additionally, under particular engine operating conditions, such as just after starting with a cold engine, just after deceleration fuel-cutoff operating mode, or at high-speed high-load operation during which engine coolant temperature is very high, a valve clearance itself tends to remarkably change owing to thermal expansion of the engine valve and shaft in the valve operating mechanism, arising from temperature changes in the valve and the cylinder head and cylinder block. This causes a deviation of the actual valve overlap period from a desired valve overlap, in other words, a deviation of the actual internal EGR amount from a desired internal EGR amount computed based on the engine operating conditions. Such a deviation lowers the control accuracy of the electronic ignition timing control system and/or the electronic fuel injection control system, and thereby results in the deteriorated vehicle drivability, increased fuel consumption, and lowered exhaust-emission performance.

SUMMARY OF THE INVENTION

Accordingly, it is an object of the invention to provide an internal EGR amount estimation system for an internal combustion engine, enabling very precise estimation of the amount of internal EGR varying owing to variations in engine operating conditions.

It is another object of the invention to provide an internal EGR amount estimation system for an internal combustion engine, capable of more precisely estimating the amount of internal EGR, taking into account of a change in valve clearance, occurring owing to thermal expansion of an engine valve and a shaft in a valve operating mechanism and/or owing to moving-parts wear or motion-transmitting valve-train component parts wear such as cam and shim wear.

In order to accomplish the aforementioned and other objects of the present invention, an internal exhaust gas recirculation amount estimation system of an internal combustion engine comprises an exhaust valve closure timing in-cylinder temperature calculation section that calculates an in-cylinder temperature at an exhaust valve closure timing, an exhaust valve closure timing in-cylinder pressure calculation section that calculates an in-cylinder pressure at the exhaust valve closure timing, a gas constant calculation section that calculates a gas constant corresponding to a change in a composition of exhaust gas, based on an air-fuel mixture ratio, an exhaust valve closure timing in-cylinder residual gas amount calculation section that calculates an in-cylinder residual gas amount at the exhaust valve closure timing, based on at least the in-cylinder temperature, the in-cylinder pressure, and the gas constant, an valve overlap period blow-back gas amount calculation section that calculates a valve overlap period blow-back gas amount defined as a quantity of gas flow from one of intake and exhaust ports via a combustion chamber to the other port during a valve overlap period during which both of intake and exhaust valves are open together, the gas flow being created by a pressure difference between the intake and exhaust ports, and an internal EGR amount calculation section that calculates an internal exhaust gas recirculation amount based on the exhaust valve closure timing in-cylinder residual gas amount and the valve overlap period blow-back gas amount.

According to another aspect of the invention, an internal exhaust gas recirculation amount estimation system of an internal combustion engine comprises exhaust valve closure timing in-cylinder temperature calculation means for calculating an in-cylinder temperature at an exhaust valve closure timing, exhaust valve closure timing in-cylinder pressure calculation means for calculating an in-cylinder pressure at the exhaust valve closure timing, gas constant calculation means for calculating a gas constant corresponding to a change in a composition of exhaust gas, based on an air-fuel mixture ratio, exhaust valve closure timing in-cylinder residual gas amount calculation means for calculating an in-cylinder residual gas amount at the exhaust valve closure timing, based on at least the in-cylinder temperature, the in-cylinder pressure, and the gas constant, valve overlap period blow-back gas amount calculation means for calculating a valve overlap period blow-back gas amount defined as a quantity of gas flow from one of intake and exhaust ports via a combustion chamber to the other port during a valve overlap period during which both of intake and exhaust valves are open together, the gas flow being created by a pressure difference between the intake and exhaust ports, and internal EGR amount calculation means for calculating an internal exhaust gas recirculation amount based on the exhaust valve closure timing in-cylinder residual gas amount and the valve overlap period blow-back gas amount.

According to a further aspect of the invention, a method of estimating an internal exhaust gas recirculation amount of an internal combustion engine enabling the internal exhaust gas recirculation amount to be varied by changing a valve overlap, the method comprises calculating an in-cylinder temperature at an exhaust valve closure timing based on an exhaust temperature, calculating an in-cylinder pressure at the exhaust valve closure timing based on an exhaust pressure, calculating a gas constant corresponding to a change in a composition of exhaust gas, based on an air-fuel mixture ratio, calculating an in-cylinder residual gas amount at the exhaust valve closure timing, based on at least the in-cylinder temperature, the in-cylinder pressure, and the gas constant, detecting an engine speed, calculating a valve overlap period integrated effective area for an opening area of the intake valve and an opening area of the exhaust valve during the valve overlap period, determining the presence or absence of a supercharging phenomenon regarding the gas flow between the intake and exhaust ports via the combustion chamber during the valve overlap period, the gas flow being created by the pressure difference between the intake and exhaust ports, and the presence or absence of a choking phenomenon regarding the gas flow between the intake and exhaust ports via the combustion chamber during the valve overlap period, calculating a valve overlap period blow-back gas amount, which is defined as a quantity of gas flow from one of intake and exhaust ports via a combustion chamber to the other port during a valve overlap period during which both of intake and exhaust valves are open together, and is based on the engine speed, the valve overlap period integrated effective area, and the supercharging-and-choking phenomena decision result regarding the presence or absence of the supercharging phenomenon, and the presence or absence of the choking phenomenon, and calculating the internal exhaust gas recirculation amount by adding the valve overlap period blow-back gas amount to the exhaust valve closure timing in-cylinder residual gas amount.

The other objects and features of this invention will become understood from the following description with reference to the accompanying drawings.

BRIEF DESCRIPTION OF THE DRAWINGS

FIG. 14 is a flow chart showing a temporary valve overlap period blow-back gas amount $MRESOL_{tmp}$ (unit: kg) calculation routine executed in an unsupercharged and choked state.

FIG. 15 is a flow chart showing a temporary valve overlap period blow-back gas amount $MRESOL_{tmp}$ (unit: kg) calculation routine executed in an supercharged and unchoked state.

DESCRIPTION OF THE PREFERRED EMBODIMENTS

Figure 1:
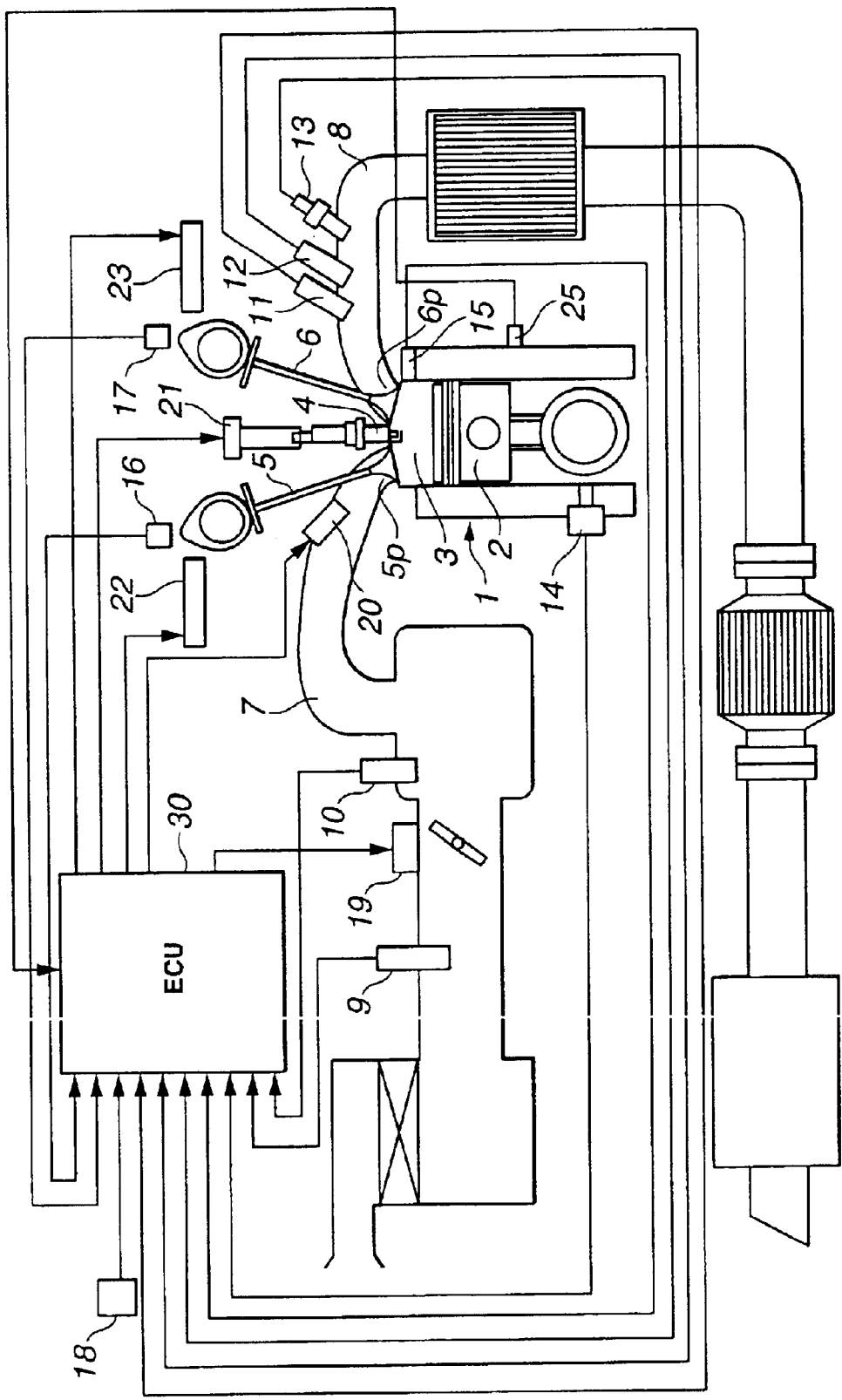
FIG. 1 is a system diagram illustrating one embodiment of an internal EGR estimation system.

Referring now to the drawings, particularly to FIG. 1, the internal exhaust gas recirculation (EGR) amount estimation system is exemplified in a double-overhead-camshaft internal combustion engine 1 employing a variable valve timing device enabling a valve characteristic, such as an engine valve open timing and an engine valve closure timing, to be varied. A combustion chamber 3 is defined between the inner wall of the cylinder head and a reciprocating piston 2, fitted to each engine cylinder. An intake valve 5, which opens and closes an intake port 5p of combustion chamber 3, and an exhaust valve 6, which opens and closes an exhaust port 6p of combustion chamber 3, are provided in such a manner as to surround a spark plug 4 mounted on the cylinder head. An exhaust valve characteristic (containing an exhaust valve open timing EVO and an exhaust valve closure timing EVC) is variably controlled by changing a phase of an exhaust-valve cam relative to its camshaft by means of an electromagnetic exhaust-valve solenoid (a variable exhaust-valve operating solenoid) 23 included in a variable exhaust-valve timing mechanism. On the other hand, an intake valve characteristic (containing an intake valve open timing IVO and an intake valve closure timing IVC) is variably controlled by changing a phase of an intake-valve cam relative to its camshaft by means of an electromagnetic intake-valve solenoid (a variable intake-valve operating solenoid) 22 included in a variable intake-valve timing mechanism. An electronically-controlled throttle valve 19 is provided in an intake-air passage 7, so as to adjust a quantity of intake air (fresh air) flowing through intake-air passage 7 toward combustion chamber 3. Fuel spray is delivered via fuel injectors 20 to the individual cylinders. As shown in FIG. 1, fuel injector 20 is usually installed on the intake-air passage for each individual engine cylinder. On in-cylinder direct injection engines, the fuel injection nozzle of each injector is directly exposed to the individual combustion chamber for direct fuel injection. When spark plug firing is initiated, the air-fuel mixture in combustion chamber 3 is ignited and combusted. Then, the burned gas is exhausted into an exhaust passage 8. The operations of electronically-controlled throttle valve 19, injectors 20, spark plugs 4 each containing a power-transistor built-in ignition coil 21, variable intake-valve operating solenoid 22 and variable exhaust-valve operating solenoid 23 are controlled by means of an electronic engine control unit (ECU) 30. As seen from the system diagram shown in FIG. 1, ECU 30 generally comprises a microcomputer. ECU 30 includes an input/output interface (I/O), memories (RAM, ROM), and a microprocessor or a central processing unit (CPU). The input/output interface (I/O) of ECU 30 receives input information from various engine/vehicle sensors, namely a crank angle sensor (or a crankshaft position sensor) 14, an intake-valve cam angle sensor 16, an exhaust-valve cam angle sensor 17, an airflow meter 9, an intake pressure sensor 10, an exhaust pressure sensor 11, an exhaust gas temperature sensor 12, an oxygen sensor (O₂ sensor) 13, an engine temperature sensor 15, an accelerator opening sensor (or an accelerator position sensor) 18, and a knock sensor 25. Crank angle sensor 14 is provided to generate a crank angle signal in synchronism with rotation of the engine, and to inform the ECU of the relative position of the engine crankshaft, as well as the engine speed. Intake-valve cam angle sensor 16 is provided to detect a cam angle of the camshaft of intake valve 5 and thus to detect the operating condition of variable intake-valve operating solenoid 22, whereas exhaust-valve cam angle sensor 17 is provided to detect a cam angle of the camshaft of exhaust valve 6 and thus to detect the operating condition of variable exhaust-valve operating solenoid 23. Airflow meter 9 is installed to measure the quantity of intake air (fresh air) flowing through intake-air passage 7 into the engine cylinder. Intake pressure sensor 10 is located downstream of electronically-controlled throttle valve 19 to detect an intake pressure PIN. Exhaust pressure sensor 11 is usually threaded into an exhaust pipe defining therein an exhaust passage 8 to detect an exhaust pressure, which is used to estimate an in-cylinder pressure PEVC at exhaust valve closure timing EVC. Exhaust temperature sensor 12 is usually threaded into the exhaust pipe defining exhaust passage 8 to detect an exhaust temperature, which is used to estimate an in-cylinder temperature TEVC at exhaust valve closure timing EVC. Oxygen sensor 13 is usually screwed into the exhaust pipe to monitor or detect the percentage of oxygen contained within engine exhaust gases at all times when the engine is running. Engine temperature sensor 15 is located on the engine and usually screwed into one of the top coolant passages to detect an engine coolant temperature Tw (an actual engine operating temperature of engine 1). Accelerator opening sensor 18 is generally positioned near the accelerator pedal to inform the ECU of an accelerator opening. Knock sensor 25 is attached to the engine to supply the ECU with a knock sensor signal corresponding to the engine knock frequency. Note that, in the system of the shown embodiment, knock sensor 25 also serves to detect the frequency of oscillatory seating motion of each of intake valve 5 and exhaust valve 6 that creates metallic sound. Within ECU 30, the central processing unit (CPU) allows the access by the I/O interface of input informational data signals from the previously-discussed engine/vehicle sensors 9–18 and 25. The CPU of ECU 30 is responsible for carrying the control program stored in memories and is capable of performing necessary arithmetic and logic operations containing an electronic engine control achieved through electronically-controlled throttle valve 19 and injectors 20 involved in an electronic fuel injection system, spark plugs 4 involved in an electronic ignition system, and variable valve operating solenoids 22 and 23 involved in the electronic variable valve timing control system. Computational results (arithmetic calculation results), that is, calculated output signals are relayed through the output interface circuitry of the ECU to output stages, namely a throttle actuator of electronically-controlled throttle valve 19, fuel injectors 20, spark plugs 4, and variable valve operating solenoids 22 and 23.

The internal EGR amount estimation procedures executed by the system of the embodiment are hereinafter described in detail in reference to the block diagrams shown in FIGS. 2–7, the flow charts shown in FIGS. 8–16, and the lookup tables shown in FIGS. 17–22.

First of all, a way to calculate internal EGR ratio MRESFR is hereunder explained by reference to the block diagram of FIG. 2 and the internal EGR ratio MRESFR (unit: %) calculation routine of FIG. 8.

Figure 2:
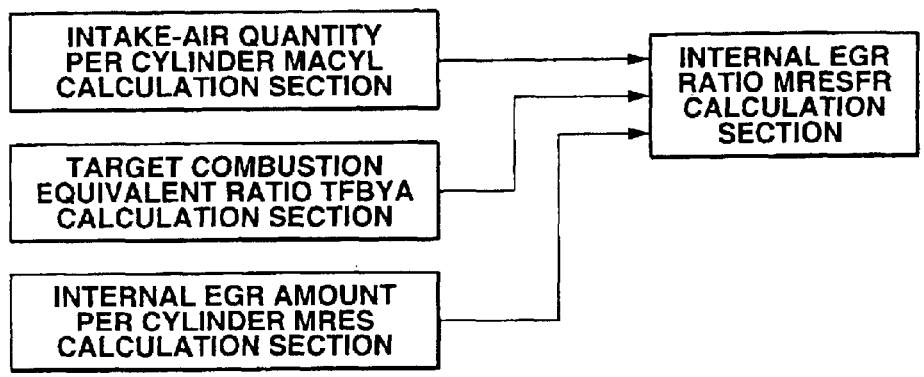
FIG. 2 is a block diagram relating to an internal EGR ratio MRESFR calculation section.

As seen from the block diagram of FIG. 2, an intake-air quantity per cylinder calculation section calculates an intake-air quantity per cylinder (a fresh-air quantity per cylinder) MACYL, a target combustion equivalent ratio calculation section calculates a target combustion equivalent ratio TFBYA, an internal EGR amount calculation section calculates an internal EGR amount per cylinder MRES (unit: kg), and then the internal EGR ratio calculation section calculates an internal EGR ratio MRESFR (unit: %) based on the calculated values MACYL, TFBYA, and MRES. In more detail, as shown in the flow chart of FIG. 8, at step S1, intake-air quantity per cylinder MACYL is calculated or computed based on an intake-air quantity measured by airflow meter 9. At step S2, target combustion equivalent ratio TFBYA is calculated and determined based on latest up-to-date information regarding the engine speed detected based on a signal from crank angle sensor 14, accelerator opening detected based on a signal from accelerator opening sensor 18, and engine coolant temperature detected based on a signal from engine temperature sensor 15. On the assumption that a stoichiometric air/fuel mixture ratio is 14.7, target combustion equivalent ratio TFBYA is derived based on a desired air-fuel mixture ratio from the following expression (1).

$$TFBYA=14.7/(DESIRED\ AIR/FUEL\ MIXTURE\ RATIO) \quad (1)$$

Thus, when the desired air/fuel (A/F) ratio is the stoichiometric A/F ratio (=14.7), target combustion equivalent ratio TFBYA is calculated as "1" from the aforementioned expression (1).

Figure 8:
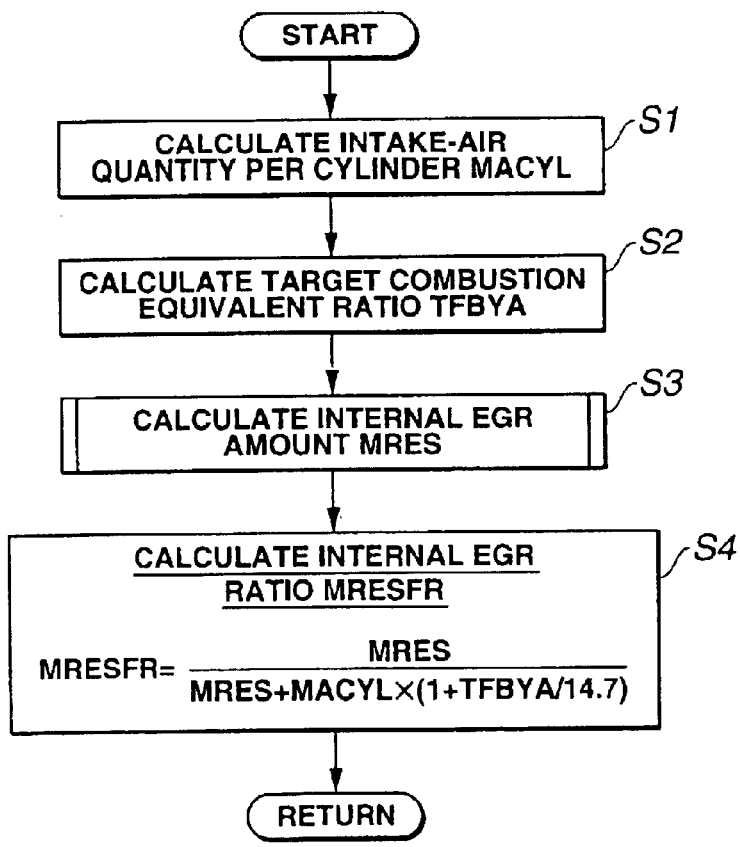
FIG. 8 is a flow chart showing an internal EGR ratio MRESFR (unit: %) calculation routine.
Figure 9:
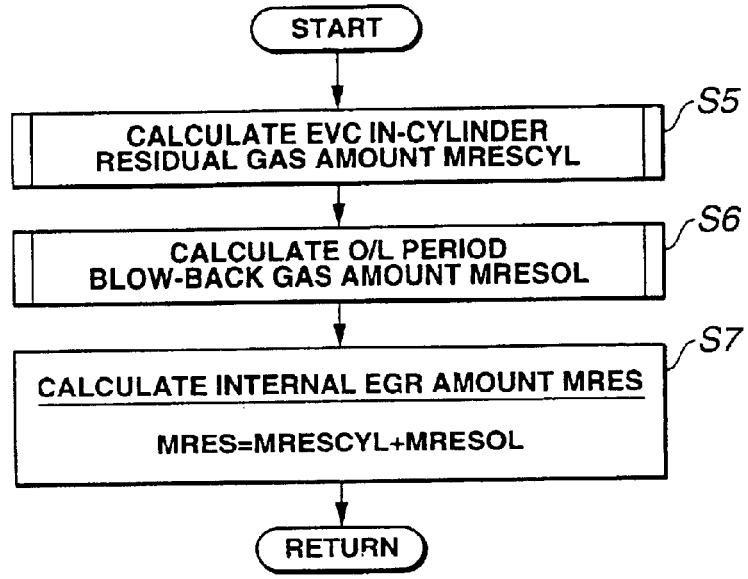
FIG. 9 is a flow chart showing an internal EGR amount MRES (unit: kg) calculation routine.

Then, at step S3 of FIG. 8, internal EGR amount per cylinder MRES (unit: kg) is calculated in accordance with the flow chart shown in FIG. 9. After a series of steps S1–S3, at step S4 internal EGR ratio MRESFR (unit: %) is calculated as a ratio of the amount of internal EGR per cylinder to the total gas amount per cylinder from the following expression (2).

$$MRESFR=MRES/\{MRES+MACYL\times(1+TFBYA/14.7)\} \quad (2)$$

Figure 3:
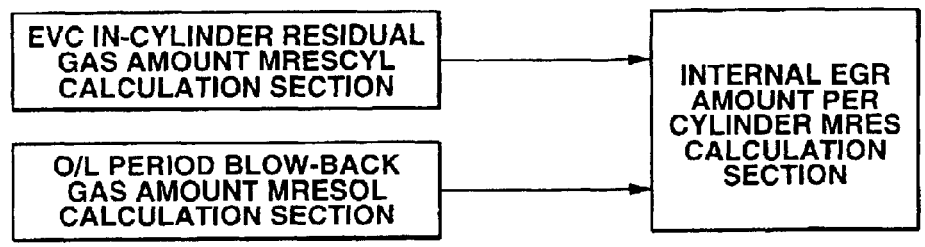
FIG. 3 is a block diagram relating to an internal EGR amount MRES calculation section.

Second, a way to calculate internal EGR amount per cylinder MRES (relating to step S3 of FIG. 8) is hereunder explained by reference to the block diagram of FIG. 3 and the internal EGR amount per cylinder MRES (unit: kg) calculation routine of FIG. 9.

As seen from the block diagram of FIG. 3, an exhaust valve closure timing in-cylinder residual gas amount calculation section calculates an exhaust valve closure timing in-cylinder residual gas amount (hereinafter is referred to as "EVC in-cylinder residual gas amount") MRESCYL (unit: kg), a valve overlap period blow-back gas amount calculation section calculates a valve overlap period blow-back gas amount (hereinafter is referred to as "O/L period blow-back gas amount") MRESOL (unit: kg), and then the internal EGR amount per cylinder MRES (unit: kg) calculation section calculates internal EGR amount per cylinder MRES (unit: kg) based on the calculated values MRESCYL and MRESOL. In more detail, as shown in the flow chart of FIG. 9, at step S5, EVC in-cylinder residual gas amount MRESCYL (unit: kg), corresponding to the amount of burned gas remaining in the engine cylinder at the exhaust valve closure timing EVC, is calculated in accordance with the flow chart shown in FIG. 10. At step S6, O/L period blow-back gas amount MRESOL (unit: kg) is calculated in accordance with the flow chart shown in FIG. 11. O/L period blow-back gas amount MRESOL means a quantity of gas flow from one of intake and exhaust ports 5p and 6p via combustion chamber 3 to the other port during a valve overlap period during which both of the intake and exhaust valves are open together. When a gas flows from exhaust port 6p toward combustion chamber 3 and then blows from combustion chamber 3 back to intake port 5p during a valve overlap period, the value of O/L period blow-back gas amount MRESOL is defined as a positive value. On the contrary, when a gas flows from intake port 5p toward combustion chamber 3 and then blows from combustion chamber 3 through exhaust port 6p during a valve overlap period, the value of O/L period blow-back gas amount MRESOL is defined as a negative value. That is, O/L period blow-back gas amount MRESOL corresponds to the quantity of gas flow between intake and exhaust ports 5p and 6p via combustion chamber 3 during a valve overlap period, the gas flow being created by the pressure difference between the intake and exhaust ports 5p and 6p (exactly, the pressure difference between the intake-port pressure and the in-cylinder pressure and the pressure difference between the in-cylinder pressure and the exhaust-port pressure). After a series of steps S5–S6, at step S7 internal EGR amount per cylinder MRES (unit: kg) is arithmetically calculated by adding O/L period blow-back gas amount MRESOL to EVC in-cylinder residual gas amount MRESCYL, from the following physical expression (3).

$$MRES=MRESCYL+MRESOL \quad (3)$$

Third, a way to calculate EVC in-cylinder residual gas amount MRESCYL (relating to step S5 of FIG. 9) is hereunder explained by reference to the block diagram of FIG. 4 and the EVC in-cylinder residual gas amount MRESCYL (unit: kg) calculation routine of FIG. 10.

Figure 4:
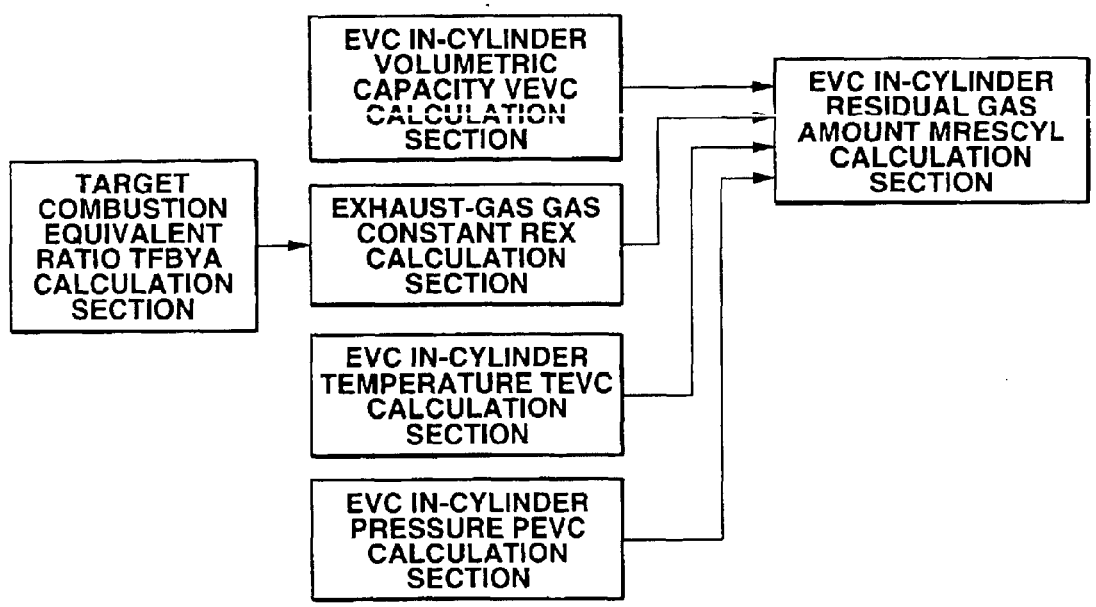
FIG. 4 is a block diagram relating to an exhaust valve closure timing in-cylinder residual gas amount MRESCYL calculation section.
Figure 17:
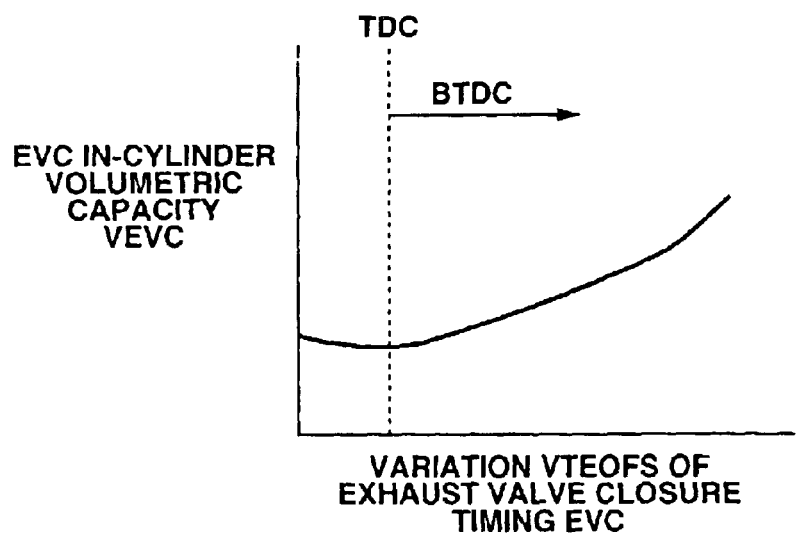
FIG. 17 is a preprogrammed lookup table showing the relationship between a variation VTEOFS of exhaust valve closure timing EVC and an exhaust valve closure timing in-cylinder volumetric capacity VEVC (unit: $m^3$).
Figure 29:
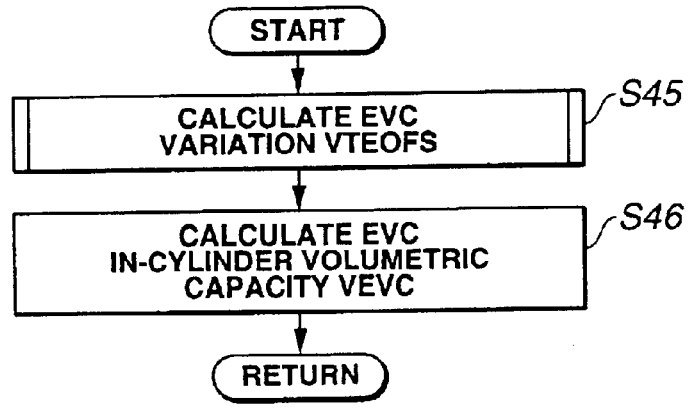
FIG. 29 is a flow chart showing an exhaust valve closure timing in-cylinder volumetric capacity VEVC (unit: m³) calculation routine.

As seen from the block diagram of FIG. 4, the target combustion equivalent ratio calculation section calculates target combustion equivalent ratio TFBYA of exhaust gases, and thereafter an exhaust-gas gas constant calculation section calculates an exhaust-gas gas constant REX (unit: J/kgK) based on target combustion equivalent ratio TFBYA, that is, a gas constant REX corresponding to a change in a composition of exhaust gas, based on an air/fuel mixture ratio. An exhaust valve closure timing in-cylinder volumetric capacity calculation section calculates an exhaust valve closure timing in-cylinder volumetric capacity (hereinafter is referred to as "EVC in-cylinder volumetric capacity") VEVC (unit: $m^3$), an exhaust valve closure timing in-cylinder temperature calculation section calculates an exhaust valve closure timing in-cylinder temperature (hereinafter is referred to as "EVC in-cylinder temperature") TEVC, an exhaust valve closure timing in-cylinder pressure calculation section calculates an exhaust valve closure timing in-cylinder pressure (hereinafter is referred to as "EVC in-cylinder pressure") PEVC. Then, the EVC in-cylinder residual gas amount calculation section calculates EVC in-cylinder residual gas amount MRESCYL (unit: kg) based on the calculated values VEVC, REX, TEVC and PEVC. In more detail, as shown in the flow chart of FIG. 10, at step S8, EVC in-cylinder volumetric capacity VEVC is calculated or retrieved based on a variation VTEOFS of exhaust valve closure timing EVC from a predetermined VTEOFS-VEVC lookup table of FIG. 17 showing how an EVC in-cylinder volumetric capacity VEVC has to be varied relative to a variation VTEOFS of exhaust valve closure timing EVC. Details of calculation for EVC in-cylinder volumetric capacity VEVC (relating to step S8 of FIG. 10) will be fully described later by reference to the block diagram of FIG. 23 and the EVC in-cylinder volumetric capacity VEVC (unit: $m^3$) calculation routine of FIG. 29. On internal combustion engines employing a variable exhaust-valve timing mechanism, the variation VTEOFS of exhaust valve closure timing EVC is determined based on latest up-to-date information regarding the cam angle of the camshaft of exhaust valve 6, detected based on a signal from exhaust-valve cam angle sensor 17. As seen from the lookup table of FIG. 17, EVC in-cylinder volumetric capacity VEVC becomes a minimum nearby the piston top dead center (TDC) position. A portion of the characteristic curve of the right-hand side from the TDC position indicates variations in EVC in-cylinder volumetric capacity VEVC before the TDC position. In other words, as can be appreciated from the lookup table of FIG. 17, EVC in-cylinder volumetric capacity VEVC is geometrically determined based on the position of the reciprocating piston at the exhaust valve closure timing EVC. On internal combustion engines also employing a variable compression ratio mechanism (a variable piston stroke characteristic mechanism) enabling a compression ratio $\epsilon$ of the engine to be continuously varied by changing at least one of the top dead center and the bottom dead center of the piston stroke characteristic of reciprocating piston 2, EVC in-cylinder volumetric capacity VEVC may be calculated or retrieved based on a variation $\Delta\epsilon$ of compression ratio $\epsilon$ controlled by means of the variable compression ratio mechanism from a predetermined $\epsilon$-VEVC lookup table showing how an EVC in-cylinder volumetric capacity VEVC has to be varied relative to a compression-ratio variation $\Delta\epsilon$.

Figure 10:
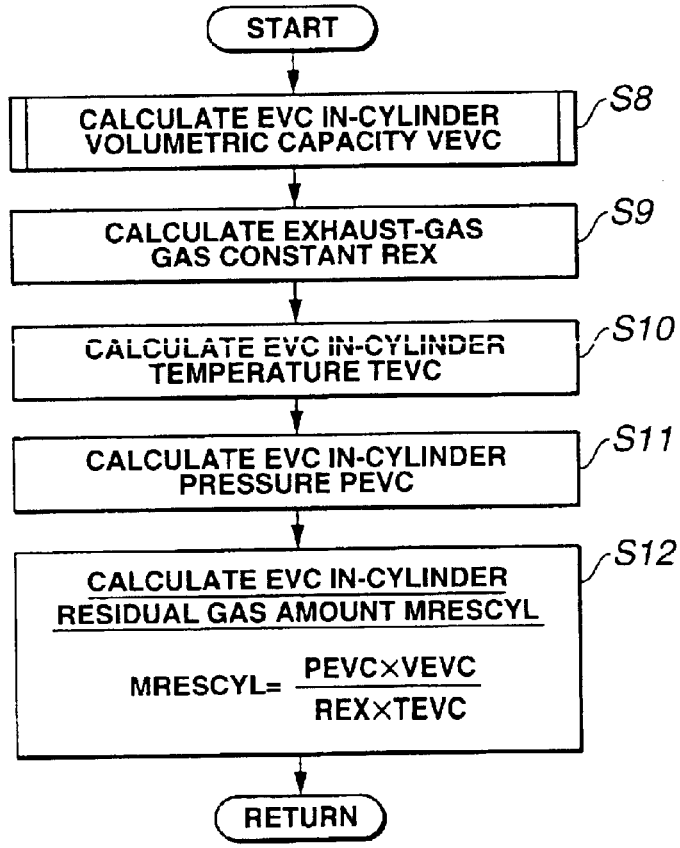
FIG. 10 is a flow chart showing an exhaust valve closure timing in-cylinder residual gas amount MRESCYL (unit: kg) calculation routine.
Figure 18:
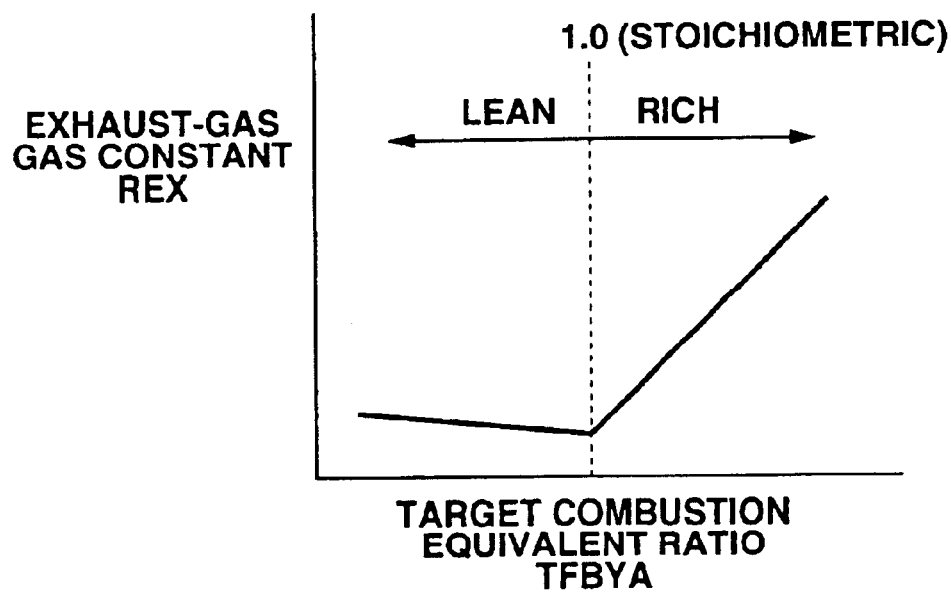
FIG. 18 is a preprogrammed lookup table showing the relationship between a target combustion equivalent ratio TFBYA and an exhaust-gas gas constant REX (unit: J/kgK).

At step S9 of FIG. 10, exhaust-gas constant REX is calculated or retrieved based on target combustion equivalent ratio TFBYA from a predetermined TFBYA-REX lookup table of FIG. 18 showing how an exhaust-gas gas constant REX has to be varied relative to a target combustion equivalent ratio TFBYA. In the lookup table of FIG. 18, the broken vertical line indicates a stoichiometric A/F ratio line that the desired A/F ratio is identical to the stoichiometric A/F ratio (=14.7) and thus target combustion equivalent ratio TFBYA is "1". The right-hand side area indicates a rich A/F mixture area, whereas the left-hand side area indicates a lean A/F mixture area. At step S10, EVC in-cylinder temperature TEVC is determined based on latest up-to-date information regarding the exhaust temperature, detected based on a signal from exhaust temperature sensor 12. Instead of using the sensor signal from exhaust temperature sensor 12, EVC in-cylinder temperature TEVC may be estimated and determined, by way of retrieval for a predetermined or preprogrammed fuel-injection-amount versus EVC in-cylinder temperature TEVC lookup table showing the relationship between the fuel injection amount and EVC in-cylinder temperature TEVC. This is because EVC in-cylinder temperature TEVC tends to vary owing to a quantity of heat created depending on a quantity of fuel injected and sprayed from injector 20. At step S11, EVC in-cylinder pressure PEVC is determined based on latest up-to-date information regarding the exhaust pressure, detected based on a signal from exhaust pressure sensor 11. Instead of using the sensor signal from exhaust pressure sensor 11, EVC in-cylinder pressure PEVC may be estimated and determined, by way of retrieval for a predetermined or preprogrammed mixture volumetric flow rate versus EVC in-cylinder pressure PEVC lookup table showing the relationship between the mixture volumetric flow rate and EVC in-cylinder pressure PEVC. This is because EVC in-cylinder pressure PEVC tends to vary owing to a volume of air/fuel mixture and a fluid-flow resistance against exhaust gas flowing through the exhaust pipe of the exhaust system. After a series of steps S8–S11, at step S12 EVC in-cylinder residual gas amount MRESCYL (unit: kg) is arithmetically calculated based on the calculated values VEVC, REX, TEVC, and PEVC, from the following physical expression (4).

$$MRESCYL=(PEVC \times VEVC)/(REX \times TEVC) \qquad (4)$$

Fourth, a way to calculate O/L period blow-back gas amount MRESOL (relating to step S6 of FIG. 9) is hereunder explained by reference to the block diagram of FIG. 5 and the O/L period blow-back gas amount MRESOL (unit: kg) calculation routine of FIG. 11.

Figure 5:
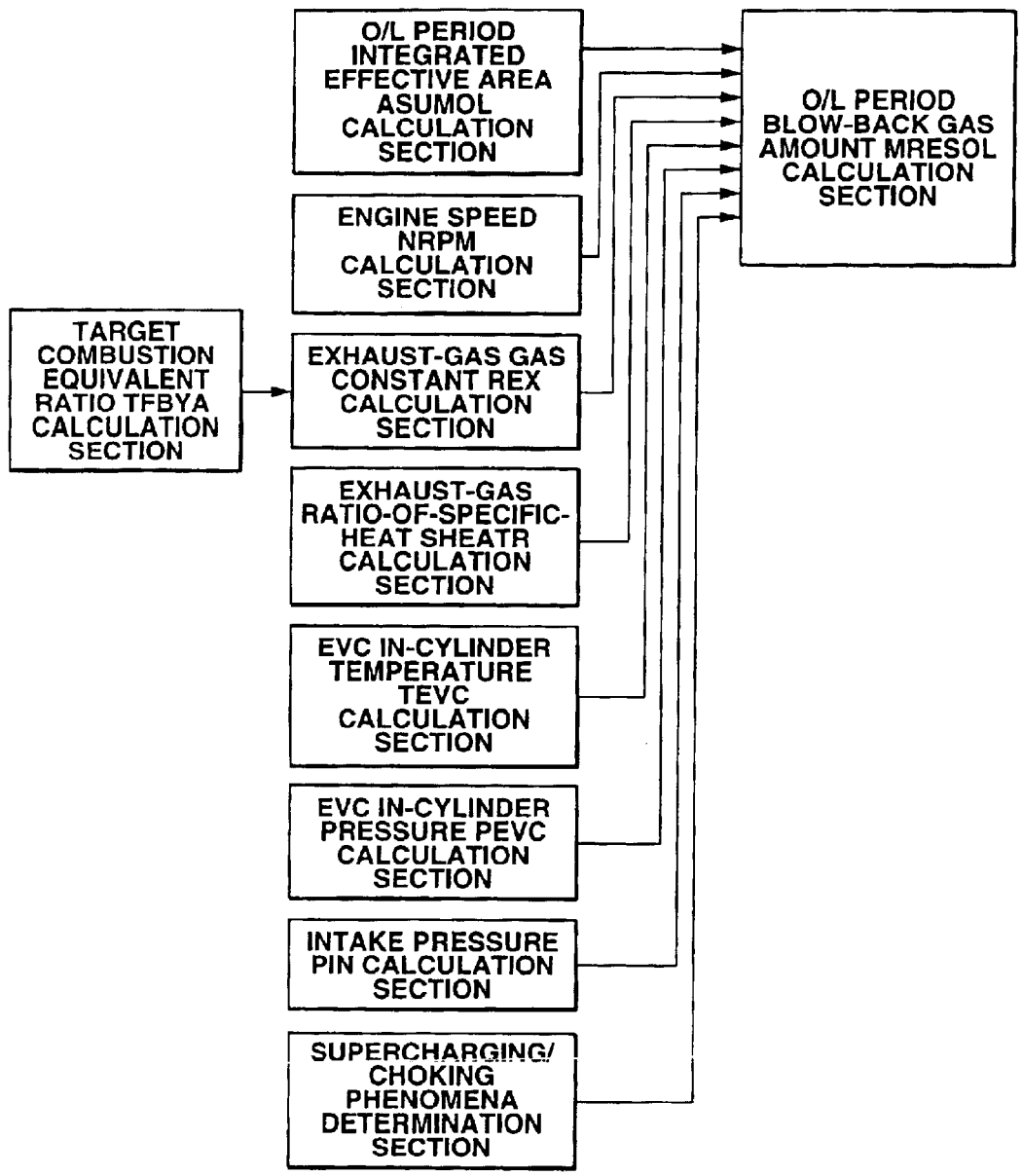
FIG. 5 is a block diagram relating to a valve overlap period blow-back gas amount MRESOL calculation section.

As seen from the block diagram of FIG. 5, the target combustion equivalent ratio calculation section calculates target combustion equivalent ratio TFBYA of exhaust gases, and then the exhaust-gas gas constant calculation section calculates exhaust-gas gas constant REX (unit: J/kgK) based on target combustion equivalent ratio TFBYA. A valve overlap period integrated effective area calculation section calculates a valve overlap period integrated effective area (hereinafter is referred to as "O/L period integrated effective area") ASUMOL (unit: $m^3$) based on the variation VTEOFS of exhaust valve closure timing EVC and a variation VTIOFS of intake valve open timing IVO, in accordance with the flow chart shown in FIG. 34, which will be fully described later. An engine speed calculation section calculates an engine speed NRPM (unit: rpm) based on a signal from crank angle sensor 14. The exhaust-gas gas constant calculation section calculates exhaust-gas gas constant REX (unit: J/kgK) based on target combustion equivalent ratio TFBYA. An exhaust-gas ratio-of-specific-heat calculation section calculates an exhaust-gas ratio-of-specific-heat SHEATR. The EVC in-cylinder temperature calculation section calculates EVC in-cylinder temperature TEVC. The EVC in-cylinder pressure calculation section calculates EVC in-cylinder pressure PEVC. An intake pressure calculation section calculates an intake pressure PIN (unit: Pa) based on a signal from intake pressure sensor 10. A supercharging-and-choking phenomena determination section determines the presence (TBCRG=1) or absence (TBCRG=0) of the supercharging phenomenon regarding gas flow between intake and exhaust ports 5p and 6p via combustion chamber 3 during a valve overlap period, the gas flow being created by the pressure difference between the pressure in the intake port and the pressure in the exhaust port, and the presence (CHOKE=1) or absence (CHOKE=0) of the choking phenomenon regarding the gas flow between intake and exhaust ports 5p and 6p via combustion chamber 3 during the valve overlap period. The O/L period blow-back gas amount MRESOL calculation section calculates O/L period blow-back gas amount MRESOL (unit: kg) based on the calculated values ASUMOL, NRPM, REX, SHEATR, TEVC, PEVC, PIN and the decision results, that is, the presence (TBCRG=1) or absence (TBCRG=0) of the supercharging phenomenon and the presence (CHOKE=1) or absence (CHOKE=0) of the choking phenomenon.

Figure 11:
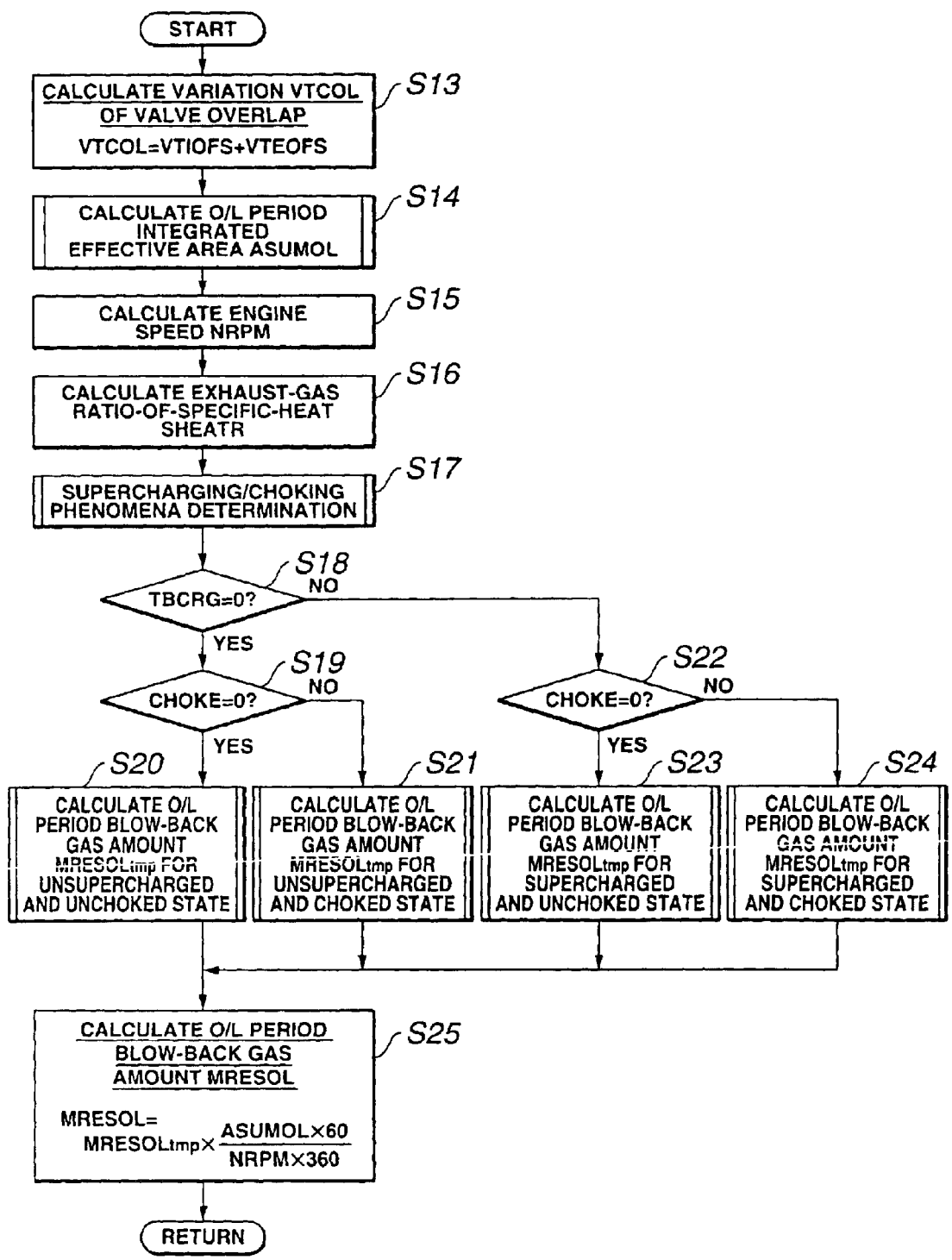
FIG. 11 is a flow chart showing a valve overlap period blow-back gas amount MRESOL (unit: kg) calculation routine.

In more detail, as shown in the flow chart of FIG. 11, at step S13, a variation VTCOL of a valve overlap O/L is arithmetically calculated based on (i) the variation VTIOFS of intake valve open timing IVO, which is determined based on latest up-to-date information regarding the cam angle (angular phase) of the camshaft of intake valve 5, detected by intake-valve cam angle sensor 16 and (ii) the variation VTEOFS of exhaust valve closure timing EVC, which is determined based on latest up-to-date information regarding the cam angle (angular phase) of the camshaft of exhaust valve 6, detected by exhaust-valve cam angle sensor 17, from the following expression (5).

$$VTCOL = VTIOFS + VTEOFS \quad (5)$$

Figure 19:
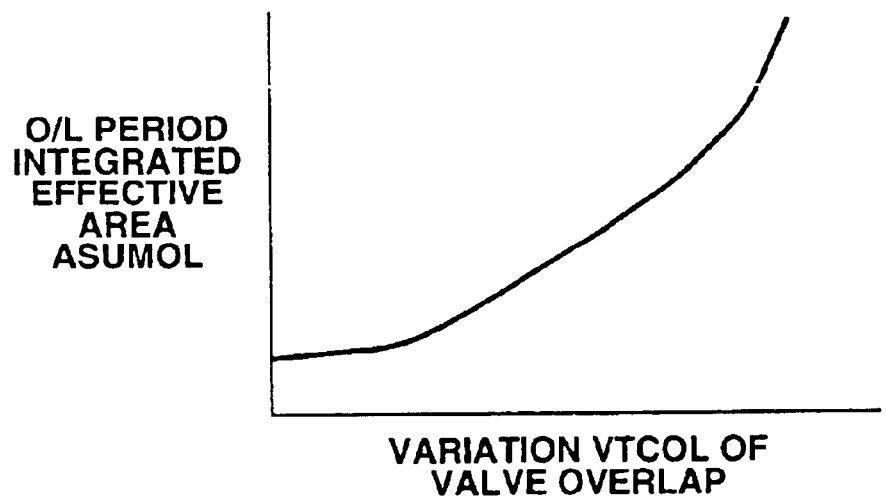
FIG. 19 is a preprogrammed lookup table showing the relationship between a variation VTCOL of valve overlap and a valve overlap period integrated effective area ASUMOL (unit: $m^3$).

Subsequently to step S13 of FIG. 11, at step S14 O/L period integrated effective area ASUMOL (detailed later in reference to the explanatory drawing of FIG. 20) is calculated or retrieved based on the variation VTCOL of valve overlap O/L from a predetermined VTCOL-ASUMOL lookup table of FIG. 19 showing how an O/L period integrated effective area ASUMOL has to be varied relative to a variation VTCOL of valve overlap O/L. As clearly seen from the characteristic curve of FIG. 19, O/L period integrated effective area ASUMOL tends to increase in a non-linear fashion, as the variation VTCOL of valve overlap O/L increases.

Figure 20:
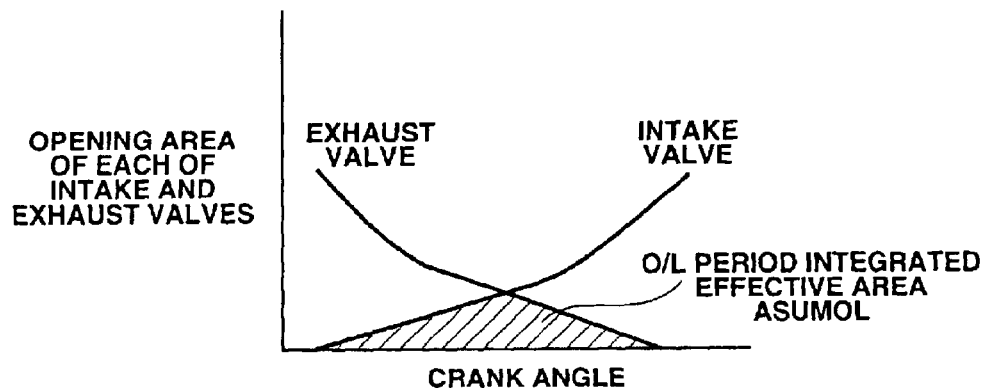
FIG. 20 is an explanatory drawing showing valve overlap period integrated effective area ASUMOL.

Referring now to FIG. 20, there is shown the relationship among the opening area of exhaust valve 6, the opening area of intake valve 5, and O/L period integrated effective area ASUMOL. The axis of abscissa of FIG. 20 indicates a crank angle, whereas the axis of ordinate of FIG. 20 indicates the opening area of intake valve 5 and the opening area of exhaust valve 6. An effective engine-valve opening area, which is obtained at a certain point of time during the valve overlapping period, is defined and set as a smaller one of the opening area of exhaust valve 6 and the opening area of intake valve 5 at the certain time point by way of a so-called select-LOW process. Therefore, O/L period integrated effective area ASUMOL of the valve overlapping period from the beginning-of-valve-overlap crank angle to the end-of-valve-overlap crank angle is represented and calculated as the integrated value (see the right-hand diagonal shading area shown in FIG. 20) of the smaller valve opening area per unit crank angle (or per unit time) from a point of time corresponding to the beginning-of-valve-overlap crank angle to a point of time corresponding to the end-of-valve-overlap crank angle. By way of the aforementioned select-LOW process and the integral of an effective opening area per unit crank angle (or unit time) from a time point (IVO) corresponding to the beginning-of-valve-overlap crank angle to a time point (EVC) corresponding to the end-of-valve-overlap crank angle, O/L period integrated effective area ASUMOL can be arithmetically calculated. In other words, the valve overlap period, during which both of intake and exhaust valves 5 and 6 are open together, can be regarded as a pseudo variable orifice (a variable flow-constriction orifice) that serves to variably constrict the gas flow between intake and exhaust ports 5p and 6p via combustion chamber 3. With the pseudo variable orifice having O/L period integrated effective area ASUMOL, the flow rate of gas passing through the pseudo variable orifice can be simply calculated or estimated.

Subsequently to step S14 of FIG. 11, at step S15 engine speed NRPM (unit: rpm) is calculated based on the sensor signal from crank angle sensor 14.

Figure 21:
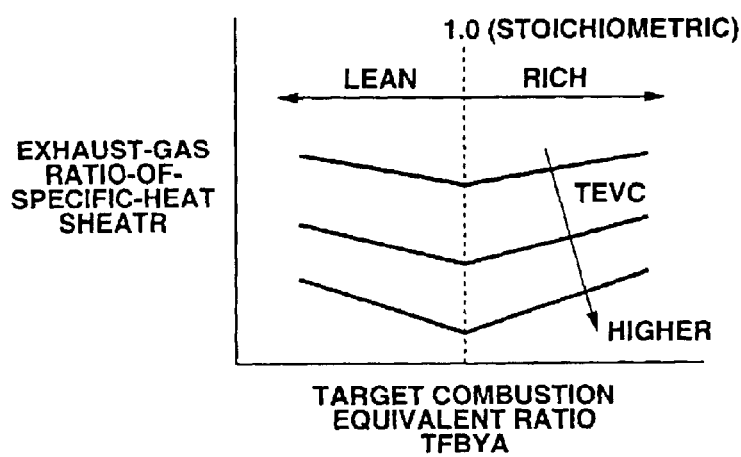
FIG. 21 is a preprogrammed lookup table (a predetermined characteristic map) showing the relationship among target combustion equivalent ratio TFBYA, an exhaust valve closure timing in-cylinder temperature TEVC (unit: K), and an exhaust-gas ratio-of-specific-heat SHEATR.

At step S16, exhaust-gas ratio-of-specific-heat SHEATR is calculated or retrieved from a predetermined characteristic map of FIG. 21 showing how an exhaust-gas ratio-of-specific-heat SHEATR has to be varied relative to a target combustion equivalent ratio TFBYA and an exhaust valve closure timing in-cylinder temperature TEVC (unit: K). A way to calculate exhaust-gas ratio-of-specific-heat SHEATR is hereunder explained by reference to the block diagram of FIG. 6.

Figure 6:
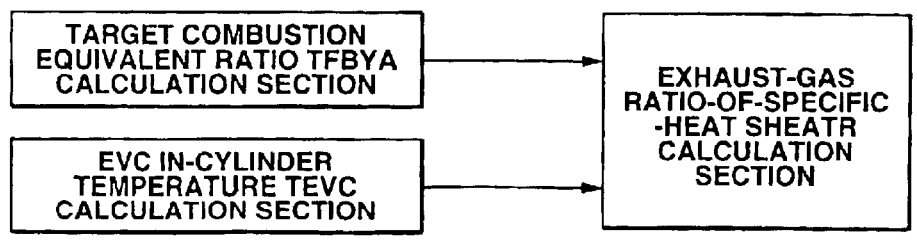
FIG. 6 is a block diagram relating to an exhaust-gas ratio-of-specific-heat SHEATR calculation section.

As seen from the block diagram of FIG. 6, the target combustion equivalent ratio calculation section calculates target combustion equivalent ratio TFBYA, and the exhaust valve closure timing in-cylinder temperature calculation section calculates exhaust valve closure timing in-cylinder temperature TEVC (unit: K). Then, the exhaust-gas ratio-of-specific-heat calculation section calculates exhaust-gas ratio-of-specific-heat SHEATR based on the calculated values TFBYA and TEVC. In the predetermined characteristic map shown in FIG. 21, the axis of abscissa of FIG. 21 indicates target combustion equivalent ratio TFBYA, whereas the axis of ordinate of FIG. 21 indicates exhaust-gas ratio-of-specific-heat SHEATR. In the characteristic map of FIG. 21, the broken vertical line indicates a stoichiometric A/F ratio line that the desired A/F ratio is identical to the stoichiometric A/F ratio (=14.7) and thus target combustion equivalent ratio TFBYA is "1". In FIG. 21, the right-hand side area indicates a rich A/F mixture area, whereas the left-hand side area indicates a lean A/F mixture area. As can be seen from the predetermined characteristic map of FIG. 21, exhaust-gas ratio-of-specific-heat SHEATR becomes a smallest value when target combustion equivalent ratio TFBYA is nearby the stoichiometric A/F ratio (=14.7). Exhaust-gas ratio-of-specific-heat SHEATR tends to increase, as target combustion equivalent ratio TFBYA increases from "1" to a larger value (a richer mixture). Additionally, exhaust-gas ratio-of-specific-heat SHEATR tends to increase, as target combustion equivalent ratio TFBYA decreases from "1" to a smaller value (a leaner mixture). Furthermore, exhaust-gas ratio-of-specific-heat SHEATR tends to reduce, as EVC in-cylinder temperature TEVC (indicated by the arrow directed downwards in FIG. 21) rises. Actually, exhaust-gas ratio-of-specific-heat SHEATR is map-retrieved based on both of target combustion equivalent ratio TFBYA calculated at step S2 of FIG. 8 (see the expression (1)) and EVC in-cylinder temperature TEVC determined through step S10 of FIG. 10, from the predetermined TFBYA-TEVC-SHEATR map shown in FIG. 21.

At step S17 of FIG. 11, a determination for supercharging and choking phenomena regarding gas flow between intake and exhaust ports $5p$ and $6p$ via combustion chamber 3 during a valve overlap period, created by the pressure difference between the pressure in the intake port and the pressure in the exhaust port, is made.

At step S18, a check is made to determine whether a supercharging-phenomenon decision flag TBCRG is reset (=0). Concretely, when supercharging-phenomenon decision flag TBCRG is reset (=0), the ECU determines that the supercharging phenomenon regarding the gas flow between intake and exhaust ports $5p$ and $6p$ via combustion chamber 3 during a valve overlap period, created by the pressure difference between the pressure in the intake port and the pressure in the exhaust port, does not take place. Conversely when supercharging-phenomenon decision flag TBCRG is set (=1), the ECU determines that the supercharging phenomenon occurs. When the answer to step S18 is affirmative (YES), that is, in case of TBCRG=0, the routine proceeds from step S18 to step S19. Conversely when the answer to step S18 is negative (NO), that is, in case of TBCRG=1, the routine proceeds from step S18 to step S22.

At step S19, a check is made to determine whether a choking-phenomenon decision flag CHOKE is reset (=0). When choking-phenomenon decision flag CHOKE is reset (=0), the ECU determines that the choking phenomenon regarding the gas flow between intake and exhaust ports $5p$ and $6p$ via combustion chamber 3 during the valve overlap period, created by the pressure difference between the pressure in the intake port and the pressure in the exhaust port, does not take place. Conversely when choking-phenomenon decision flag CHOKE is set (=1), the ECU determines that the choking phenomenon occurs. When the answer to step S19 is affirmative (YES), that is, in case of CHOKE=0, the routine proceeds from step S19 to step S20, so as to calculate a temporary valve overlap period blow-back gas amount $MRESOL_{tmp}$ (unit: kg) suitable for an unsupercharged and unchoked state by using a temporary O/L period blow-back gas amount $MRESOL_{tmp}$ calculation routine shown in FIG. 13 (described later). Conversely when the answer to step S19 is negative (NO), that is, in case of CHOKE=1, the routine proceeds from step S19 to step S21, so as to calculate a temporary valve overlap period blow-back gas amount $MRESOL_{tmp}$ (unit: kg) suitable for an unsupercharged and choked state by using a temporary O/L period blow-back gas amount $MRESOL_{tmp}$ calculation routine shown in FIG. 14 (described later).

When the condition of TBCRG=1 is satisfied at step S18, at step S22 a check is made to determine whether choking-phenomenon decision flag CHOKE is reset (=0). When choking-phenomenon decision flag CHOKE is reset (=0), the routine proceeds from step S22 to step S23, so as to calculate a temporary valve overlap period blow-back gas amount $MRESOL_{tmp}$ (unit: kg) suitable for a supercharged and unchoked state by using a temporary O/L period blow-back gas amount $MRESOL_{tmp}$ calculation routine shown in FIG. 15 (described later). Conversely when choking-phenomenon decision flag CHOKE is set (=1), the routine proceeds from step S22 to step S24, so as to calculate a temporary valve overlap period blow-back gas amount $MRESOL_{tmp}$ (unit: kg) suitable for a supercharged and choked state by using a temporary O/L period blow-back gas amount $MRESOL_{tmp}$ calculation routine shown in FIG. 16 (described later).

After steps S20, S21, S23, or S24, the routine proceeds to step S25. At step S25, depending on the decision result of the presence or absence of the supercharging phenomenon and the presence or absence of the choking phenomenon, an O/L period blow-back gas amount MRESOL (unit: kg) is arithmetically calculated based on (i) temporary O/L period blow-back gas amount $MRESOL_{tmp}$ (unit: kg) properly calculated depending on both of supercharging-phenomenon decision flag TBCRG and choking-phenomenon decision flag CHOKE and (ii) O/L period integrated effective area ASUMOL, from the following physical expression (6).

$$MRESOL=(MRESOL_{tmp} \times ASUMOL \times 60)/(NRPM \times 360) \qquad (6)$$

A way to determine the presence (TBCRG=1) or absence (TBCRG=0) of the supercharging phenomenon and the presence (CHOKE=1) or absence (CHOKE=0) of the choking phenomenon is hereunder described in detail by reference to the block diagram of FIG. 7 and the supercharging/choking phenomena determination routine of FIG. 12.

Figure 7:
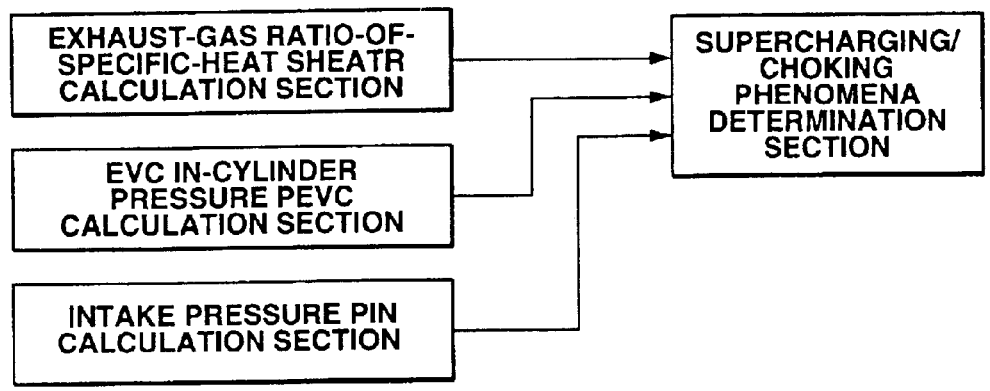
FIG. 7 is a block diagram relating to a supercharging-and-choking phenomena determination section.

As seen from the block diagram of FIG. 7, the supercharging-and-choking phenomena determination section determines the presence (TBCRG=1) or absence (TBCRG=0) of the supercharging phenomenon and the presence (CHOKE=1) or absence (CHOKE=0) of the choking phenomenon, on the basis of the values SHEATR, PEVC, and PIN respectively calculated by the exhaust-gas ratio-of-specific-heat calculation section, the EVC in-cylinder pressure calculation section, and the intake pressure calculation section.

Figure 12:
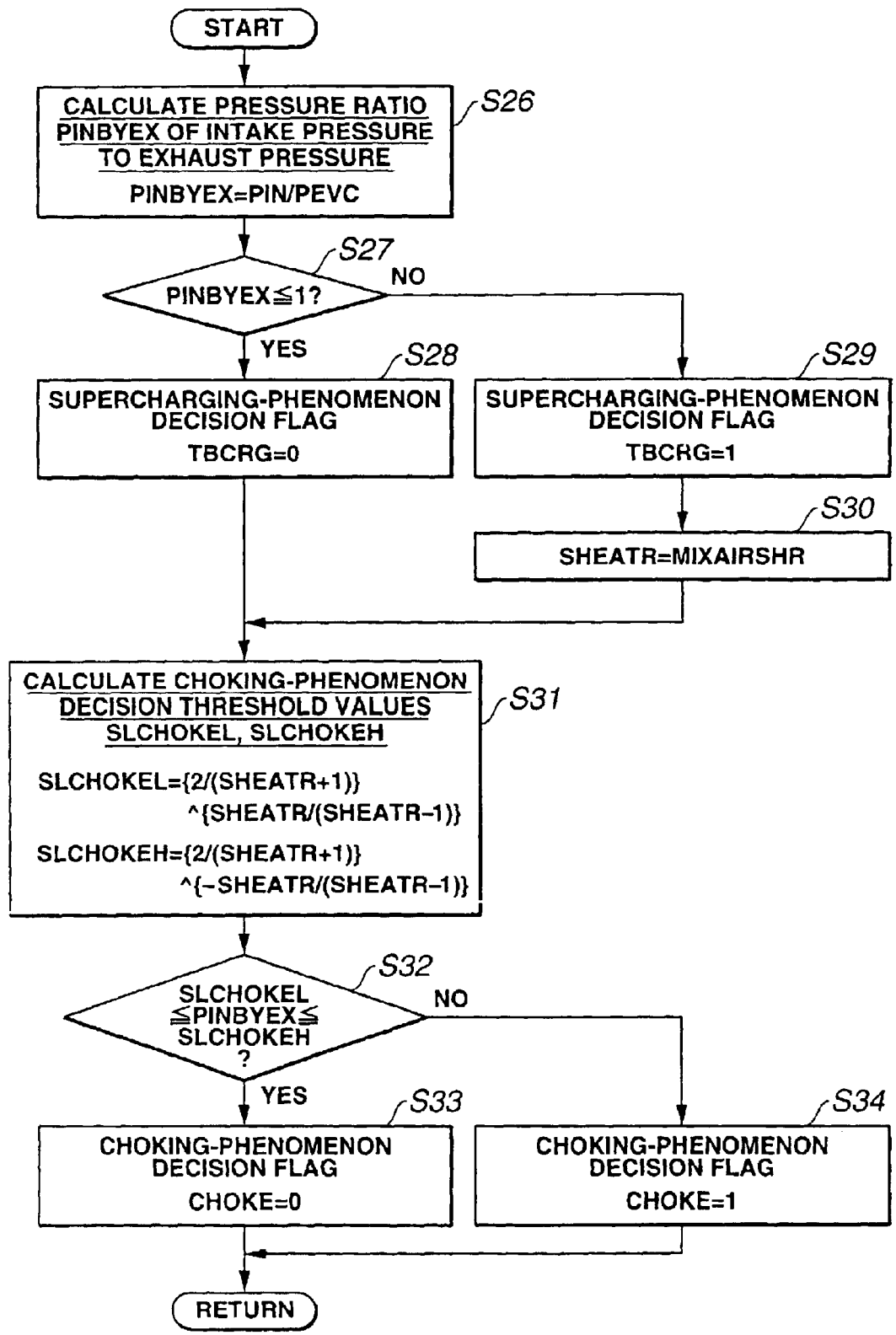
FIG. 12 is a flow chart showing a supercharging/choking phenomena determination routine.

In more detail, at step S26 of FIG. 12, a pressure ratio PINBYEX of intake pressure to exhaust pressure is calculated based on both the intake pressure PIN detected based on a signal from intake pressure sensor 10 and EVC in-cylinder pressure PEVC calculated through step S11 of FIG. 10, from the following expression (7).

$$PINBYEX=PIN/PEVC \qquad (7)$$

Figure 22:
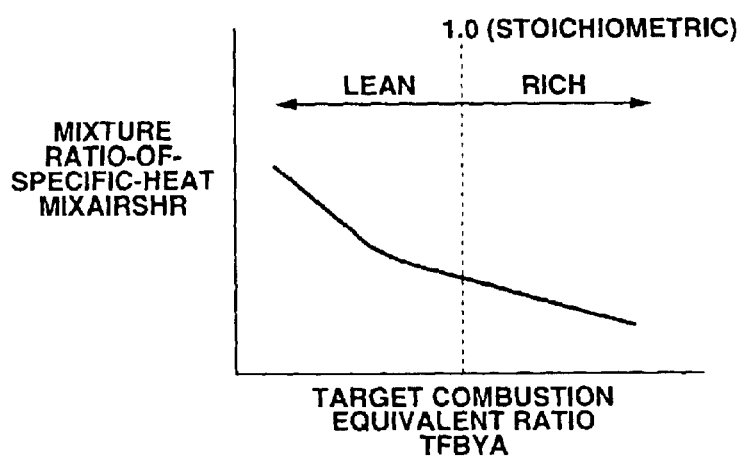
FIG. 22 is a preprogrammed lookup table (a predetermined characteristic map) showing the relationship between target combustion equivalent ratio TFBYA and an air-fuel mixture ratio-of-specific-heat MIXAIRSHR.

At step S27, a check is made to determine whether the intake-pressure-to-exhaust-pressure ratio (simply, pressure ratio) PINBYEX is less than or equal to "1". The inequality PINBYEX≦1 means that the previously-noted supercharging phenomenon does not occur. On the contrary, the inequality PINBYEX>1 means that the previously-noted supercharging phenomenon occurs. When the answer to step S27 is affirmative (YES), that is, in case of PINBYEX≦1, the ECU determines that the supercharging phenomenon does not take place and thus the routine proceeds from step S27 to step S28. At step S28, supercharging-phenomenon decision flag TBCRG is reset to "0". After step S28, step S31 occurs. Conversely when the answer to step S27 is negative (NO), that is, in case of PINBYEX>1, the ECU determines that the supercharging phenomenon takes place and thus the routine proceeds from step S27 to step S29. At step S29, supercharging-phenomenon decision flag TBCRG is set to "1". After step S29, step S30 occurs. At step S30, exhaust-gas ratio-of-specific-heat SHEATR retrieved from the predetermined characteristic map of FIG. 21, is replaced with an air-fuel mixture ratio-of-specific-heat MIXAIRSHR, which is retrieved from the predetermined TFBYA-MIXAIRSHR characteristic map of FIG. 22 showing how an air-fuel mixture ratio-of-specific-heat MIXAIRSHR has to be varied relative to a target combustion equivalent ratio TFBYA. In the predetermined characteristic map shown in FIG. 22, the axis of abscissa of FIG. 22 indicates target combustion equivalent ratio TFBYA, whereas the axis of ordinate of FIG. 22 indicates air-fuel mixture ratio-ofspecific-heat MIXAIRSHR. In the characteristic map of FIG. 22, the broken vertical line indicates a stoichiometric A/F ratio line that the desired A/F ratio is identical to the stoichiometric A/F ratio (=14.7) and thus target combustion equivalent ratio TFBYA is "1". In FIG. 22, the right-hand side area indicates a rich A/F mixture area, whereas the left-hand side area indicates a lean A/F mixture area. As can be seen from the predetermined characteristic map of FIG. 22, air-fuel mixture ratio-of-specific-heat MIXAIRSHR tends to gradually decrease, as target combustion equivalent ratio TFBYA increases from a smaller value (a leaner mixture) via "1" to a larger value (a richer mixture). Actually, air-fuel mixture ratio-of-specific-heat MIXAIRSHR is map-retrieved based on both of target combustion equivalent ratio TFBYA calculated at step S2 of FIG. 8 (see the expression (1)), from the predetermined TFBYA-MIXAIRSHR map shown in FIG. 22. As discussed above, by way of replacement of exhaust-gas ratio-of-specific-heat SHEATR by air-fuel mixture ratio-of-specific-heat MIXAIRSHR through step S30 of FIG. 12, it is possible to more precisely calculate the internal EGR amount by switching or converting a ratio of specific heat of gas passing through the previously-described pseudo variable orifice from exhaust-gas ratio-of-specific-heat SHEATR to air-fuel mixture ratio-of-specific-heat MIXAIRSHR, even when a gas flows from intake port 5p toward combustion chamber 3 and then blows from combustion chamber 3 through exhaust port bp owing to the supercharging phenomenon, such as the supercharged state on turbocharged engines or supercharged engines or inertia supercharging, during a valve overlap period.

At step S31, a low choking-phenomenon decision slice level (or a minimum choking-phenomenon decision threshold value) SLCHOKEL and a high choking-phenomenon decision slice level (or a maximum choking-phenomenon decision threshold value) SLCHOKEH are arithmetically calculated based on exhaust-gas ratio-of-specific-heat SHEATR calculated through step S16 of FIG. 11 or replaced with air-fuel mixture ratio-of-specific-heat MIXAIRSHR through step S30 of FIG. 12, from the following expressions (8) and (9).

$$SLCHOKEL = \{2/(SHEATR+1)\}^{\{SHEATR/(SHEATR-1)\}} \quad (8)$$
$$= \{2/(SHEATR+1)\}\wedge\{SHEATR/(SHEATR-1)\}$$

$$SLCHOKEH = \{2/(SHEATR+1)\}^{\{-SHEATR/(SHEATR-1)\}} \quad (9)$$
$$= \{2/(SHEATR+1)\}\wedge\{-SHEATR/(SHEATR-1)\}$$

As can be appreciated from the expression (9), a value $\{2/(SHEATR+1)\}$ is raised to the index $\{-SHEATR/(SHEATR-1)\}$ to give maximum choking-phenomenon decision threshold value SLCHOKEH (^ means a power of the value $\{2/(SHEATR+1)\}$). As a matter of course, a computer must have an adequate capacity for arithmetically calculating a power of the value $\{2/(SHEATR+1)\}$. In case of computers having an inadequate capacity for calculating the power of the value $\{2/(SHEATR+1)\}$, minimum choking-phenomenon decision threshold value SLCHOKEL may be map-retrieved from a predetermined SHEATR-SLCHOKEL characteristic map showing how minimum choking-phenomenon decision threshold value SLCHOKEL has to be varied relative to exhaust-gas ratio-of-specific-heat SHEATR. In a similar manner, maximum choking-phenomenon decision threshold value SLCHOKEH may be map-retrieved from a predetermined SHEATR-SLCHOKEH characteristic map showing how maximum choking-phenomenon decision threshold value SLCHOKEH has to be varied relative to exhaust-gas ratio-of-specific-heat SHEATR.

The previously-discussed minimum choking-phenomenon decision threshold value SLCHOKEL and maximum choking-phenomenon decision threshold value SLCHOKEH correspond to threshold limit values based on which the ECU determines whether or not the choking phenomenon regarding gas flow between intake and exhaust ports 5p and 6p via combustion chamber 3 during a valve overlap period, created by the pressure difference between intake and exhaust pressures, takes place. As hereunder described in detail by reference to step S32, intake-pressure-to-exhaust-pressure ratio (pressure ratio) PINBYEX is compared to each of the minimum and maximum choking-phenomenon decision threshold values SLCHOKEL and SLCHOKEH. When either of (i) a condition that pressure ratio PINBYEX is less than minimum choking-phenomenon decision threshold value SLCHOKEL (i.e., PINBYEX<SLCHOKEL) and (ii) a condition that pressure ratio PINBYEX is greater than maximum choking-phenomenon decision threshold value SLCHOKEH (i.e., PINBYEX>SLCHOKEH) is satisfied, the ECU determines that the choking phenomenon takes place. On the contrary when pressure ratio PINBYEX is greater than or equal to minimum choking-phenomenon decision threshold value SLCHOKEL and pressure ratio PINBYEX is less than or equal to maximum choking-phenomenon decision threshold value SLCHOKEH (i.e., SLCHOKEL≦PINBYEX≦SLCHOKEH), the ECU determines that the choking phenomenon does not take place.

At step S32, a check is made to determine whether pressure ratio PINBYEX is greater than or equal to minimum choking-phenomenon decision threshold value SLCHOKEL and additionally less than or equal to maximum choking-phenomenon decision threshold value SLCHOKEH, that is to say, SLCHOKEL≦PINBYEX≦SLCHOKEH. When the answer to step S32 is affirmative, i.e., in case of SLCHOKEL≦PINBYEX≦SLCHOKEH, the ECU determines that the choking phenomenon does not take place, and thus the routine proceeds from step S32 to step S33. At step S33, choking-phenomenon decision flag CHOKE is reset (=0). Conversely when the answer to step S32 is negative (NO), i.e., in case of SLCHOKEL>PINBYEX or PINBYEX>SLCHOKEH, the ECU determines that the choking phenomenon takes place, and thus the routine proceeds from step S32 to step S34. At step S34, choking-phenomenon decision flag CHOKE is set (=1).

A way to calculate temporary O/L period blow-back gas amount MRESOL$_{tmp}$ (unit: kg) suitable for an unsupercharged and unchoked state (relating to step S20 of FIG. 11) is hereunder explained by reference to the unsupercharged and unchoked state, temporary O/L period blow-back gas amount MRESOL$_{tmp}$ calculation routine shown in FIG. 13.

At step S35 of FIG. 13, a density term MRSOLD needed for an arithmetic expression (12) (described later) suited to the unsupercharged and unchoked state, temporary O/L period blow-back gas amount MRESOL$_{tmp}$ calculation, is calculated based on exhaust-gas gas constant REX (unit: J/kgK) calculated through step S9 of FIG. 10 and EVC in-cylinder temperature TEVC calculated through step S10 of FIG. 10, from the following expression (10).

$$MRSOLD=SQRT\{1/(REX \times TEVC)\} \quad (10)$$

where SQRT denotes a coefficient for exhaust-gas gas constant REX and EVC in-cylinder temperature TEVC. In case of computers having an inadequate capacity for calculating the density term MRSOLD needed for the arithmetic expression (12) suited to the unsupercharged and unchoked state, temporary O/L period blow-back gas amount $MRESOL_{tmp}$ calculation, based on the values REX and TEVC, density term MRSOLD may be map-retrieved from a predetermined REX-TEVC-MRSOLD characteristic map showing how density term MRSOLD has to be varied relative to exhaust-gas gas constant REX and EVC in-cylinder temperature TEVC.

At step S36, a pressure difference term MRSOLP needed for the arithmetic expression (12) (described later) for the unsupercharged and unchoked state, temporary O/L period blow-back gas amount $MRESOL_{tmp}$ calculation, is calculated based on exhaust-gas ratio-of-specific-heat SHEATR calculated through step S16 of FIG. 11 and intake-pressure-to-exhaust-pressure ratio (pressure ratio) PINBYEX calculated through step S26 of FIG. 12, from the following expression (11).

$$MRSOLP = SQRT[SHEATR/(SHEATR-1) \times \qquad (11)$$
$$\{PINBYEX^{(2/SHEATR)} - PINBYEX^{((SHEATR+1)/(SHEATR))}\}]$$
$$= SQRT[SHEATR/(SHEATR-1) \times$$
$$\{PINBYEX \wedge (2/SHEATR) -$$
$$PINBYEX \wedge ((SHEATR+1)/SHEATR)\}]$$

where SQRT denotes a coefficient for exhaust-gas gas constant REX and EVC in-cylinder temperature TEVC. In case of computers having an inadequate capacity for calculating the power of the value PINBYEX, pressure difference term MRSOLP may be map-retrieved from a predetermined SHEATR-PINBYEX-MRSOLP characteristic map showing how pressure difference term MRSOLP has to be varied relative to exhaust-gas ratio-of-specific-heat SHEATR and intake-pressure-to-exhaust-pressure ratio (pressure ratio) PINBYEX.

Figure 13:
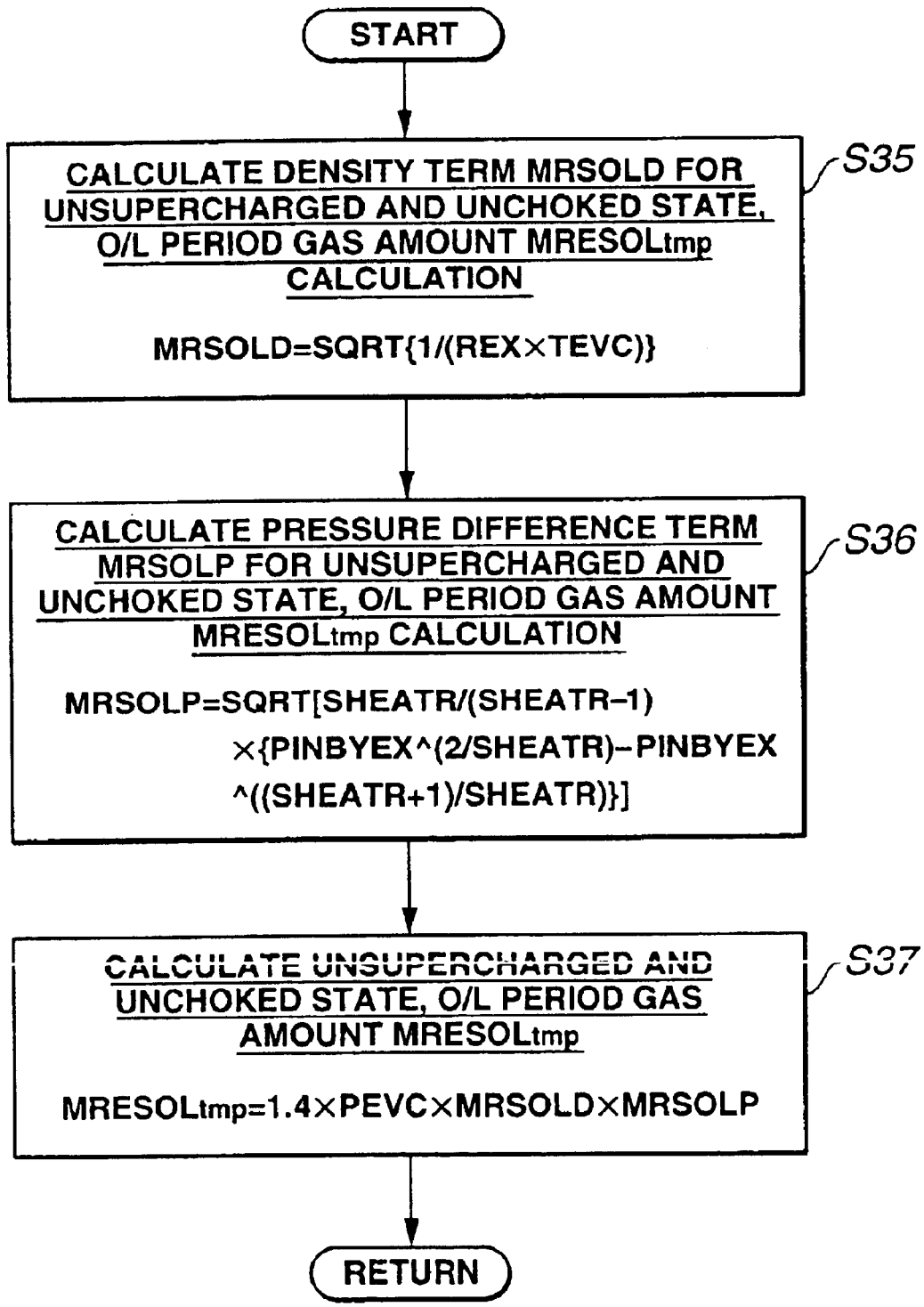
FIG. 13 is a flow chart showing a temporary valve overlap period blow-back gas amount $MRESOL_{tmp}$ (unit: kg) calculation routine executed in an unsupercharged and unchoked state.

At step S37, the unsupercharged and unchoked state, temporary O/L period blow-back gas amount $MRESOL_{tmp}$ is calculated based on the EVC in-cylinder pressure PEVC calculated through step S11 of FIG. 10, density term MRSOLD calculated through step S35 of FIG. 13 and pressure difference term MRSOLP calculated through step S36 of FIG. 13, from the following expression (12).

$$MRESOL_{tmp} = \sqrt{2} \times PEVC \times MRSOLD \times MRSOLP \qquad (12)$$
$$\approx 1.4 \times PEVC \times MRSOLD \times MRSOLP$$

A way to calculate temporary valve overlap period blow-back gas amount $MRESOL_{tmp}$ (unit: kg) suitable for an unsupercharged and choked state (relating to step S21 of FIG. 11) is hereunder explained by reference to the unsupercharged and choked state, temporary O/L period blow-back gas amount $MRESOL_{tmp}$ calculation routine shown in FIG. 14.

At step S38 of FIG. 14, in the same manner as step S35 of FIG. 13, a density term MRSOLD needed for an arithmetic expression (14) (described later) suited to the unsupercharged and choked state, temporary O/L period blow-back gas amount $MRESOL_{tmp}$ calculation, is calculated based on exhaust-gas gas constant REX (unit: J/kgK) and EVC in-cylinder temperature TEVC, from the previously-noted expression (10), that is, $MRSOLD=SQRT\{1/(REX \times TEVC)\}$.

At step S39, a pressure difference term MRSOLPC needed for the arithmetic expression (14) (described later) suited to the unsupercharged and choked state, temporary O/L period blow-back gas amount $MRESOL_{tmp}$ calculation, is calculated based on exhaust-gas ratio-of-specific-heat SHEATR calculated through step S16 of FIG. 11, from the following expression (13).

$$MRSOLPC = SQRT[SHEATR \times \qquad (13)$$
$$\{2/(SHEATR+1)\}^{\{(SHEATR+1)/(SHEATR-1)\}}]$$
$$= SQRT[SHEATR \times$$
$$\{2/(SHEATR+1)\}\wedge\{(SHEATR+1)/(SHEATR-1)\}]$$

where SQRT denotes a coefficient for exhaust-gas gas constant REX and EVC in-cylinder temperature TEVC. In case of computers having an inadequate capacity for calculating the power of the value $\{2/(SHEATR+1)\}$, pressure difference term MRSOLPC may be map-retrieved from a predetermined SHEATR-MRSOLPC characteristic map showing how pressure difference term MRSOLPC has to be varied relative to exhaust-gas ratio-of-specific-heat SHEATR.

At step S40, the unsupercharged and choked state, temporary O/L period blow-back gas amount $MRESOL_{tmp}$ is calculated based on the EVC in-cylinder pressure PEVC calculated through step S11 of FIG. 10, density term MRSOLD calculated through step S38 of FIG. 14 and pressure difference term MRSOLPC calculated through step S39 of FIG. 14, from the following expression (14).

$$MRESOL_{tmp} = PEVC \times MRSOLD \times MRSOLPC \qquad (14)$$

A way to calculate temporary valve overlap period blow-back gas amount $MRESOL_{tmp}$ (unit: kg) suitable for a supercharged and unchoked state (relating to step S23 of FIG. 11) is hereunder explained by reference to the supercharged and unchoked state, temporary O/L period blow-back gas amount $MRESOL_{tmp}$ calculation routine shown in FIG. 15.

At step S41 of FIG. 15, a pressure difference term MRSOLPT needed for an arithmetic expression (16) (described later) suited to the supercharged and unchoked state, temporary O/L period blow-back gas amount $MRESOL_{tmp}$ calculation, is calculated based on exhaust-gas ratio-of-specific-heat SHEATR (replaced with air-fuel mixture ratio-of-specific-heat MIXAIRSHR through step S30 of FIG. 12) and intake-pressure-to-exhaust-pressure ratio (pressure ratio) PINBYEX calculated through step S26 of FIG. 12, from the following expression (15).

$$MRSOLPT = SQRT[SHEATR/(SHEATR-1) \times \qquad (15)$$
$$\{PINBYEX^{(-2/SHEATR)} -$$
$$PINBYEX^{(-(SHEATR+1)/SHEATR)}\}]$$
$$= SQRT[SHEATR/(SHEATR-1) \times$$
$$\{PINBYEX \wedge (-2/SHEATR) -$$
$$PINBYEX \wedge (-(SHEATR+1)/SHEATR)\}]$$

where SQRT denotes a coefficient for exhaust-gas gas constant REX and EVC in-cylinder temperature TEVC. In case of computers having an inadequate capacity for calculating the power of the value PINBYEX, pressure difference term MRSOLPT may be map-retrieved from a predetermined SHEATR-PINBYEX-MRSOLPT characteristic map showing how pressure difference term MRSOLPT has to be varied relative to exhaust-gas ratio-of-specific-heat SHE- ATR (replaced by air-fuel mixture ratio-of-specific-heat MIXAIRSHR) and intake-pressure-to-exhaust-pressure ratio (pressure ratio) PINBYEX.

At step S42, the supercharged and unchoked state, temporary O/L period blow-back gas amount $MRESOL_{tmp}$ is calculated based on the intake pressure PIN detected based on a signal from intake pressure sensor 10 and pressure difference term MRSOLPT (calculated through step S41 of FIG. 15) for the supercharged and unchoked state, from the following expression (16).

$$MRESOL_{tmp} = -\sqrt{2} \times \sqrt{\frac{1}{RIN \times TIN}} \times PIN \times MRSOLPT \quad (16)$$

$$= -\sqrt{2} \times \sqrt{\frac{1}{0.287 \times 300}} \times PIN \times MRSOLPT$$

$$\approx -0.152 \times PIN \times MRSOLPT$$

where RIN denotes a gas constant of intake air (fresh air), and TIN denotes a Kelvin absolute temperature of the intake air, and 300K is almost equal to 27° C. (=(273+27)K=300K). As can be seen from the minus sign indicated in the expression (16), the supercharged and unchoked state, temporary O/L period blow-back gas amount $MRESOL_{tmp}$ is calculated as a negative value. As previously discussed, the value of O/L period blow-back gas amount MRESOL ($MRESOL_{tmp}$) is defined as a positive value when a gas flows from exhaust port 6p toward combustion chamber 3 and then blows from combustion chamber 3 back to intake port 5p during a valve overlap period, and defined as a negative value when a gas flows from intake port 5p toward combustion chamber 3 and then blows from combustion chamber 3 through exhaust port 6p during a valve overlap period. Thus, the supercharged and unchoked state, temporary O/L period blow-back gas amount $MRESOL_{tmp}$, calculated as a negative value by the expression (16), means the amount of gas that flows from intake port 5p toward combustion chamber 3 and then blows from combustion chamber 3 through exhaust port 6p during a valve overlap period. In this case (in the supercharged and unchoked state), the internal EGR amount is reduced by temporary O/L period blow-back gas amount $MRESOL_{tmp}$ calculated by the expression (16).

Figure 16:
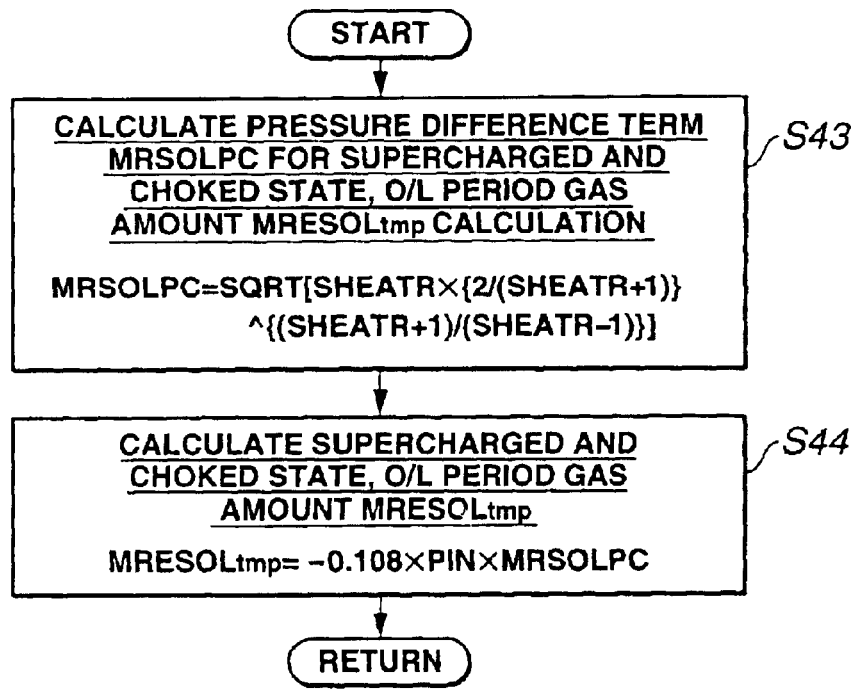
FIG. 16 is a flow chart showing a temporary valve overlap period blow-back gas amount $MRESOL_{tmp}$ (unit: kg) calculation routine executed in an supercharged and choked state.

A way to calculate temporary O/L period blow-back gas amount $MRESOL_{tmp}$ (unit: kg) suitable for a supercharged and choked state (relating to step S24 of FIG. 11) is hereunder explained by reference to the supercharged and choked state, temporary O/L period blow-back gas amount $MRESOL_{tmp}$ calculation routine shown in FIG. 16.

At step S43 of FIG. 16, in a similar manner to step S39 of FIG. 14, a pressure difference term MRSOLPC needed for an arithmetic expression (17) (described later) suited to the supercharged and choked state, temporary O/L period blow-back gas amount $MRESOL_{tmp}$ calculation, is calculated based on exhaust-gas ratio-of-specific-heat SHEATR (replaced with air-fuel mixture ratio-of-specific-heat MIXAIRSHR through step S30 of FIG. 12), from the aforementioned expression (13), that is, MRSOLPC=SQRT[SHEATR×{2/(SHEATR+1)}^{(SHEATR+1)/(SHEATR−1)}]. In case of computers having an inadequate capacity for calculating the power of the value {2/(SHEATR+1)}, pressure difference term MRSOLPC may be map-retrieved from a predetermined SHEATR-MRSOLPC characteristic map showing how pressure difference term MRSOLPC has to be varied relative to exhaust-gas ratio-of-specific-heat SHEATR (replaced by air-fuel mixture ratio-of-specific-heat MIXAIRSHR).

At step S44, the supercharged and choked state, temporary O/L period blow-back gas amount $MRESOL_{tmp}$ is calculated based on the intake pressure PIN detected based on a signal from intake pressure sensor 10 and pressure difference term MRSOLPC (calculated through step S43 of FIG. 16) for the supercharged and choked state, from the following expression (17).

$$MRESOL_{tmp} = -\sqrt{\frac{1}{RIN \times TIN}} \times PIN \times MRSOLPC \quad (17)$$

$$= -\sqrt{\frac{1}{0.287 \times 300}} \times PIN \times MRSOLPC$$

$$\approx -0.108 \times PIN \times MRSOLPC$$

where RIN denotes a gas constant of intake air (fresh air), and TIN denotes a Kelvin absolute temperature of intake air, and 300K is almost equal to 27° C. (=(273+27)K=300K). As can be seen from the minus sign indicated in the expression (17), the supercharged and choked state, temporary O/L period blow-back gas amount $MRESOL_{tmp}$ is calculated as a negative value. Thus, the supercharged and choked state, temporary O/L period blow-back gas amount $MRESOL_{tmp}$, calculated as a negative value by the expression (17), means the amount of gas that flows from intake port 5p toward combustion chamber 3 and then blows from combustion chamber 3 through exhaust port 6p during a valve overlap period. In this case (in the supercharged and choked state), the internal EGR amount is reduced by temporary O/L period blow-back gas amount $MRESOL_{tmp}$ calculated by the expression (17).

As set forth above, through steps S20, 21, 23, and 24 of FIG. 11, temporary O/L period blow-back gas amount $MRESOL_{tmp}$ is properly accurately calculated depending on the presence (TBCRG=1) or absence (TBCRG=0) of the supercharging phenomenon regarding gas flow between intake and exhaust ports 5p and 6p via combustion chamber 3 during a valve overlap period, created by the pressure difference between the pressure in the intake port and the pressure in the exhaust port, and the presence (CHOKE=1) or absence (CHOKE=0) of the choking phenomenon regarding the gas flow between intake and exhaust ports 5p and 6p via combustion chamber 3 during the valve overlap period, created by the pressure difference between the pressure in the intake port and the pressure in the exhaust port. Thereafter steps S20, 21, 23, or 24, temporary O/L period blow-back gas amount MRESOL is arithmetically calculated through step S25 (see FIG. 11), based on (i) temporary O/L period blow-back gas amount $MRESOL_{tmp}$ (unit: kg) properly calculated depending on both of supercharging-phenomenon decision flag TBCRG and choking-phenomenon decision flag CHOKE, and (ii) O/L period integrated effective area ASUMOL. Then, the internal EGR calculation routine proceeds from step S6 to step S7 (see FIG. 9) to arithmetically calculate internal EGR amount per cylinder MRES (unit: kg). Thereafter, the routine proceeds from step S3 to step S4 (see FIG. 8) to arithmetically calculate internal EGR ratio MRESFR (unit: %).

A way to calculate EVC in-cylinder volumetric capacity VEVC (relating to step S8 of FIG. 10) is hereunder described in detail by reference to the block diagram of FIG. 23 and the EVC in-cylinder volumetric capacity VEVC (unit: $m^3$) calculation routine of FIG. 29.

Figure 23:
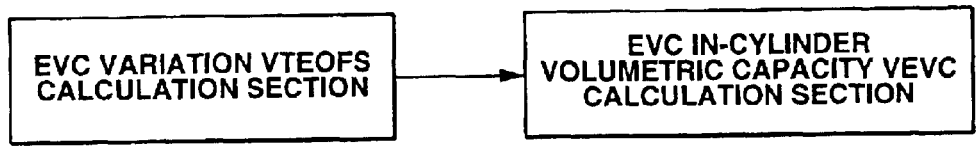
FIG. 23 is a block diagram relating to an exhaust valve closure timing in-cylinder volumetric capacity VEVC calculation section.

As seen from the block diagram of FIG. 23, the EVC in-cylinder volumetric capacity calculation section calculates EVC in-cylinder volumetric capacity VEVC (unit: $m^3$), which is geometrically determined based on the position of reciprocating piston 2 at the exhaust valve closure timing EVC, on the basis of the variation VTEOFS of exhaust valve closure timing EVC (hereinafter is referred to as "EVC variation VTEOFS"). The EVC variation VTEOFS is calculated by an EVC variation calculation section whose operation will be fully described later by reference to the flow chart shown in FIG. 30. As seen from the flow chart of FIG. 29, at step S45, EVC variation VTEOFS is calculated in accordance with the flow chart shown in FIG. 30. The positive sign of EVC variation VTEOFS is defined as a valve overlap (O/L) increase direction, that is, an EVC retard direction, whereas the negative sign of EVC variation VTEOFS is defined as an O/L decrease direction, that is, an EVC advance direction. At step S46 of FIG. 29, EVC in-cylinder volumetric capacity VEVC is retrieved based on EVC variation VTEOFS from the predetermined VTEOFS-VEVC lookup table of FIG. 17.

A way to calculate EVC variation VTEOFS (relating to step S45 of FIG. 29) is hereunder explained by reference to the block diagram of FIG. 24 and the EVC variation VTEOFS calculation routine of FIG. 30.

Figure 24:
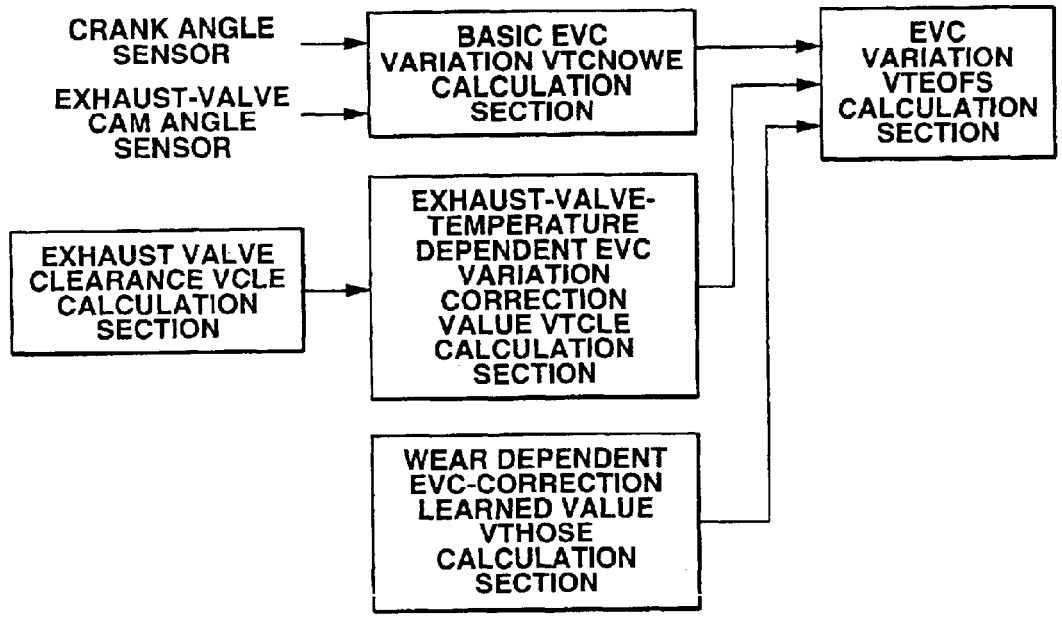
FIG. 24 is a block diagram relating to an EVC variation VTEOFS calculation section.
Figure 36A:
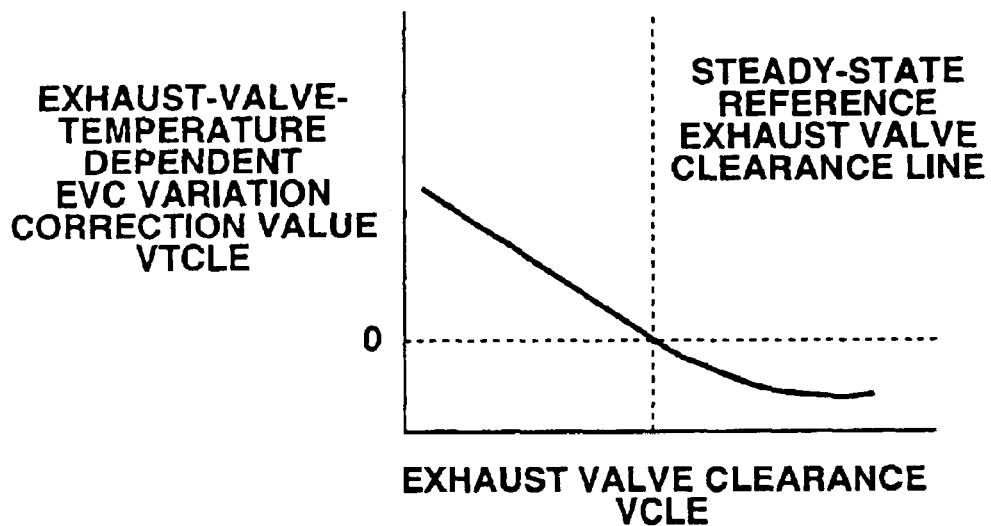
FIG. 36A is a preprogrammed lookup table showing the relationship between an exhaust valve clearance VCLE and an exhaust-valve temperature dependent EVC-variation correction value VTCLE.

As seen from the block diagram of FIG. 24, a basic EVC variation calculation section calculates a basic EVC variation VTCNOWE (a variation of angular phase of the exhaust camshaft relative to the engine crankshaft), based on latest up-to-date information regarding the relative position of the engine crankshaft, detected based on a signal from crank angle sensor 14, and the cam angle of the exhaust camshaft, detected based on a signal from exhaust-valve cam angle sensor 17. An exhaust-valve-temperature dependent EVC variation correction value calculation section calculates an exhaust-valve-temperature dependent EVC variation correction value VTCLE based on an exhaust valve clearance VCLE that is calculated or estimated by an exhaust valve clearance calculation section (or an exhaust valve clearance estimation section). An EVC-correction learned value calculation section (exactly, a valve-train component-parts wear dependent EVC-correction learned value calculation section) calculates an EVC-correction learned value (exactly, a valve-train component-parts wear dependent EVC-correction learned value) VTHOSE, which will be fully described later by reference to the flow chart shown in FIG. 32. A final EVC variation calculation section calculates EVC variation VTEOFS based on basic EVC variation VTCNOWE, exhaust-valve-temperature dependent EVC variation correction value VTCLE, and EVC-correction learned value VTHOSE. In more detail, at step S47 of FIG. 30, basic EVC variation VTCNOWE is calculated based on the signals from crank angle sensor 14 and exhaust-valve cam angle sensor 17. At step S48, exhaust valve clearance VCLE is estimated or calculated in accordance with the flow chart of FIG. 31 (described later). At step S49, exhaust-valve-temperature dependent EVC variation correction value VTCLE is based on exhaust valve clearance VCLE from a predetermined VCLE-VTCLE lookup table of FIG. 36A showing how an exhaust-valve-temperature dependent EVC variation correction value VTCLE has to be varied relative to an exhaust valve clearance VCLE. More concretely, in the lookup table of FIG. 36A, the vertical broken line indicates a reference exhaust valve clearance line at the steady state, the axis of abscissa of FIG. 36A indicates exhaust valve clearance VCLE, and the axis of ordinate of FIG. 36A indicates an exhaust-valve-temperature dependent EVC variation correction value VTCLE, that is, a deviation from an exhaust valve closure timing EVC corresponding to the steady-state reference exhaust valve clearance. As can be seen from the VCLE-VTCLE lookup table of FIG. 36A, when exhaust valve clearance VCLE of exhaust valve 6 decreases owing to a rise in an exhaust valve temperature VTMPE (see the left-hand characteristic curve of the steady-state reference exhaust valve clearance line), the actual exhaust valve closure timing tends to phase-retard by a phase angle corresponding to exhaust-valve-temperature dependent EVC variation correction value VTCLE. The phase retard of the actual EVC means an increase in the valve overlap, and thus the exhaust-valve-temperature dependent EVC variation is increasingly compensated for based on a minus deviation of exhaust valve clearance VCLE from the steady-state reference exhaust valve clearance, in accordance with the characteristic curve of FIG. 36A. Conversely when exhaust valve clearance VCLE increases owing to a drop in exhaust valve temperature VTMPE (see the right-hand characteristic curve of the steady-state reference exhaust valve clearance line), the actual exhaust valve closure timing tends to phase-advance by a phase angle corresponding to exhaust-valve-temperature dependent EVC variation correction value VTCLE. The phase advance of the actual EVC means a decrease in the valve overlap, and thus the exhaust-valve-temperature dependent EVC variation is decreasingly compensated for based on a plus deviation of exhaust valve clearance VCLE from the steady-state reference exhaust valve clearance, in accordance with the characteristic curve of FIG. 36A.

Figure 30:
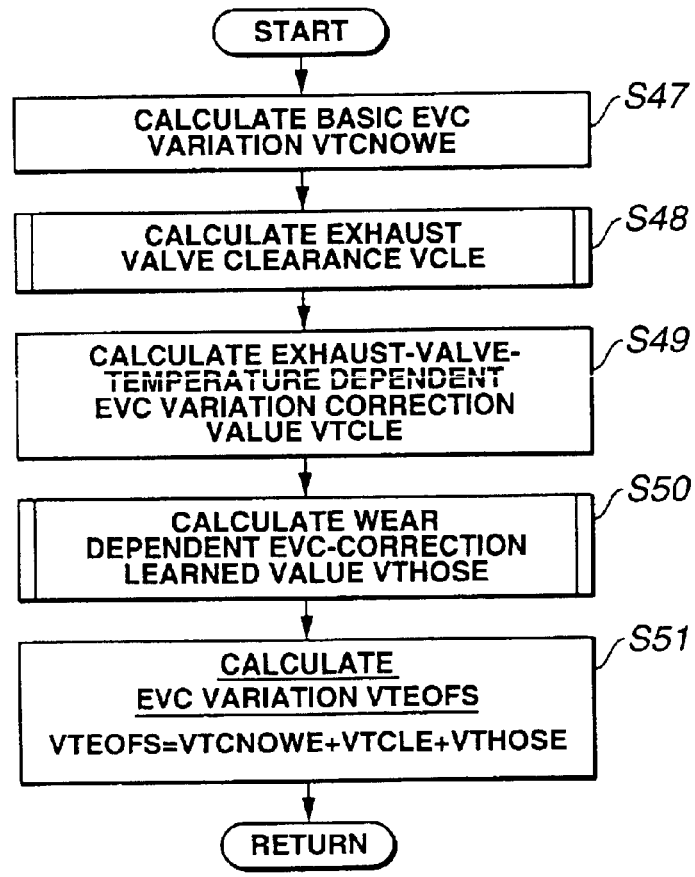
FIG. 30 is a flow chart showing an EVC variation VTEOFS calculation routine.
Figure 32:
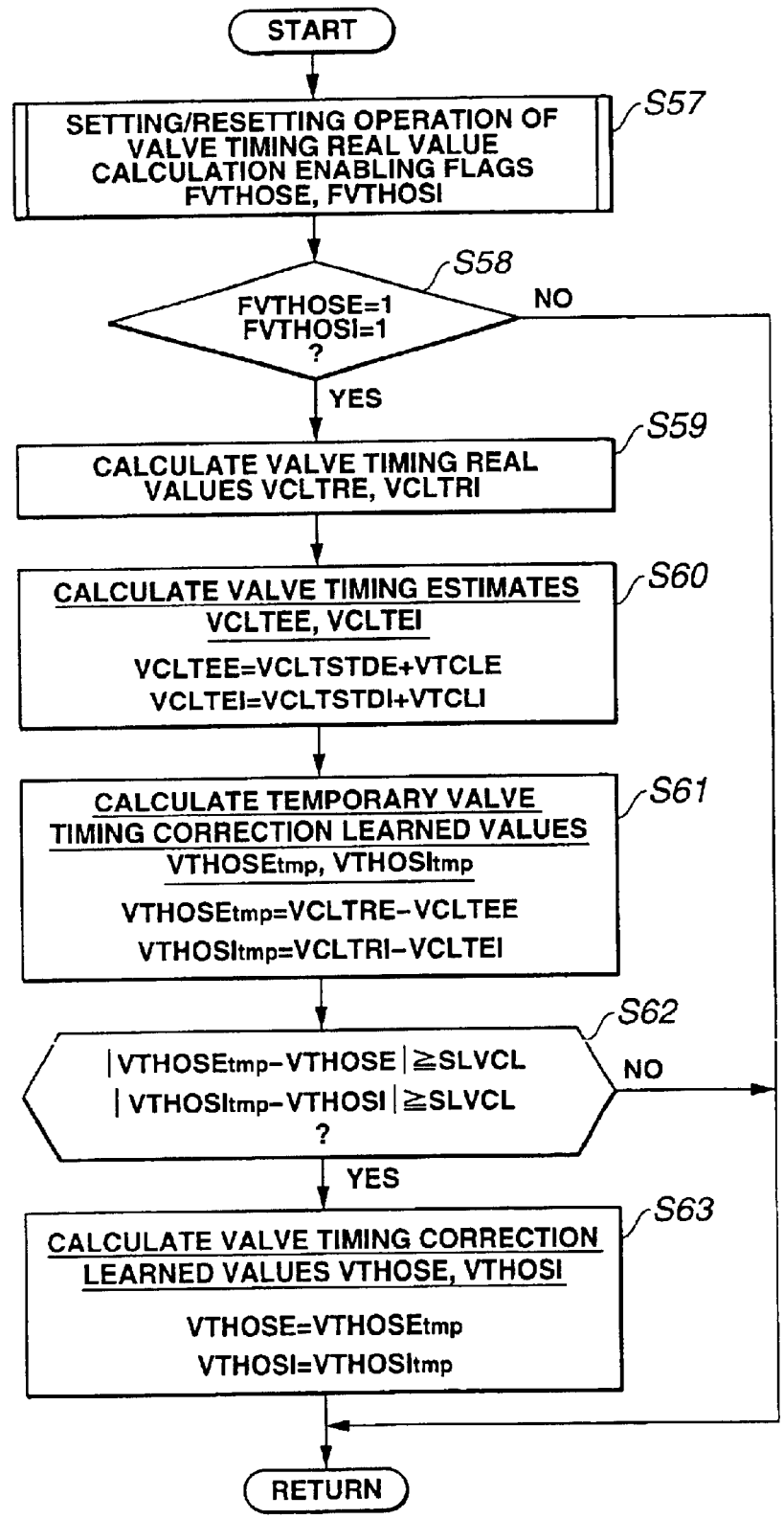
FIG. 32 is a flow chart showing a valve-timing-correction learned value (EVC-correction learned value VTHOSE and IVO-correction learned value VTHOSI) calculation routine.

At step S50 of FIG. 30, EVC variation learned value VTHOSE is calculated in accordance with the flow chart of FIG. 32. Then, at step S51, EVC variation VTEOFS is calculated based on (i) basic EVC variation VTCNOWE, (ii) exhaust-valve-temperature dependent EVC variation correction value VTCLE, which is calculated or retrieved based on a change in exhaust valve clearance VCLE, arising from a change in exhaust valve temperature VTMPE, and (iii) EVC-correction learned value VTHOSE, which is calculated based on a learned value for a change in exhaust valve clearance VCLE, arising from valve-train component-parts wear such as exhaust cam wear and shim wear, from the following expression (18).

$$VTEOFS = VTCNOWE + VTCLE + VTHOSE \qquad (18)$$

A way to calculate exhaust valve clearance VCLE (relating to step S48 of FIG. 30) is hereunder explained by reference to the block diagram of FIG. 25 and the valve clearance calculation routine of FIG. 31.

Figure 25:
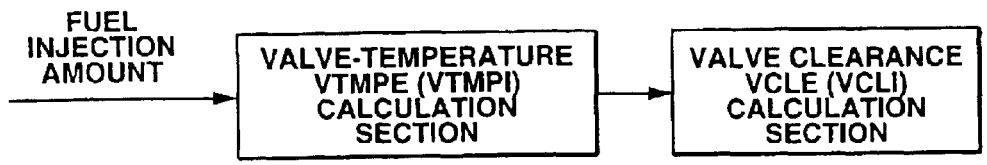
FIG. 25 is a block diagram relating to a valve clearance (exhaust valve clearance VCLE and intake valve clearance VCLI) calculation section.
Figure 37A:
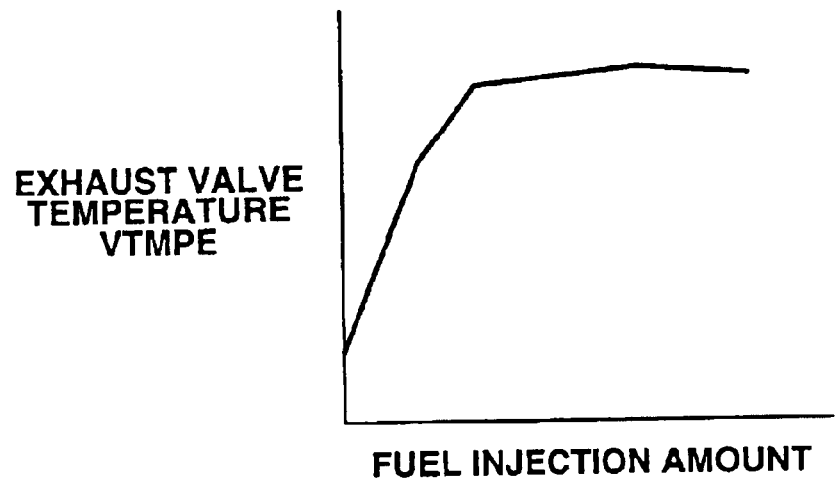
FIG. 37A is a preprogrammed lookup table showing the relationship between a fuel injection amount and an exhaust-valve temperature VTMPE.
Figure 37B:
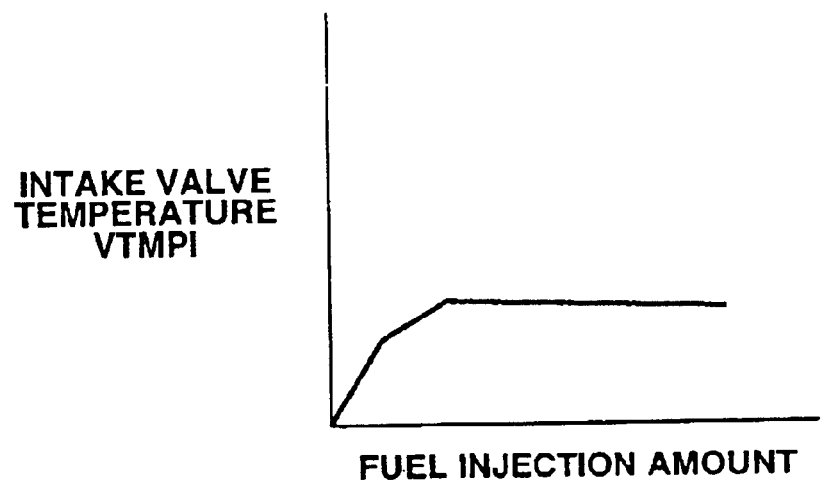
FIG. 37B is a preprogrammed lookup table showing the relationship between a fuel injection amount and an intake-valve temperature VTMPI.

As seen from the block diagram of FIG. 25, a valve temperature calculation section calculates or estimates exhaust valve temperature VTMPE (intake valve temperature VTMPI) based on a fuel injection amount correlated to engine load (see the lookup tables shown in FIGS. 37A and 37B) that is determined based on the intake-air quantity per cylinder (the fresh-air quantity per cylinder) MACYL computed based on the intake-air quantity measured by airflow meter 9. The valve clearance calculation section (or the valve clearance estimation section) calculates or estimates exhaust valve clearance VCLE (intake valve clearance VCLI) based on exhaust valve temperature VTMPE (intake valve temperature VTMPI). In the shown embodiment, although exhaust valve temperature VTMPE (intake valve temperature VTMPI) is map-retrieved based on the fuel injection amount (estimated based on the intake-air quantity per cylinder MACYL), in lieu thereof exhaust valve temperature VTMPE (intake valve temperature VTMPI) may be sensed or detected by means of a temperature sensor that directly senses an exhaust valve temperature (an intake valve temperature). In more detail, as seen from the flow chart of FIG. 31, at step S52, exhaust valve temperature VTMPE is calculated or retrieved based on the fuel injection amount from the predetermined steady-state exhaust valve temperature VTMPE lookup table of FIG. 37A how an exhaust valve temperature VTMPE has to be varied relative to a fuel injection amount. In a similar manner, at step S52, an intake valve temperature VTMPI is also calculated or retrieved based on the fuel injection amount from a predetermined steady-state intake valve temperature VTMPI lookup table of FIG. 37B how an intake valve temperature VTMPI has to be varied relative to a fuel injection amount (regarded as an engine load). The axis of abscissa of FIG. 37A indicates a fuel injection amount, whereas the axis of ordinate of FIG. 37A indicates exhaust valve temperature VTMPE correlated to engine load. The axis of abscissa of FIG. 37B indicates a fuel injection amount, whereas the axis of ordinate of FIG. 37B indicates intake valve temperature VTMPI correlated to engine load. As can be seen from the characteristic curves shown in FIGS. 37A and 37B, intake and exhaust valve temperatures VTMPI and VTMPE tend to rise, as the fuel injection amount increases. In order to compute or calculate a final fuel injection amount TI for fuel injection control, first, a basic fuel injection amount TP (corresponding to a stoichiometric A/F ratio) is calculated from the expression TP=K×MACYL/NRPM, where K is a constant, MACYL denotes the intake-air quantity per cylinder monitored by airflow meter 9 and NRPM denotes the engine speed detected by crank angle sensor 14. Final fuel injection amount TI is calculated by compensating for basic fuel injection amount TP depending on at least one of target combustion equivalent ratio TFBYA and an A/F feedback correction coefficient LAMBDA as follows.

$$TI=TP \times TFBYA \times LAMBDA \qquad (19)$$

Figure 31:
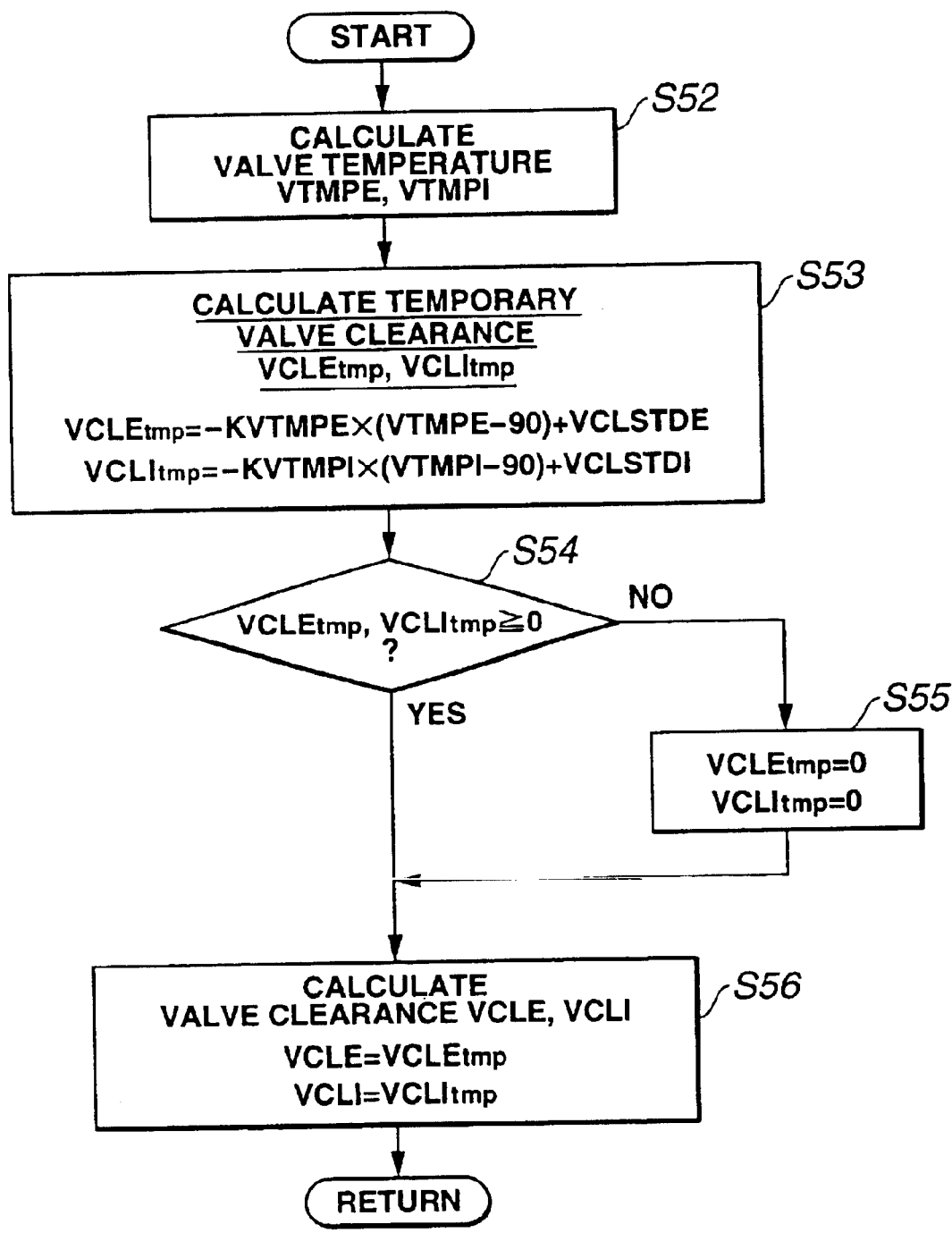
FIG. 31 is a flow chart showing a valve clearance (exhaust valve clearance VCLE and intake valve clearance VCLI) calculation routine.

At step S53 of FIG. 31, a temporary exhaust valve clearance $VCLE_{tmp}$ is arithmetically calculated based on exhaust valve temperature VTMPE from the following expression (20).

$$VCLE_{tmp}=-KVTMPE \times (VTMPE-90)+VCLSTDE \qquad (20)$$

where −KVTMPE denotes a coefficient determined depending on a material and of exhaust valve 6 and a length of the exhaust valve stem, mainly taking into account an amount of thermal expansion of the exhaust valve stem in the axial direction of exhaust valve 6 but not taking into account of an amount of thermal expansion of the engine cylinder head and the like, and VCLSTDE denotes a reference exhaust valve clearance at a predetermined reference exhaust valve temperature of 90° C., and thus {−KVTMPE×(VTMPE−90)} means a decrease in the exhaust valve clearance, arising from the rise in exhaust valve temperature VTMPE from the predetermined reference exhaust valve temperature of 90° C. As can be appreciated from the expression (20), temporary exhaust valve clearance $VCLE_{tmp}$ tends to reduce, as exhaust valve temperature VTMPE rises.

In the same manner as temporary exhaust valve clearance $VCLE_{tmp}$, at step S53 of FIG. 31, a temporary intake valve clearance $VCLI_{tmp}$ is arithmetically calculated based on intake valve temperature VTMPI from the following expression (21).

$$VCLI_{tmp}=-KVTMPI \times (VTMPI-90)+VCLSTDI \qquad (21)$$

where −KVTMPI denotes a coefficient determined depending on a material and of intake valve 5 and a length of the intake valve stem, mainly taking into account an amount of thermal expansion of the intake valve stem in the axial direction of intake valve 5 but not taking into account of an amount of thermal expansion of the engine cylinder head and the like, and VCLSTDI denotes a reference intake valve clearance at a predetermined reference intake valve temperature of 90° C., and thus {−KVTMPI×(VTMPI−90)} means a decrease in the intake valve clearance, arising from the rise in intake valve temperature VTMPI from the predetermined reference intake valve temperature of 90° C. As can be appreciated from the above expression (21), temporary intake valve clearance $VCLI_{tmp}$ tends to reduce, as intake valve temperature VTMPI rises.

At step S54 of FIG. 31, a check is made to determine whether temporary exhaust valve clearance $VCLE_{tmp}$ is greater than or equal to "0". When the answer to step S54 is affirmative (YES), i.e., in case of $VCLE_{tmp} \geq 0$, the routine proceeds from step S54 to step S56. Conversely when the answer to step S54 is negative (NO), i.e., in case of $VCLE_{tmp}<0$, the routine proceeds from step S54 to step S55. At step S55, temporary exhaust valve clearance $VCLE_{tmp}$ is set to "0", that is, $VCLE_{tmp}=0$. Thereafter, the routine flows from step S55 to S56. At step S56, exhaust valve clearance VCLE is replaced with temporary exhaust valve clearance $VCLE_{tmp}$, that is, $VCLE=VCLE_{tmp}$. A series of steps S52–S56 of FIG. 31, are necessary to set exhaust valve clearance VCLE to a value greater than or equal to "0", since exhaust valve clearance VCLE never becomes a negative value. A series of steps S52–S56 of FIG. 31, are also necessary to set intake valve clearance VCLI to a value greater than or equal to "0", since intake valve clearance VCLI never becomes a negative value.

A way to calculate EVC-correction learned value VTHOSE (relating to step S50 of FIG. 30) is hereunder explained by reference to the block diagram of FIG. 26 and the valve-timing-correction learned value (in particular, EVC-correction learned value VTHOSE) calculation routine of FIG. 32.

Figure 26:
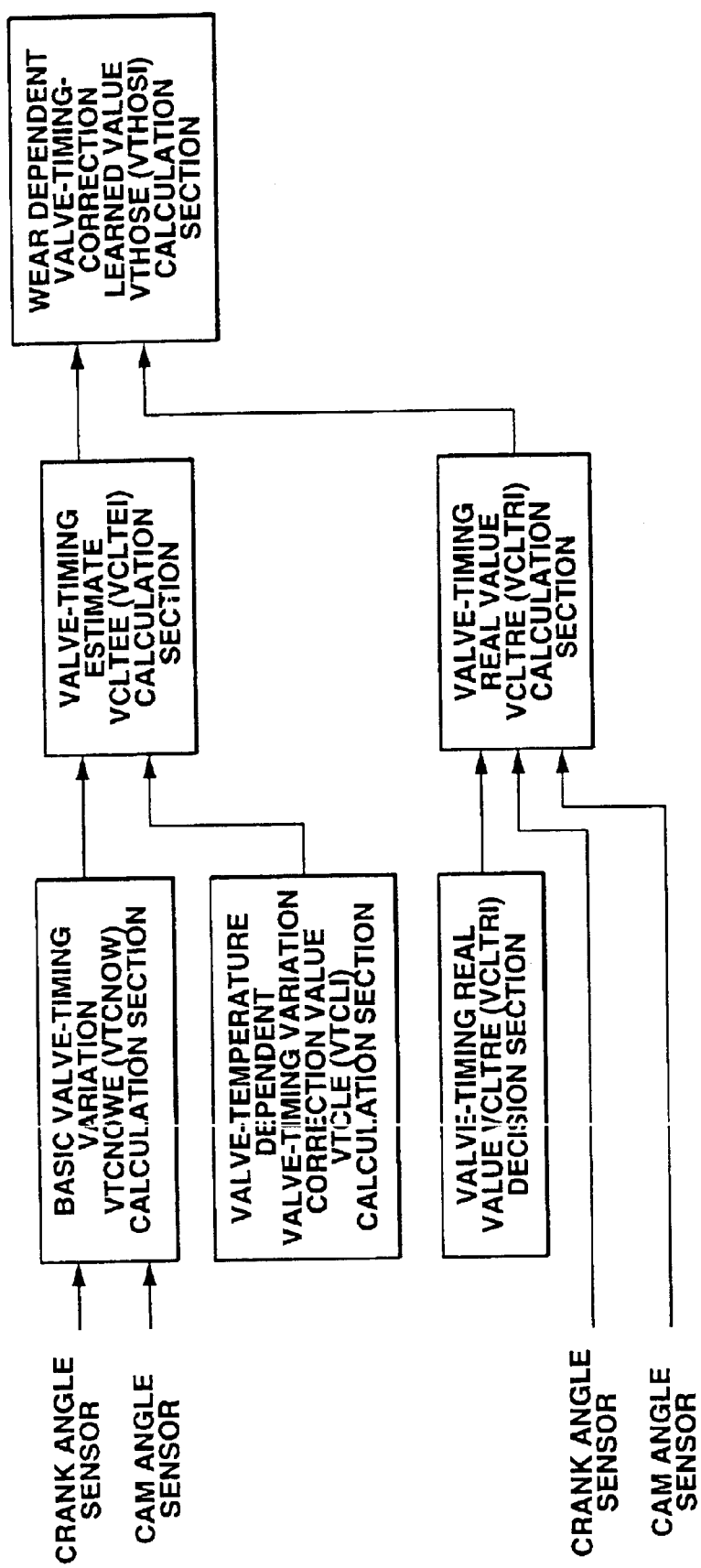
FIG. 26 is a block diagram relating to a valve-timing-correction learned value (EVC-correction learned value VTHOSE and IVO-correction learned value VTHOSI) calculation section.

As seen from the block diagram of FIG. 26, the basic valve-timing variation calculation section calculates the basic valve-timing variation VTCNOWE (VTCNOW), that is, a variation of angular phase of the exhaust camshaft relative to the engine crankshaft (a variation of angular phase of the intake camshaft relative to the engine crankshaft), based on latest up-to-date information regarding the relative position of the engine crankshaft, detected based on a signal from crank angle sensor 14, and the cam angle of the exhaust camshaft (the intake camshaft), detected based on a signal from exhaust-valve cam angle sensor 17 (exhaust-valve cam angle sensor 16). The valve-temperature dependent valve-timing variation correction value calculation section calculates exhaust-valve-temperature dependent EVC variation correction value VTCLE based on exhaust valve clearance VCLE (intake-valve-temperature dependent IVO variation correction value VTCLI based on intake valve clearance VCLI). A valve-timing estimate calculation section calculates or estimates an EVC estimate VCLTEE based on both of basic EVC variation VTCNOWE and exhaust-valve-temperature dependent EVC variation correction value VTCLE (an IVO estimate VCLTEI based on both of basic IVO variation VTCNOW and intake-valve-temperature dependent IVO variation correction value VTCLI). On the other hand, a valve-timing real value calculation section calculates an EVC real value VCLTRE (an IVO real value VCLTRI) based on latest up-to-date information regarding the relative position of the engine crankshaft, detected based on a signal from crank angle sensor 14, and the frequency of oscillatory seating motion of exhaust valve 6 (intake valve 5), detected based on a signal from knock sensor 25, taking into account the decision result of a valve-timing real value decision section (exactly, a valve-timing real value calculation enabling-condition decision section, which will be fully described in detail by reference to the flow chart of FIG. 33). Finally, the valve-timing-correction learned value calculation section calculates the valve-timing-correction learned value (exactly, the valve-train component-parts wear dependent valve-timing-correction learned value) VTHOSE (VTHOSI), based on both of valve-timing estimate VCLTEE (VCLTEI) and valve-timing real value VCLTRE (VCLTRI). In more detail, at step 557 of FIG. 32, a valve timing real value calculation enabling flag (an EVC real value calculation enabling flag FVTHOSE and an IVO real value calculation enabling flag FVTHOSI) is calculated (set or reset) in accordance with the flow chart shown in FIG. 33 (described later). At step 558, a check is made to determine whether the valve timing real value calculation enabling flag (each of Eve real value calculation enabling flag FVTHOSE and IVO real value calculation enabling flag FVTMOSI) is set to "1". The result of step S58 is used to determine whether the engine is conditioned in the valve timing detectable engine operating state suited to precisely detect or extract EVC real value VCLTRE (IVO real value VCLTRI). When EVC real value calculation enabling flag FVTHOSE (IVO real value calculation enabling flag FVTHOSI) is set to "1", the routine proceeds from step S58 to step S59. Conversely when EVC real value calculation enabling flag FVTHOSE (IVO real value calculation enabling flag FVTHOSI) is reset to 0% one execution cycle of the routine of FIG. 32 terminates. At step S59, the actual valve-seating timing of exhaust valve 6 (the actual valve-seating timing of intake valve 5), in other words, EVC real value VCLTRE (IVO real value VCLTRI) is calculated based on latest up-to-date information regarding the relative position of the engine crankshaft, detected based on a signal from crank angle sensor 14, and the frequency of oscillatory seating motion of exhaust valve 6 (intake valve 5), detected based on a signal from knock sensor 25. At step S60, EVC estimate VCLTEE (IVO estimate VCLTEI) is arithmetically calculated based on both of a reference exhaust valve closure timing VCLTSTDE (a reference intake valve open timing VCLTSTDI) and exhaust-valve-temperature dependent EVC variation correction value VTCLE (intake-valve-temperature dependent IVO variation correction value VTCLI), from the expression (22) (the expression (23)).

$$VCLTEE=VCLTSTDE+VTCLE(degATDC) \quad (21)$$

$$VCLTEI=VCLTSTDI+VTCLI(degATDC) \quad (23)$$

where reference exhaust valve closure timing VCLTSTDE means an exhaust valve closure timing obtained when basic EVC variation VTCNOWE is zero at reference exhaust valve clearance VCLSTDE, and reference intake valve open timing VCLTSTDI means an intake valve open timing obtained when basic IVO variation VTCNOW is zero at reference intake valve clearance VCLSTDI.

At step S61 of FIG. 32, a temporary EVC-correction learned value $VTHOSE_{tmp}$ is calculated as a difference or a valve timing error (VCLTRE−VCLTEE) between EVC real value VCLTRE and EVC estimate VCLTEE, that is, $VTHOSE_{tmp}$=VCLTRE−VCLTEE. In a similar manner, a temporary IVO-correction learned value $VTHOSI_{tmp}$ is calculated as a difference (VCLTRI−VCLTEI) between IVO real value VCLTRI and IVO estimate VCLTEI, that is, $VTHOSI_{tmp}$=VCLTRI−VCLTEI.

At step S62, a check is made to determine whether the absolute value $|VTHOSE_{tmp}-VTHOSE|$ of a deviation of temporary EVC-correction learned value $VTHOSE_{tmp}$ from the current value of EVC-correction learned value VTHOSE is greater than or equal to a predetermined threshold value SLVCL. When the answer to step S62 is affirmative (YES), that is, in case of $|VTHOSE_{tmp}-VTHOSE| \geq SLVCL$, the routine proceeds from step S62 to step S63. On the contrary when the answer to step S62 is negative (NO), that is, in case of $|VTHOSE_{tmp}-VTHOSE|<SLVCL$, one execution cycle of the routine of FIG. 32 terminates. The condition defined by the inequality $|VTHOSE_{tmp}-VTHOSE_{tmp}| \geq SLVCL$ means that motion-transmitting valve-train component parts wear such as cam and shim wear develops considerably. Thus, at step S63, EVC-correction learned value VTHOSE is updated by substituting temporary EVC-correction learned value $VTHOSE_{tmp}$ for EVC-correction learned value VTHOSE, that is, $VTHOSE=VTHOSE_{tmp}$. When exhaust valve clearance VCLE of exhaust valve 6 increases owing to an increase in exhaust cam and shim wear, the actual exhaust valve closure timing tends to phase-advance. The phase advance of the actual EVC means a decrease in the valve overlap, in other words, a negative EVC variation.

In a similar manner, at step S62, a check is made to determine whether the absolute value $|VTHOSI_{tmp}-VTHOSI|$ of a deviation of temporary IVO-correction learned value $VTHOSI_{tmp}$ from the current value of IVO-correction learned value VTHOSI is greater than or equal to predetermined threshold value SLVCL. When the answer to step S62 is affirmative (YES), that is, in case of $|VTHOSI_{tmp}-VTHOSI| \geq SLVCL$, the routine proceeds from step S62 to step S63. On the contrary when the answer to step S62 is negative (NO), that is, in case of $|VTHOSI_{tmp}-VTHOSI|<SLVCL$, one execution cycle of the routine of FIG. 32 terminates. The condition defined by the inequality $|VTHOSI_{tmp}-VTHOSI| \leq SLVCL$ means that motion-transmitting valve-train component parts wear such as cam and shim wear develops considerably. Thus, at step S63, IVO-correction learned value VTHOSI is updated by substituting temporary IVO-correction learned value $VTHOSI_{tmp}$ for IVO-correction learned value VTHOSI, that is, $VTHOSI=VTHOSI_{tmp}$. When intake valve clearance VCLI of intake valve 5 increases owing to an increase in intake cam and shim wear, the actual intake valve open timing tends to phase-retard. The phase retard of the actual IVO means a decrease in the valve overlap, in other words, a negative IVO variation.

A way to calculate the valve timing real value calculation enabling flag, i.e., EVC real value calculation enabling flag FVTHOSE and IVO real value calculation enabling flag FVTHOSI (relating to step S57 of FIG. 32) is hereunder explained by reference to the valve timing real value calculation enabling flag (EVC real value calculation enabling flag FVTHOSE and IVO real value calculation enabling flag FVTHOSI) calculation routine shown in FIG. 33.

Figure 33:
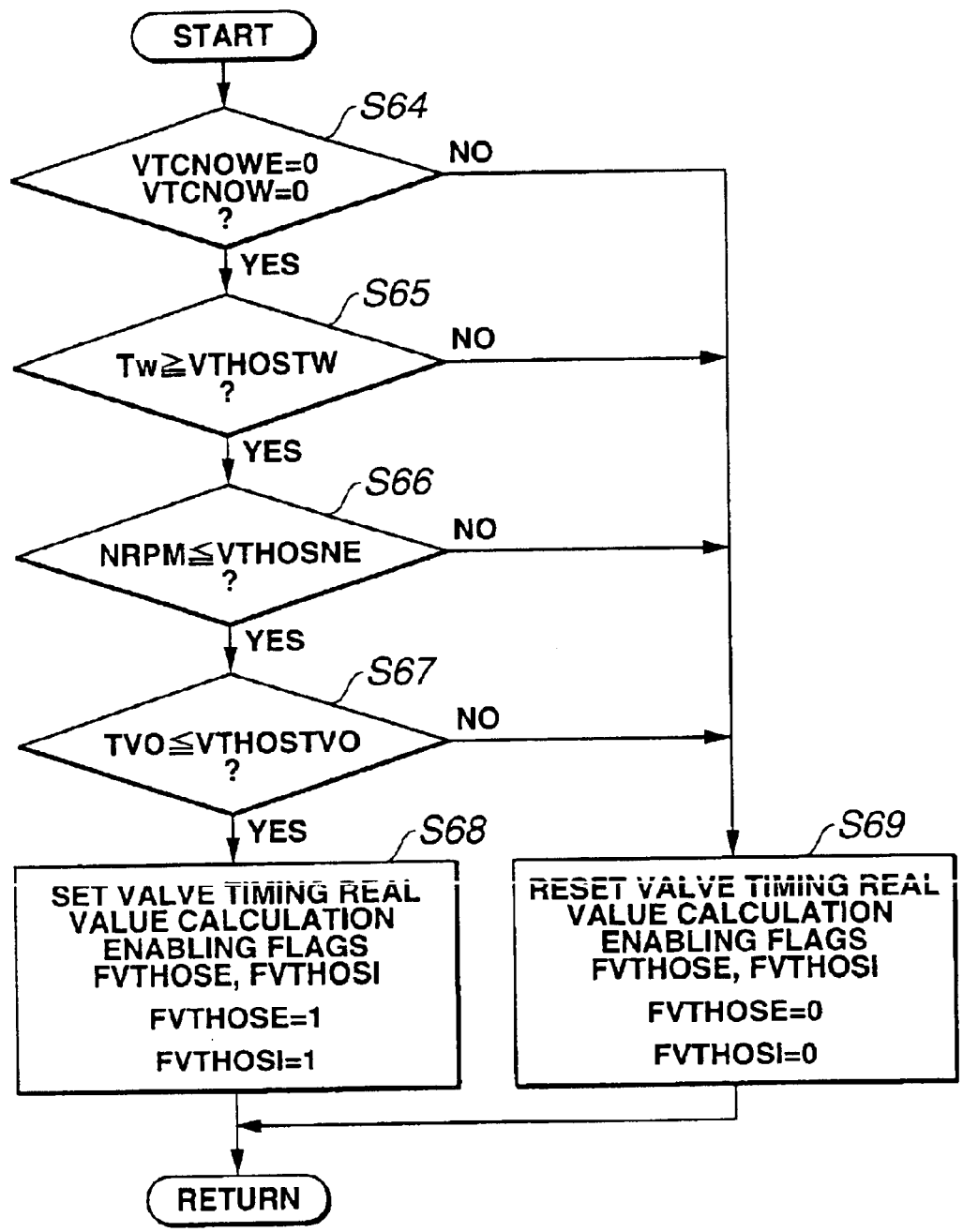
FIG. 33 is a flow chart showing an actual valve timing (actual exhaust valve closure timing VCLTRE and actual intake valve open timing VCLTRI) calculation enabling flag setting/resetting routine.

At step S64 of FIG. 33, a check is made to determine whether the basic valve timing variation, namely, basic EVC variation VTCNOWE (basic IVO variation VTCNOW) is "0", that is, VTCNOWE=0 (VTCNOW=0).

At step S65, a check is made to determine whether the engine temperature, namely, engine coolant temperature Tw is greater than or equal to a predetermined temperature value VTHOSTW, that is, Tw≧VTHOSTW.

At step S66, a check is made to determine whether the engine speed NRPM is less than or equal to a predetermined speed value VTHOSNE, that is, NRPM≦VTHOSNE.

At step S67, a check is made to determine whether the throttle opening TVO is less than or equal to a predetermined throttle opening VTHOSTVO, that is, TVO≦VTHOSTVO. Throttle opening TVO is computed or estimated based on a signal from the ECU to the throttle actuator of electronically-controlled throttle valve 19.

When the answers to steps S64–S67 are all in the affirmative (YES), that is, the conditions defined by VTCNOWE=0 (VTCNOW=0), Tw≧VTHOSTW, NRPM≦VTHOSNE, and TVO≦VTHOSTVO are all satisfied, the routine proceeds to step S68. Satisfying all of the conditions defined by VTCNOWE=0 (VTCNOW=0), Tw≧VTHOSTW, NRPM≦VTHOSNE, and TVO≦VTHOSTVO means that the engine is conditioned in the valve timing detectable engine operating state suited to precisely detect or extract EVC real value VCLTRE (IVO real value VCLTRI). Thus, at step S68, EVC real value calculation enabling flag FVTHOSE (IVO real value calculation enabling flag FVTHOSI) is set to "1", that is, FVTHOSE=1 (FVTHOSI=1). Conversely when at least one of the answers to steps S64–S67 is in the negative (NO), that is, at least one of the conditions defined by VTCNOWE=0 (VTCNOW=0), Tw≦VTHOSTW, NRPM≦VTHOSNE, and TVO≦VTHOSTVO is unsatisfied, the routine proceeds to step S69. Unsatisfying at least one of the conditions defined by VTCNOWE=0 (VTCNOW=0), Tw≧VTHOSTW, NRPM≦VTHOSNE, and TVO≦VTHOSTVO means that the engine is not conditioned in the valve timing detectable engine operating state suitable for precise detection or extraction of EVC real value VCLTRE (IVO real value VCLTRI). Thus, at step S69, EVC real value calculation enabling flag FVTHOSE (IVO real value calculation enabling flag FVTHOSI) is reset to "0", that is, FVTHOSE=0 (FVTHOSI=0).

Figure 34:
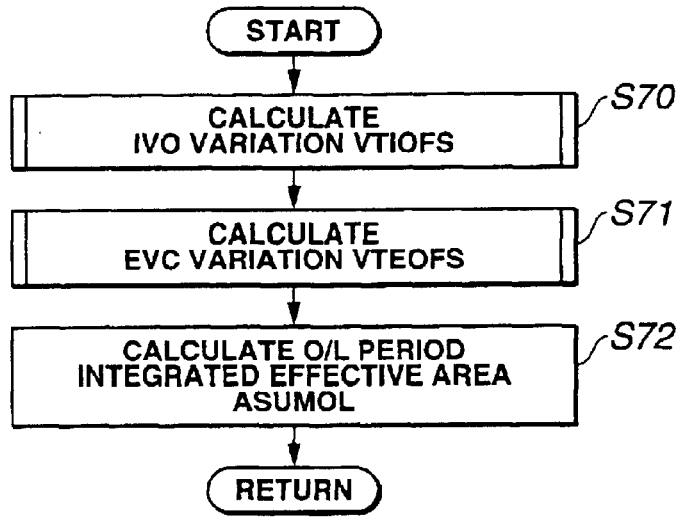
FIG. 34 is a flow chart showing a valve overlap period integrated effective area ASUMOL (unit: m³) calculation routine.

A way to calculate O/L period integrated effective area ASUMOL (relating to step S14 of FIG. 11) is hereunder described in detail by reference to the block diagram of FIG. 27 and the O/L period integrated effective area ASUMOL (unit: m$^3$) calculation routine of FIG. 34.

Figure 27:
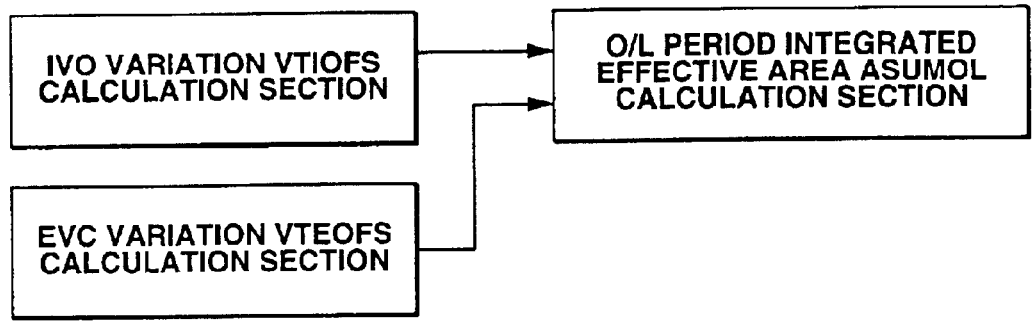
FIG. 27 is a block diagram relating to a valve overlap period integrated effective area ASUMOL (unit: m³) calculation section.
Figure 38:
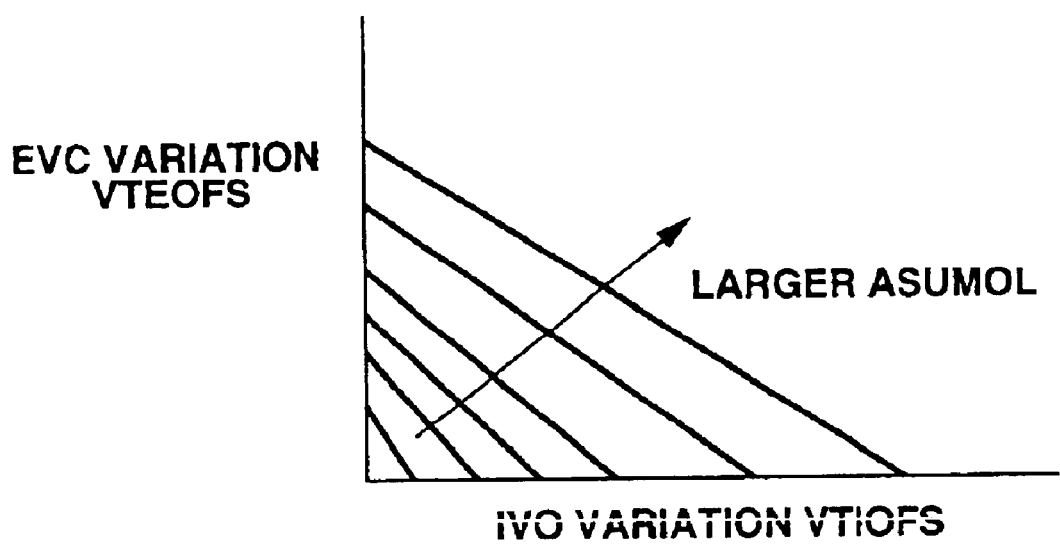
FIG. 38 is a characteristic map showing the relationship among EVC variation VTEOFS, IVO variation VTIOFS, and valve overlap period integrated effective area ASUMOL.

As seen from the block diagram of FIG. 27, the O/L period integrated effective area ASUMOL calculation section arithmetically calculates O/L period integrated effective area ASUMOL based on the calculated values, namely the variation VTIOFS of intake valve open timing IVO calculated by the IVO variation VTIOFS calculation section and the variation VTEOFS of exhaust valve closure timing EVC calculated by the EVC variation VTEOFS calculation section. In more detail, at step S70 of FIG. 34 IVO variation VTIOFS is calculated in accordance with the flow chart shown in FIG. 35. In a similar manner to step S70, at step S71 EVC variation VTEOFS is calculated in accordance with the flow chart shown in FIG. 30. Lastly at step S72, O/L period integrated effective area ASUMOL is determined based on both of IVO variation VTIOFS and EVC variation VTEOFS, from a predetermined VTIOFS-VTEOFS-ASUMOL characteristic map shown in FIG. 38. The axis of abscissa of FIG. 38 indicates an IVO variation VTIOFS, whereas the axis of ordinate of FIG. 38 indicates an EVC variation VTEOFS. As can be seen from the characteristic map of FIG. 38, O/L period integrated effective area ASUMOL, that is, the variation VTCOL of valve overlap O/L, tends to increase, as at least one of IVO variation VTIOFS and EVC variation VTEOFS increases.

A way to calculate IVO variation VTIOFS (relating to step S70 of FIG. 34) is hereunder explained by reference to the block diagram of FIG. 28 and the IVO variation VTIOFS calculation routine of FIG. 35.

Figure 28:
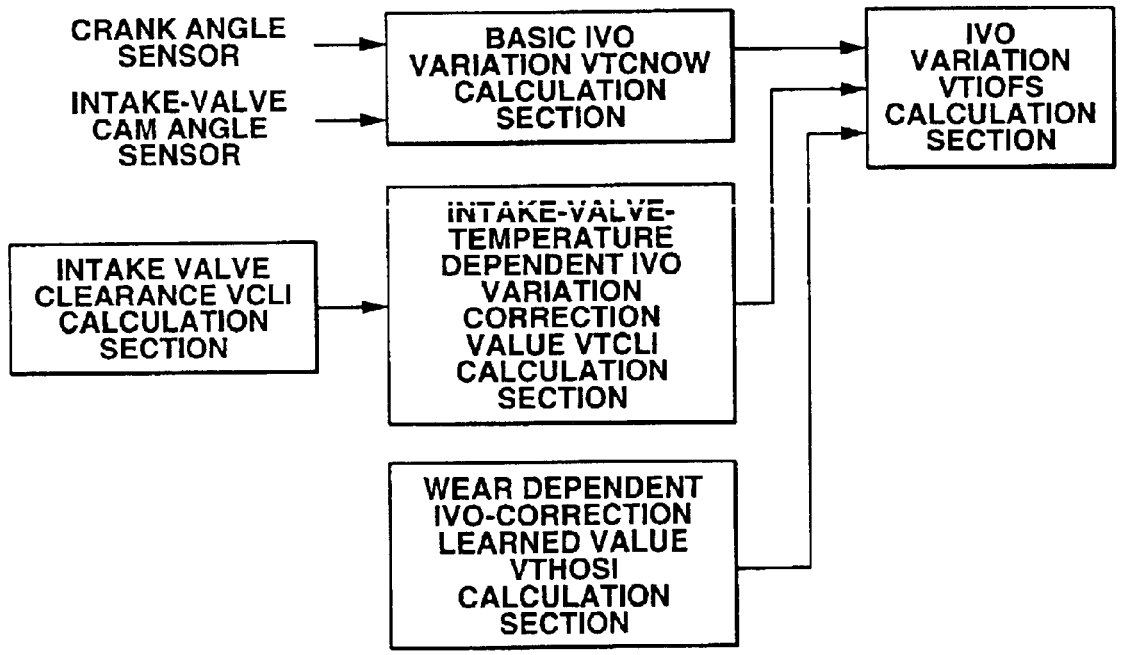
FIG. 28 is a block diagram relating to an IVO variation VTIOFS calculation section.

As seen from the block diagram of FIG. 28, a basic IVO variation calculation section calculates a basic IVO variation VTCNOW (a variation of angular phase of the intake camshaft relative to the engine crankshaft), based on latest up-to-date information regarding the relative position of the engine crankshaft, detected based on a signal from crank angle sensor 14, and the cam angle of the intake camshaft, detected based on a signal from intake-valve cam angle sensor 16. An intake-valve-temperature dependent IVO variation correction value calculation section calculates an intake-valve-temperature dependent IVO variation correction value VTCLI based on an intake valve clearance VCLI that is calculated or estimated by an intake valve clearance calculation section (or an intake valve clearance estimation section). An IVO-correction learned value calculation section (exactly, a valve-train component-parts wear dependent IVO-correction learned value calculation section) calculates an IVO-correction learned value (exactly, a valve-train component-parts wear dependent IVO-correction learned value) VTHOSI (see the flow chart shown in FIG. 32). A final IVO variation calculation section calculates IVO variation VTIOFS based on basic IVO variation VTCNOW, intake-valve-temperature dependent IVO variation correction value VTCLI, and IVO-correction learned value VTHOSI. In more detail, at step S73 of FIG. 35, basic IVO variation VTCNOW is calculated based on the signals from crank angle sensor 14 and intake-valve cam angle sensor 16. At step S74, intake valve clearance VCLI is calculated in accordance with the flow chart of FIG. 31 discussed previously.

Figure 36B:
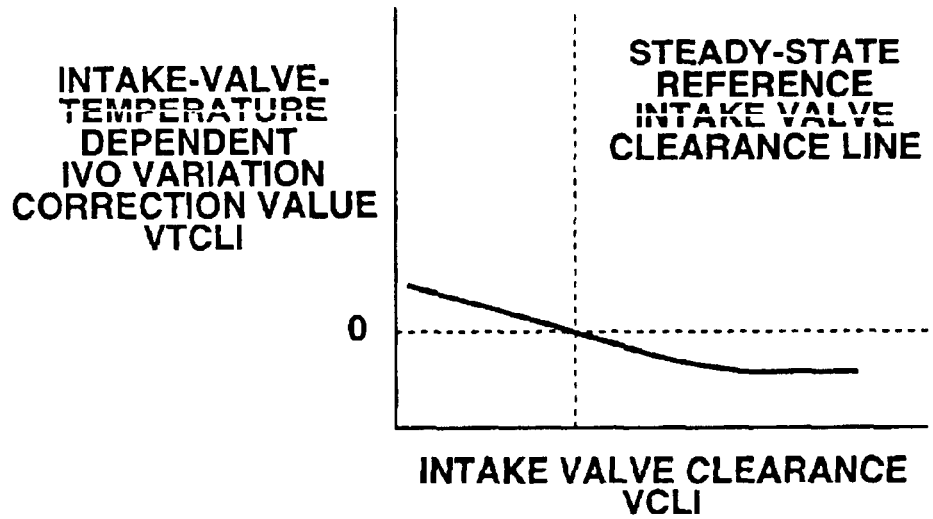
FIG. 36B is a preprogrammed lookup table showing the relationship between an intake valve clearance VCLI and an intake-valve temperature dependent IVO-variation correction value VTCLI.

At step S75, intake-valve-temperature dependent IVO variation correction value VTCLI is based on intake valve clearance VCLI from a predetermined VCLI-VTCLI lookup table of FIG. 36B showing how an intake-valve-temperature dependent IVO variation correction value VTCLI has to be varied relative to an intake valve clearance VCLI. More concretely, in the lookup table of FIG. 36B, the vertical broken line indicates a reference intake valve clearance line at the steady state, the axis of abscissa of FIG. 36B indicates intake valve clearance VCLI, and the axis of ordinate of FIG. 36B indicates an intake-valve-temperature dependent IVO variation correction value VTCLI, that is, a deviation from an intake valve closure timing IVO corresponding to the steady-state reference intake valve clearance. As can be seen from the VCLI-VTCLI lookup table of FIG. 36B, when intake valve clearance VCLI of intake valve 5 decreases owing to a rise in an intake valve temperature VTMPI (see the left-hand characteristic curve of the steady-state reference intake valve clearance line), the actual intake valve closure timing tends to phase-advance by a phase angle corresponding to intake-valve-temperature dependent IVO variation correction value VTCLI. The phase advance of the actual IVO means an increase in the valve overlap, and thus the intake-valve-temperature dependent IVO variation is increasingly compensated for based on a minus deviation of intake valve clearance VCLI from the steady-state reference intake valve clearance, in accordance with the characteristic curve of FIG. 36B. Conversely when intake valve clearance VCLI increases owing to a drop in intake valve temperature VTMPI (see the right-hand characteristic curve of the steady-state reference intake valve clearance line), the actual intake valve open timing tends to phase-retard by a phase angle corresponding to intake-valve-temperature dependent IVO variation correction value VTCLI. The phase retard of the actual IVO means a decrease in the valve overlap, and thus the intake-valve-temperature dependent IVO variation is decreasingly compensated for based on a plus deviation of intake valve clearance VCLI from the steady-state reference intake valve clearance, in accordance with the characteristic curve of FIG. 36B.

Figure 35:
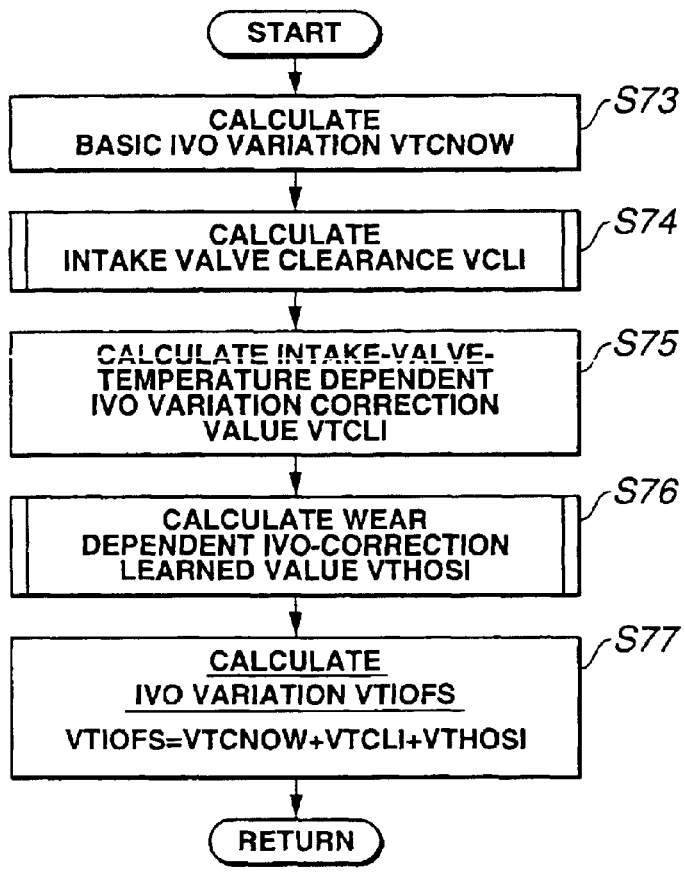
FIG. 35 is a flow chart showing an IVO variation VTIOFS calculation routine.

At step S76 of FIG. 35, IVO variation learned value VTHOSI is calculated in accordance with the flow chart of FIG. 32. Then, at step S77, IVO variation VTIOFS is calculated based on (i) basic IVO variation VTCNOW, (ii) intake-valve-temperature dependent IVO variation correction value VTCLI, which is calculated or retrieved based on a change in intake valve clearance VCLI, arising from a change in intake valve temperature VTMPI, and (iii) IVO-correction learned value VTHOSI, which is calculated based on a learned value for a change in intake valve clearance VCLI, arising from valve-train component-parts wear such as intake cam wear and shim wear, from the following expression (24).

$$VTIOFS = VTCNOW + VTCLI + VTHOSI \qquad (24)$$

Figure 39:
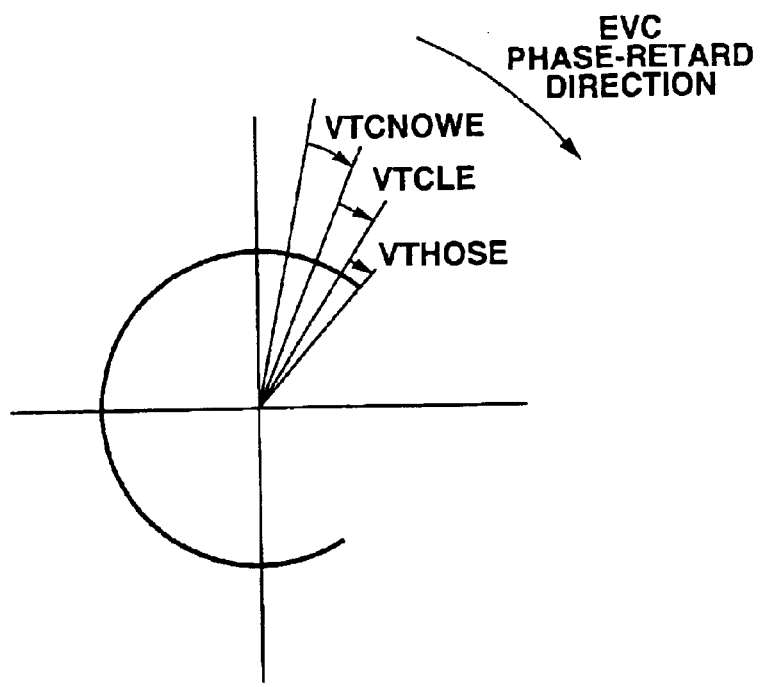
FIG. 39 is an explanatory drawing showing a direction (clockwise direction) of a positive variation in EVC.
Figure 40:
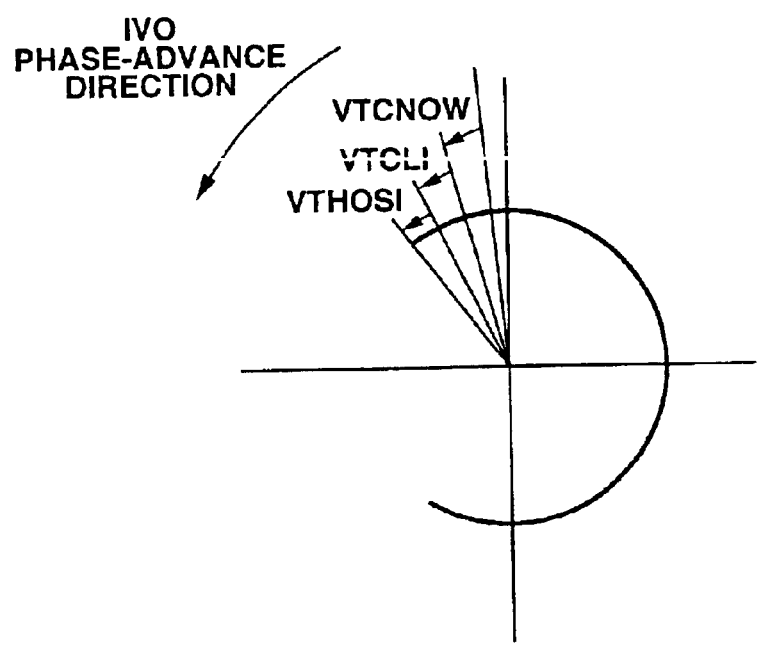
FIG. 40 is an explanatory drawing showing a direction (anticlockwise direction) of a negative variation in IVO.

Referring now to FIGS. 39 and 40, there are shown the relationship between the direction of a variation of exhaust valve closure timing EVC and the sign of EVC variation VTEOFS based on basic EVC variation VTCNOWE, exhaust-valve-temperature dependent EVC variation correction value VTCLE, and EVC-correction learned value VTHOSE, and the relationship between the direction of a variation of intake valve open timing IVO and the sign of IVO variation VTIOFS based on basic IVO variation VTCNOW, intake-valve-temperature dependent IVO variation correction value VTCLI, and IVO-correction learned value VTHOSI. As can be seen from the diagrams of FIGS. 39 and 40, the positive sign of EVC variation VTEOFS is defined as a valve overlap (O/L) increase direction, that is, an EVC retard direction (a clockwise direction in FIG. 39), whereas the positive sign of IVO variation VTIOFS is defined as an O/L increase direction, that is, an IVO advance direction (an anti-clockwise direction in FIG. 40).

As will be appreciated from the above, the internal EGR amount estimation system of the embodiment described previously, includes the EVC in-cylinder temperature calculation section (serving as an EVC in-cylinder temperature calculation means) that calculates EVC in-cylinder temperature TEVC (see step S10), the EVC in-cylinder pressure calculation section (serving as an EVC in-cylinder pressure calculation means) that calculates EVC in-cylinder pressure PEVC (see step S11), the exhaust-gas gas constant calculation section (serving as an exhaust-gas gas constant calculation means) that calculates exhaust-gas gas constant REX (see step S9) based on target combustion equivalent ratio TFBYA, the EVC in-cylinder residual gas amount calculation section (serving as an EVC in-cylinder residual gas amount calculation means) that calculates EVC in-cylinder residual gas amount MRESCYL (see step S12) based on at least the EVC in-cylinder temperature TEVC, EVC in-cylinder pressure PEVC, and exhaust-gas gas constant REX, and the O/L period blow-back gas amount calculation section (serving as an O/L period blow-back gas amount calculation means) that calculates O/L period blow-back gas amount MRESOL (see step S25) based on (i) temporary O/L period blow-back gas amount $MRESOL_{tmp}$ properly calculated depending on both of supercharging-phenomenon decision flag TBCRG and choking-phenomenon decision flag CHOKE and (ii) O/L period integrated effective area ASUMOL. The internal EGR amount per cylinder MRES (unit: kg) is arithmetically calculated by adding O/L period blow-back gas amount MRESOL to EVC in-cylinder residual gas amount MRESCYL (see step S7). Therefore, internal EGR amount per cylinder MRES can be calculated or estimated from the previously-noted physical expression (3), on the basis of quantities of state of the inside of the cylinder after combustion has been completed, that is, EVC in-cylinder temperature TEVC, EVC in-cylinder pressure PEVC, and exhaust-gas gas constant REX. Additionally, according to the system of the embodiment, internal EGR amount per cylinder MRES can be more precisely estimated regardless of the engine operating conditions, since internal EGR amount per cylinder MRES is suitably compensated for responsively to a change in the density of gas, flowing between intake and exhaust ports 5p and 6p via combustion chamber 3 during a valve overlap period, the gas flow being created by the pressure difference between the pressure in the intake port and the pressure in the exhaust port. The change in gas density occurs owing to a temperature TEVC change and a pressure PEVC change of the gas flowing between intake and exhaust ports 5p and 6p via combustion chamber 3 during a valve overlap period, and/or owing to a change in exhaust-gas gas constant REX that varies due to a change in the air-fuel mixture ratio (that is, a change in the combustion equivalent ratio (see the lookup table of FIG. 18). Even in a transient state where quantities of state of the inside of the cylinder are continuously changing, internal EGR amount per cylinder MRES can be suitably compensated for and accurately estimated responsively to a change in each of the quantities of state of the inside of the cylinder during the valve overlapping period. This greatly enhances the accuracy of estimation of internal EGR amount per cylinder MRES in transient engine operating conditions. By virtue of such very precise estimation of internal EGR amount per cylinder MRES, it is possible to suitably control the ignition timing, the fuel injection amount, the IVO, IVC, EVO, and EVC (in particular, the valve overlapping period from the beginning-of-valve-overlap crank angle, i.e., IVO to the end-of-valve-overlap crank angle, i.e., EVC), during operation of the engine. As may be appreciated from the above, it will be understood that the sort of parameters and the number of parameters needed to calculate or estimate internal EGR amount per cylinder MRES are not limited to the particular embodiment shown and described herein. For instance, even in a higher-order control structure further including an additional parameter, internal EGR amount per cylinder MRES can be more precisely calculated fundamentally from the previously-discussed physical expression (3), and thereafter the controlled variable for each parameter is determined based on the internal EGR amount per cylinder MRES calculated, so as to more precisely control the ignition timing, the A/F mixture ratio, and the valve overlapping period.

Additionally, the internal EGR amount estimation system of the embodiment described previously, further includes the EVC in-cylinder volumetric capacity calculation section (serving as an EVC in-cylinder volumetric capacity calculation means) that calculates EVC in-cylinder volumetric capacity VEVC (see step S8). EVC in-cylinder residual gas amount MRESCYL (unit: kg) can be arithmetically calculated based on the calculated values VEVC, REX, TEVC, and PEVC, from the physical expression (4). Therefore, internal EGR amount per cylinder MRES can be calculated or estimated from the previously-noted physical expression (3), on the basis of quantities of state of the inside of the cylinder after combustion has been completed, that is, EVC in-cylinder volumetric capacity VEVC, EVC in-cylinder temperature TEVC, EVC in-cylinder pressure PEVC, and exhaust-gas gas constant REX. In this case, internal EGR amount per cylinder MRES can be more precisely estimated regardless of the engine operating conditions, since internal EGR amount per cylinder MRES is suitably compensated for responsively to a gas-density change of the gas flow between intake and exhaust ports 5p and 6p via combustion chamber 3 during a valve overlap period, occurring due to a temperature TEVC change, a pressure PEVC change, and/or a change in exhaust-gas gas constant REX.

Additionally, in the system of the embodiment, the EVC in-cylinder volumetric capacity calculation section geometrically determines EVC in-cylinder volumetric capacity exhaust valve closure timing EVC (see step S8). Therefore, EVC in-cylinder volumetric capacity VEVC can be more precisely calculated, thereby ensuring more precise estimation of internal EGR amount per cylinder MRES. Additionally, on internal combustion engines also employing a variable compression ratio mechanism (a variable piston stroke characteristic mechanism) enabling a compression ratio $\epsilon$ of the engine to be continuously varied, EVC in-cylinder volumetric capacity VEVC may be easily, accurately, and geometrically calculated based on a variation $\Delta\epsilon$ of compression ratio $\epsilon$ controlled by means of the variable compression ratio mechanism. Geometrically calculating and determining EVC in-cylinder volumetric capacity VEVC ensures more precise estimation of internal EGR amount per cylinder MRES, and also facilitates a more effective engineering design development for the internal EGR estimation system.

Additionally, in the system of the embodiment, the exhaust-gas gas constant calculation section (serving as an exhaust-gas gas constant calculation means) calculates exhaust-gas gas constant REX (see step S9) based on target combustion equivalent ratio TFBYA, in such a manner that exhaust-gas gas constant REX matches a change in a composition of exhaust gas (see the predetermined TFBYA-REX lookup table of FIG. 18). Therefore, even in case of a change in gas density, arising from a change in the exhaust-gas composition that depends on target combustion equivalent ratio TFBYA, that is, even in the presence of a remarkable increase or decrease in target combustion equivalent ratio TFBYA, for example, during a lean A/F mixture combustion mode, during after-start enrichment, after switching to the full throttle operating mode, it is possible to very precisely estimate internal EGR amount per cylinder MRES. Also, exhaust-gas gas constant REX can be easily calculated or estimated from a reaction formula for a composition of fuel and a composition of intake air (fresh air). Estimating or calculating exhaust-gas constant REX from the reaction formula for a composition of fuel and a composition of air facilitates a more effective engineering design development for the internal EGR estimation system.

In addition to the above, in the system of the embodiment, the temporary O/L period blow-back gas amount $MRESOL_{tmp}$ calculation section (see step S25) includes the EVC in-cylinder temperature calculation section (serving as an EVC in-cylinder temperature calculation means) that calculates EVC in-cylinder temperature TEVC (see step S10), the EVC in-cylinder pressure calculation section (serving as an EVC in-cylinder pressure calculation means) that calculates EVC in-cylinder pressure PEVC (see step S11), the exhaust-gas gas constant calculation section (serving as an exhaust-gas gas constant calculation means) that calculates exhaust-gas gas constant REX (see step S9) based on target combustion equivalent ratio TFBYA, the intake pressure calculation section (serving as an intake pressure calculation means) that calculates or estimates intake pressure PIN (detected by intake pressure sensor 10 in the shown embodiment), the gas ratio-of-specific-heat calculation section (serving as a gas ratio-of-specific-heat calculation means) that calculates exhaust-gas ratio-of-specific-heat SHEATR corresponding to a change in a composition of exhaust gas (see step S16) and calculates air-fuel mixture ratio-of-specific-heat MIXAIRSHR corresponding to a change in a composition of air-fuel mixture (see step S30), the O/L period integrated effective area calculation section (serving as an O/L period integrated effective area calculation means) that calculates O/L period integrated effective area ASUMOL based on the valve overlap (in the system of the embodiment, O/L period integrated effective area ASUMOL is based on the variation VTCOL of valve overlap O/L during the valve overlapping period (see step S14), in other words, O/L period integrated effective area ASUMOL is based on EVC variation VTEOFS and IVO variation VTIOFS (see FIG. 27)), the engine speed calculation section (serving as an engine speed calculation means) that calculates engine speed NRPM (see step S15), and the supercharging-and-choking phenomena determination section (serving as a supercharging-and-choking phenomena determination means) that determines the presence (TBCRG=1) or absence (TBCRG=0) of the supercharging phenomenon and additionally determines the presence (CHOKE=1) or absence (CHOKE=0) of the choking phenomenon regarding gas flow between intake and exhaust ports 5p and 6p via combustion chamber 3 during a valve overlap period, created by the pressure difference between the pressure in the intake port and the pressure in the exhaust port (see steps S17, S27, and S32). O/L period blow-back gas amount MRESOL (unit: kg) can be arithmetically calculated based on these calculated values TEVC, PEVC, REX, PIN, SHEATR, ASUMOL, and NRPM, and the supercharging-phenomenon decision result (TBCRG=0 or TBCRG=1) and the choking-phenomenon decision result (CHOKE=0 or CHOKE=1), from the physical expression (6). Therefore, it is possible to very precisely estimate O/L period blow-back gas amount MRESOL based on quantities of state of the valve overlap period, that is, EVC in-cylinder temperature TEVC, EVC in-cylinder pressure PEVC, exhaust-gas gas constant REX, exhaust-gas ratio-of-specific-heat SHEATR, engine speed NRPM, and O/L period integrated effective area ASUMOL, and the presence (TBCRG=1) or absence (TBCRG=0) of the supercharging phenomenon, and the presence. (CHOKE=1) or absence (CHOKE=0) of the choking phenomenon, from the physical expression (6). As a result, responsively to a change in each state quantity, that is, a gas-density change and a volumetric-flow-rate change in gas passing through the previously-discussed pseudo variable orifice defined by the intake and exhaust ports both opening, it is possible to more precisely calculate or estimate O/L period blow-back gas amount MRESOL through all engine operating conditions.

Additionally, in the system of the embodiment, the supercharging-and-choking phenomena determination section (serving as a supercharging-and-choking phenomena determination means) further includes the intake-pressure-to-exhaust-pressure ratio calculation section (serving as an intake-pressure-to-exhaust-pressure ratio calculation means) that calculates pressure ratio PINBYEX of intake pressure to exhaust pressure based on both the intake pressure PIN and EVC in-cylinder pressure PEVC, from the expression (7). When the supercharging phenomena determination section (serving as a supercharging phenomena determination means and relating to step S27) determines, based on the predetermined condition (PINBYEX$\leq$1), that the supercharging phenomenon is absent (TBCRG=0) during the valve overlap period, exhaust-gas ratio-of-specific-heat SHEATR retrieved from the predetermined TFBYA-SHEATR characteristic map of FIG. 21, is used to calculate or estimate temporary O/L period blow-back gas amount $MRESOL_{tmp}$ (O/L period blow-back gas amount MRESOL). Conversely when the supercharging phenomena determination section (serving as a supercharging phenomena determination means and relating to step S27) determines, based on the predetermined condition (PINBYEX>1), that the supercharging phenomenon is present (TBCRG=1) during the valve overlap period, exhaust-gas ratio-of-specific-heat SHEATR retrieved from the predetermined TFBYA-SHEATR characteristic map of FIG. 21, is replaced with air-fuel mixture ratio-of-specific-heat MIXAIRSHR retrieved from the predetermined TFBYA-MIXAIRSHR characteristic map of FIG. 22. In this manner, the ratio of specific heat can be suitably set depending on a composition of gas flowing between the intake and exhaust ports via the combustion chamber during the valve overlap period. Therefore, even in the presence of the supercharging phenomenon, for example in the supercharged state on turbocharged engines or supercharged engines or during inertia supercharging at full-throttle operation, it is possible to very precisely estimate O/L period blow-back gas amount MRESOL. Additionally, even in the presence (CHOKE=1) of the choking phenomenon, for example during engine idling, it is possible to very precisely estimate O/L period blow-back gas amount MRESOL.

Additionally, the system of the embodiment includes the valve-overlap variation calculation section (serving as a valve-overlap variation calculation means) that calculates the variation VTCOL of valve overlap O/L based on (i) the variation VTIOFS of intake valve open timing IVO and (ii) the variation VTEOFS of exhaust valve closure timing EVC (see step S13), and the O/L period integrated effective area calculation section (serving as an O/L period integrated effective area calculation means) that calculates O/L period integrated effective area ASUMOL based on the valve-overlap variation VTCOL (see step S14 and FIGS. 19 and 20). Therefore, O/L period integrated effective area ASUMOL can be easily accurately estimated based on the valve overlap that is determined based on the valve-overlap variation VTCOL and can also be regarded as a pseudo variable orifice (a variable flow-constriction orifice) that serves to variably constrict the gas flow between intake and exhaust ports 5p and 6p via combustion chamber 3. As discussed previously, by way of the aforementioned select-LOW process and the integral of an effective opening area per unit crank angle (or unit time) from a time point (IVO) corresponding to the beginning-of-valve-overlap crank angle to a time point (EVC) corresponding to the end-of-valve-overlap crank angle, O/L period integrated effective area ASUMOL can be arithmetically calculated. In this case, O/L period integrated effective area ASUMOL can be regarded as an orifice size of the pseudo variable orifice. Thus, it is possible to simply calculate or estimate the flow rate of gas passing through the pseudo variable orifice, defined between the intake and exhaust ports. In lieu thereof, when O/L period integrated effective area ASUMOL is more simply map-retrieved based on the valve-overlap variation VTCOL from the predetermined VTCOL-ASUMOL characteristic map as shown in FIG. 19. Such map-retrieval for O/L period integrated effective area ASUMOL (see FIG. 19) is superior to arithmetic calculation containing the select-LOW process and the integral of an effective opening area per unit crank angle (or unit time) from IVO to EVC, from the viewpoint of the reduced load on the computer.

Furthermore, the internal EGR amount estimation system of the shown embodiment includes a variable intake-valve timing mechanism, which is comprised of an electromagnetic intake-valve solenoid 22 enabling at least an intake valve open timing IVO of intake valve 5 to be varied, and a variable exhaust-valve timing mechanism, which is comprised of an electromagnetic exhaust-valve solenoid 23 enabling at least an exhaust valve closure timing EVC of exhaust valve 6 to be varied, and a valve timing calculation section (serving as a valve timing calculation means) that estimates or calculates at least (i) an intake valve open timing IVO based on an IVO variation VTIOFS adjusted by the variable intake-valve timing mechanism and affected by the valve temperature change and the cam and shim wear and (ii) an exhaust valve closure timing EVC based on an EVC variation VTEOFS adjusted by the variable exhaust-valve timing mechanism and affected by the valve temperature change and the cam and shim wear. The valve timing calculation section includes a valve clearance estimation section (serving as a valve clearance estimation means) that estimates a valve clearance VCLE (VCLI), taking into account a variation of valve clearance, occurring owing to thermal expansion of the engine valve and motion-transmitting valve-train component parts wear (see step S48 of FIG. 30 and step S74 of FIG. 35), and a valve timing compensation section (serving as a valve timing compensation means) that compensates for exhaust valve closure timing EVC based on exhaust valve clearance VCLE estimated and compensates for intake valve open timing IVO based on intake valve clearance VCLI estimated (see steps S49 and S50 of FIG. 30 and steps S75 and S76 of FIG. 35). Therefore, valve timings EVC and IVO are properly compensated for based on the respective valve clearances VCLE and VCLI estimated, thus reducing the error of estimation of the valve overlap, that is, the error of estimation of internal EGR amount MRES to a minimum and enhancing the accuracy of estimation of internal EGR amount MRES. By virtue of more precisely estimated internal EGR amount MRES, it is possible to more suitably set the ignition timing, the fuel injection amount, and the like, thereby enhancing the vehicle drivability, improving fuel economy, and reducing exhaust emissions.

Additionally, in the system of the embodiment, the valve clearance estimation section (see step S48 of FIG. 30 and step S74 of FIG. 35) includes the valve temperature calculation section (serving as a valve temperature calculation means) that calculates or estimates exhaust valve temperature VTMPE and intake valve temperature VTMPI (see step S52 of FIG. 31) so as to estimate exhaust valve clearance VCLE and intake valve clearance VCLI based on the respective valve temperatures VTMPE and VTMPI (see steps S53–S56). In this manner, intake and exhaust valve clearances VCLI and VCLE can be estimated based on the respective valve temperatures VTMPI and VTMPE each acting as a principal factor that has a great influence on variations in valve clearance. Therefore, even when the engine operating condition is changing from starting with a cold engine to high load operation, and thus there is a remarkable valve-temperature change for each of intake and exhaust valves 5 and 6, it is possible to accurately estimate intake and exhaust valve clearances VCLI and VCLE, and consequently to reduce the error of estimation of internal EGR amount MRES, which error may arise from the valve-clearance change occurring owing to the valve-temperature change, to a minimum.

According to the system of the embodiment, the valve temperature calculation section (see step S52) includes an engine load calculation section (serving as an engine load calculation means) that estimates or calculates the engine load (correlated to the fuel injection amount) based on the intake-air quantity per cylinder (the fresh-air quantity per cylinder) MACYL computed based on the intake-air quantity measured by airflow meter 9. That is, exhaust valve temperature VTMPE and intake valve temperature VTMPI can be estimated or calculated depending on the engine load, i.e., the fuel injection amount (see the lookup tables of FIGS. 37A and 37B). This eliminates the necessity of temperature sensors that directly sense the respective valve temperatures VTMPE and VTMPI, thereby reducing manufacturing costs.

In the shown embodiment, (i) an exhaust valve clearance estimation section (see step S48 of FIG. 30) plus exhaust valve timing compensation section, exactly, EVC compensation section (see steps S49 and S50 of FIG. 30) for the exhaust valve side, and (ii) an intake valve clearance estimation section (see step S74 of FIG. 35) plus intake valve timing compensation section, exactly, IVO compensation section (see steps S75 and S76 of FIG. 35) for the intake valve side, are provided independently of each other. As is well known, exhaust valve clearance VCLE tends to differ from intake valve clearance VCLI owing to various factors, such as an intake valve temperature range different from an exhaust valve temperature range, a material forming intake valve 5 different from a material forming exhaust valve 6, a shape of intake valve 5 different from a shape of exhaust valve 6, and the like. Even in such a case that intake and exhaust valve clearances VCLI and VCLE differ from each other, IVO variation VTIOFS and EVC variation VTEOFS can be accurately calculated or estimated independently of each other. This insures very precise estimation of internal EGR amount MRES. Also, even in case of an intake cam-profile design peculiar to an intake valve operating system and an exhaust cam-profile design thus different from the intake cam-profile design, by way of the individual valve timing variation calculation routines of FIGS. 30 and 35, EVC variation VTEOFS and IVO variation VTIOFS can be accurately calculated independently of each other, taking into account exhaust-valve-temperature dependent EVC variation correction value VTCLE and intake-valve-temperature dependent IVO variation correction value VTCLI. This insures very precise estimation of EVC and IVO, and consequently insures very precise estimation of internal EGR amount MRES.

Moreover, in the system of the embodiment, the valve timing compensation section (see steps S49 and S50 of FIG. 30 and steps S75 and S76 of FIG. 35) includes a valve-timing real value calculation section (serving as a valve timing real value calculation means) that calculates or detects EVC real value VCLTRE and IVO real value VCLTRI based on at least the frequency of oscillatory seating motion of each of exhaust valve 6 and intake valve 5 (see step S59) under a predetermined condition (see steps S64–S67) that the engine is conditioned in the valve timing detectable engine operating state suited to precisely detect or extract EVC real value VCLTRE and IVO real value VCLTRI, a valve-timing estimate calculation section or a valve timing estimation section (serving as a valve timing estimation means) that calculates, under the predetermined condition (see steps S64–S67), EVC estimate VCLTEE and IVO estimate VCLTEI of the exhaust valve closure timing and the intake valve open timing already compensated for based on exhaust and intake valve clearances VCLE and VCLI both temperature-compensated for in full consideration of changes in exhaust and intake valve temperatures VTMPE and VTMPI (see step S60 of FIG. 32), a valve timing error calculation section (serving as a valve timing error calculation means) that calculates a difference between the valve-timing real value and the valve-timing estimate (exactly, an exhaust valve timing error (VTHOSE$_{tmp}$=VCLTRE−VCLTEE) between EVC real value VCLTRE and EVC estimate VCLTEE and an intake valve timing error (VTHOSI$_{tmp}$=VCLTRI−VCLTEI) between IVO real value VCLTRI and IVO estimate VCLTEI) (see step S61 of FIG. 32), and a wear dependent valve-timing-correction learned value calculation section (serving as a wear-dependent valve-timing-correction learned value calculation means) that calculates EVC-correction learned value VTHOSE based on exhaust valve timing error (VTHOSE$_{tmp}$=VCLTRE−VCLTEE) and calculates IVO-correction learned value VTHOSI based on intake valve timing error (VTHOSI$_{tmp}$=VCLTRI−VCLTEI) (see step S63 of FIG. 32). Exhaust valve closure timing EVC and intake valve open timing IVO, exactly, EVC variation VTEOFS and IVO variation VTIOFS can be more accurately compensated for, taking into account EVC-correction learned value VTHOSE and IVO-correction learned value VTHOSI, in addition to exhaust-valve-temperature dependent EVC variation correction value VTCLE and intake-valve-temperature dependent IVO variation correction value VTCLI. As discussed above, according to the system of the embodiment, it is possible to more precisely detect EVC real value VCLTRE and IVO real value VCLTRI in the predetermined engine operating range wherein the frequency of oscillatory seating motion of each of exhaust valve 6 and intake valve 5 can be more accurately detected, for example, in a low engine speed range that valve seating noise can be accurately detected, in a low engine load range that there is less possibility of knocking, or in a less valve-timing-error operating range that a basic valve-timing variation (basic EVC variation VTCNOWE and basic IVO variation VTCNOW) is "0" and the engine has already been warmed up. The previously-noted valve timing errors, namely exhaust valve timing error (VTHOSE$_{tmp}$=VCLTRE−VCLTEE) and intake valve timing error (VTHOSI$_{tmp}$=VCLTRI−VCLTEI) are caused by valve-train component-parts wear. Such valve timing errors (VTHOSE$_{tmp}$=VCLTRE−VCLTEE) and (VTHOSI$_{tmp}$=VCLTRI−VCLTEI), caused by such wear, constantly and continually exert an influence on the respective valve timings, that is, EVC and IVO, through all engine operating conditions. According to the system of the embodiment, it is possible to compensate for the valve timings, namely EVC and IVO, in advance by the wear-dependent valve timing errors (VTHOSE$_{tmp}$=VCLTRE−VCLTEE) and (VTHOSI$_{tmp}$=VCLTRI−VCLTEI), arising from valve-train component-parts deteriorated with age.

Additionally, in the system of the embodiment, the frequency of oscillatory seating motion of each of intake and exhaust valves 5 and 6 is detected based on a signal from knock sensor 25. Thus, it is possible to detect the frequency of oscillatory seating motion of each engine valve based on input information from the existing knock sensor usually installed on an internal combustion engine. This reduces manufacturing costs of internal EGR amount estimation systems of internal combustion engines.

In the shown embodiment, the variable intake-valve timing mechanism enabling intake valve open timing IVO to be varied and the variable exhaust-valve timing mechanism enabling exhaust valve closure timing EVC to be varied are both provided. The fundamental concept of the internal EGR amount estimation system of the embodiment is not limited to an internal combustion engine having both of the variable intake-valve timing mechanism and the variable exhaust-valve timing mechanism. Actually, it is possible to change a valve overlap, and thus to change internal EGR amount MRES, by varying at least one of valve lift characteristics of intake and exhaust valves 5 and 6 (exactly, intake valve open timing IVO and exhaust valve closure timing EVC). As appreciated from the above, the system of the embodiment may be applied to an internal combustion engine having at least one of the variable intake-valve timing mechanism and the variable exhaust-valve timing mechanism.

The entire contents of Japanese Patent Application Nos. 2002-272670 (filed Sep. 19, 2002) and 2003-016828 (filed Jan. 27, 2003) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An internal exhaust gas recirculation amount estimation system of an internal combustion engine comprising:

an exhaust valve closure timing in-cylinder temperature calculation section that calculates an in-cylinder temperature at an exhaust valve closure timing;

an exhaust valve closure timing in-cylinder pressure calculation section that calculates an in-cylinder pressure at the exhaust valve closure timing;

a gas constant calculation section that calculates a gas constant corresponding to a change in a composition of exhaust gas, based on an air-fuel mixture ratio;

an exhaust valve closure timing in-cylinder residual gas amount calculation section that calculates an in-cylinder residual gas amount at the exhaust valve closure timing, based on at least the in-cylinder temperature, the in-cylinder pressure, and the gas constant;

an valve overlap period blow-back gas amount calculation section that calculates a valve overlap period blow-back gas amount defined as a quantity of gas flow from one of intake and exhaust ports via a combustion chamber to the other port during a valve overlap period during which both of intake and exhaust valves are open together, the gas flow being created by a pressure difference between the intake and exhaust ports; and an internal EGR amount calculation section that calculates an internal exhaust gas recirculation amount based on the exhaust valve closure timing in-cylinder residual gas amount and the valve overlap period blow-back gas amount.

2. The internal exhaust gas recirculation amount estimation system as claimed in claim 1, wherein:

the internal exhaust gas recirculation amount is arithmetically calculated by adding the valve overlap period blow-back gas amount to the exhaust valve closure timing in-cylinder residual gas amount, from a predetermined physical expression MRES=MRESCYL+MRESOL, where MRES denotes the internal exhaust gas recirculation amount, MRESOL denotes the valve overlap period blow-back gas amount, and MRESCYL denotes the exhaust valve closure timing in-cylinder residual gas amount.

3. The internal exhaust gas recirculation amount estimation system as claimed in claim 2, wherein:

a value of the valve overlap period blow-back gas amount (MRESOL) is defined as a positive value when a gas flows from the exhaust port toward the combustion chamber and then blows from the combustion chamber back to the intake port during the valve overlap period, and the value of the valve overlap period blow-back gas amount is defined as a negative value when a gas flows from the intake port toward the combustion chamber and then blows from the combustion chamber through the exhaust port during the valve overlap period.

4. The internal exhaust gas recirculation amount estimation system as claimed in claim 1, wherein:

the exhaust valve closure timing in-cylinder residual gas amount calculation section comprises:

(a) an exhaust valve closure timing in-cylinder volumetric capacity calculation section that calculates an in-cylinder volumetric capacity at the exhaust valve closure timing;

(b) the exhaust valve closure timing in-cylinder temperature calculation section that calculates the in-cylinder temperature at the exhaust valve closure timing;

(c) the exhaust valve closure timing in-cylinder pressure calculation section that calculates the in-cylinder pressure at the exhaust valve closure timing; and (d) the gas constant calculation section that calculates the gas constant corresponding to the change in the composition of exhaust gas, based on the air-fuel mixture ratio;

the exhaust valve closure timing in-cylinder residual gas amount calculation section calculates the exhaust valve closure timing in-cylinder residual gas amount, based on the in-cylinder volumetric capacity, the in-cylinder temperature, the in-cylinder pressure, and the gas constant.

5. The internal exhaust gas recirculation amount estimation system as claimed in claim 4, wherein:

the exhaust valve closure timing in-cylinder residual gas amount is arithmetically calculated based on the in-cylinder volumetric capacity, the in-cylinder temperature, the in-cylinder pressure, and the gas constant, from a predetermined physical expression MRESCYL=(PEVC×VEVC)/(REX×TEVC), where PEVC denotes the in-cylinder pressure, VEVC denotes the in-cylinder volumetric capacity, REX denotes the gas constant, and TEVC denotes the in-cylinder temperature.

6. The internal exhaust gas recirculation amount estimation system as claimed in claim 4, wherein:

the exhaust valve closure timing in-cylinder volumetric capacity calculation section geometrically determines the in-cylinder volumetric capacity based on a position of a reciprocating piston at the exhaust valve closure timing.

7. The internal exhaust gas recirculation amount estimation system as claimed in claim 4, wherein:

in the internal combustion engine employing both a variable valve timing mechanism that variably adjusts at least the exhaust valve closure timing and a variable compression ratio mechanism that variably adjusts a compression ratio by changing at least one of a top dead center and a bottom dead center of a piston stroke characteristic of a reciprocating piston, the exhaust valve closure timing in-cylinder volumetric capacity calculation section calculates the in-cylinder volumetric capacity based on a variation of the exhaust valve closure timing and the variation of the compression ratio.

8. The internal exhaust gas recirculation amount estimation system as claimed in claim 1, wherein:

the gas constant calculation section calculates the gas constant corresponding to the change in the composition of exhaust gas, based on a target combustion equivalent ratio.

9. The internal exhaust gas recirculation amount estimation system as claimed in claim 1, wherein:
the valve overlap period blow-back gas amount calculation section comprises:
(a) the exhaust valve closure timing in-cylinder temperature calculation section that calculates the in-cylinder temperature at the exhaust valve closure timing;
(b) the exhaust valve closure timing in-cylinder pressure calculation section that calculates the in-cylinder pressure at the exhaust valve closure timing;
(c) the gas constant calculation section that calculates the gas constant corresponding to the change in the composition of exhaust gas, based on the air-fuel mixture ratio;
(d) an intake pressure calculation section that calculates an intake pressure;
(e) a gas ratio-of-specific-heat calculation section that calculates a ratio of specific heat of gas, corresponding to the change in the composition of gas flowing between the intake and exhaust ports via the combustion chamber during the valve overlap period;
(f) a valve overlap period integrated effective area calculation section that calculates a valve overlap period integrated effective area for an opening area of the intake valve and an opening area of the exhaust valve during the valve overlap period;
(g) an engine speed calculation section that calculates an engine speed; and
(h) a supercharging-and-choking phenomena determination section that determines the presence or absence of a supercharging phenomenon regarding the gas flow between the intake and exhaust ports via the combustion chamber during the valve overlap period, the gas flow being created by the pressure difference between the intake and exhaust ports, and the presence or absence of a choking phenomenon regarding the gas flow between the intake and exhaust ports via the combustion chamber during the valve overlap period;
the valve overlap period blow-back gas amount calculation section calculates the valve overlap period blow-back gas amount, based on the in-cylinder temperature, the in-cylinder pressure, the gas constant, the intake pressure, the ratio of specific heat, the valve overlap period integrated effective area, and the engine speed, and a decision result of the supercharging-and-choking phenomena determination section.

10. The internal exhaust gas recirculation amount estimation system as claimed in claim 9, wherein:
the valve overlap period blow-back gas amount is calculated based on the engine speed, the valve overlap period integrated effective area, and a temporary valve overlap period blow-back gas amount determined based on the supercharging-and-choking phenomena decision result, from a predetermined expression:

$$MRESOL=(MRESOL_{tmp} \times ASUMOL \times 60)/(NRPM \times 360)$$

where $MRESOL_{tmp}$ denotes the temporary valve overlap period blow-back gas amount, ASUMOL denotes the valve overlap period integrated effective area, and NRPM denotes the engine speed.

11. The internal exhaust gas recirculation amount estimation system as claimed in claim 10, wherein:

the supercharging-and-choking phenomena determination section comprises an intake-pressure-to-exhaust-pressure ratio calculation section that calculates a pressure ratio of intake pressure to exhaust pressure, based on the intake pressure and the in-cylinder pressure from a predetermined expression PINBYEX=PIN/PEVC, where PINBYEX denotes the pressure ratio, PIN denotes the intake pressure, and PEVC denotes the in-cylinder pressure;
the supercharging-and-choking phenomena determination section determines that the supercharging phenomenon is present when the pressure ratio is greater than a predetermined threshold value, and determines that the supercharging phenomenon is absent when the pressure ratio is less than or equal to the predetermined threshold value;
the valve overlap period blow-back gas amount calculation section calculates the valve overlap period blow-back gas amount by using the ratio of specific heat of exhaust gas, corresponding to the change in the composition of exhaust gas, when the supercharging phenomenon is absent; and
the valve overlap period blow-back gas amount calculation section calculates the valve overlap period blow-back gas amount by using the ratio of specific heat of air-fuel mixture, corresponding to the change in the composition of air-fuel mixture, when the supercharging phenomenon is present.

12. The internal exhaust gas recirculation amount estimation system as claimed in claim 9, wherein:
the valve overlap period integrated effective area calculation section calculates a valve overlap based on an intake valve open timing and the exhaust valve closure timing, and calculates the valve overlap period integrated effective area based on the valve overlap.

13. The internal exhaust gas recirculation amount estimation system as claimed in claim 9, wherein:
the valve overlap period integrated effective area calculation section sets a smaller one of the opening area of the intake valve and the opening area of exhaust valve as an effective valve opening area, and calculates the valve overlap period integrated effective area as an integrated value of the smaller opening area per unit time from a point of time corresponding to a beginning-of-valve-overlap crank angle to a point of time corresponding to an end-of-valve-overlap crank angle.

14. The internal exhaust gas recirculation amount estimation system as claimed in claim 1, further comprising:
a variable valve timing mechanism enabling at least one of an intake valve open timing and the exhaust valve closure timing to be varied; and
a valve timing calculation section that estimates the valve timing based on a valve-timing variation adjusted by the variable valve timing mechanism and affected by a valve temperature change and a motion-transmitting valve-train component parts wear;
the valve timing calculation section comprising:
(a) a valve clearance estimation section that estimates a valve clearance; and
(b) a valve timing compensation section that compensates for the valve timing based on the valve clearance estimated.

15. The internal exhaust gas recirculation amount estimation system as claimed in claim 14, wherein:
the valve clearance estimation section comprises a valve temperature calculation section that calculates a valve temperature; and the valve clearance estimation section estimates the valve clearance based on the valve temperature.

16. The internal exhaust gas recirculation amount estimation system as claimed in claim 15, wherein:
    the valve temperature calculation section comprises an engine load calculation section that calculates an engine load; and
    the valve clearance estimation section estimates the valve clearance based on the engine load.

17. The internal exhaust gas recirculation amount estimation system as claimed in claim 14, wherein:
    the valve timing calculation section comprising:
    (a) an exhaust valve clearance estimation section that estimates an exhaust valve clearance;
    (b) an exhaust valve closure timing compensation section that compensates for the exhaust valve closure timing based on the exhaust valve clearance estimated;
    (c) an intake valve clearance estimation section that estimates an intake valve clearance; and
    (d) an intake valve open timing compensation section that compensates for the intake valve open timing based on the intake valve clearance estimated.

18. The internal exhaust gas recirculation amount estimation system as claimed in claim 14, wherein:
    the valve timing compensation section comprises:
    (a) a valve-timing real value calculation section that calculates a valve-timing real value based on a frequency of oscillatory seating motion of each of the intake and exhaust valves under a predetermined condition that the engine is conditioned in a valve timing detectable engine operating state suited to detect the valve-timing real value;
    (b) a valve-timing estimate calculation section that calculates, under the predetermined condition, a valve-timing estimate of the valve timing compensated for based on the valve clearance estimated and temperature-compensated for based on a change in a valve temperature;
    (c) a valve timing error calculation section that calculates a valve timing error between the valve-timing real value and the valve-timing estimate; and
    (d) a wear dependent valve-timing-correction learned value calculation section that calculates a valve-timing-correction learned value based on the valve timing error; and
    wherein the valve timing is further compensated for based on the valve-timing-correction learned value.

19. The internal exhaust gas recirculation amount estimation system as claimed in claim 18, further comprising:
    a knock sensor that detects the frequency of oscillatory seating motion of each of the intake and exhaust valves.

20. The internal exhaust gas recirculation amount estimation system as claimed in claim 11, wherein:
    the supercharging-and-choking phenomena determination section comprises a choking-phenomenon decision threshold value calculation section that calculates a minimum choking-phenomenon decision threshold value SLCHOKEL and a maximum choking-phenomenon decision threshold value SLCHOKEH based on the ratio of specific heat of gas, from predetermined expressions:

$$SLCHOKEL = \{2/(SHEATR+1)\}^{\{SHEATR/(SHEATR-1)\}}$$

$$SLCHOKEH = \{2/(SHEATR+1)\}^{\{-SHEATR/(SHEATR-1)\}}$$

where SHEATR denotes the ratio of specific heat of exhaust gas, corresponding to the change in the composition of exhaust gas, obtained when the supercharging phenomenon is absent, and the ratio of specific heat of exhaust gas is replaced with the ratio of specific heat of air-fuel mixture, obtained when the supercharging phenomenon is present;

the supercharging-and-choking phenomena determination section determines that the choking phenomenon is present when either of a condition that the pressure ratio is less than the minimum choking-phenomenon decision threshold value SLCHOKEL and a condition that the pressure ratio is greater than the maximum choking-phenomenon decision threshold value SLCHOKEH is satisfied, and determines that the choking phenomenon is absent when the pressure ratio is greater than or equal to the minimum choking-phenomenon decision threshold value SLCHOKEL and the pressure ratio is less than or equal to the maximum choking-phenomenon decision threshold value SLCHOKEH; and the valve overlap period blow-back gas amount calculation section comprises an unsupercharged and unchoked state, valve overlap period blow-back gas amount calculation section that calculates an unsupercharged and unchoked state, temporary valve overlap period blow-back gas amount from a predetermined expression:

$$MRESOL_{tmp} = \sqrt{2} \times PEVC \times MRSOLD \times MRSOLP$$

where PEVC denotes the in-cylinder pressure, MRSOLD denotes a density term and MRSOLP denotes a pressure difference term, and the density term MRSOLD and the pressure difference term MRSOLP are represented by predetermined expressions:

$$MRSOLD = SQRT\{1/(REX \times TEVC)\}$$

$$MRSOLP = SQRT[SHEATR/(SHEATR-1) \times$$
$$\{PINBYEX^{(2/SHEATR)} - PINBYEX^{((SHEATR+1)/SHEATR)}\}]$$

where REX denotes the gas constant, TEVC denotes the in-cylinder temperature, SQRT denotes a coefficient for the gas constant REX and the in-cylinder temperature TEVC, SHEATR denotes the ratio of specific heat, and PINBYEX denotes the pressure ratio.

21. The internal exhaust gas recirculation amount estimation system as claimed in claim 20, wherein:
    the valve overlap period blow-back gas amount calculation section comprises an unsupercharged and choked state, valve overlap period blow-back gas amount calculation section that calculates an unsupercharged and choked state, temporary valve overlap period blow-back gas amount from a predetermined expression:

$$MRESOL_{tmp} = PEVC \times MRSOLD \times MRSOLPC$$

where PEVC denotes the in-cylinder pressure, MRSOLD denotes the density term and MRSOLPC denotes a pressure difference term, and the density term MRSOLD and the pressure difference term MRSOLPC are represented by predetermined expressions:

$$MRSOLD = SQRT\{1/(REX \times TEVC)\}$$

$$MRSOLPC = SQRT[SHEATR \times \{2/(SHEATR+1)\}^{\{(SHEATR+1)/(SHEATR-1)\}}]$$

where REX denotes the gas constant, TEVC denotes the in-cylinder temperature, SQRT denotes the coefficient for the gas constant REX and the in-cylinder temperature TEVC, and SHEATR denotes the ratio of specific heat.

22. The internal exhaust gas recirculation amount estimation system as claimed in claim 21, wherein:

the valve overlap period blow-back gas amount calculation section comprises a supercharged and unchoked state, valve overlap period blow-back gas amount calculation section that calculates a supercharged and unchoked state, temporary valve overlap period blow-back gas amount from a predetermined expression:

$$MRESOL_{tmp} = -\sqrt{2} \times \sqrt{\frac{1}{RIN \times TIN}} \times PIN \times MRSOLPT$$

where PIN denotes the intake pressure, RIN denotes a gas constant of intake air, TIN denotes a Kelvin absolute temperature of the intake air, and MRSOLPT denotes a pressure difference term represented by a predetermined expression:

$$MRSOLPT = SQRT[SHEATR/(SHEATR - 1) \times \{PINBYEX^{(-2/SHEATR)} - PINBYEX^{(-(SHEATR+1)/SHEATR)}\}]$$

where SQRT denotes the coefficient, SHEATR denotes the ratio of specific heat, and PINBYEX denotes the pressure ratio.

23. The internal exhaust gas recirculation amount estimation system as claimed in claim 22, wherein:

the valve overlap period blow-back gas amount calculation section comprises a supercharged and choked state, valve overlap period blow-back gas amount calculation section that calculates a supercharged and choked state, temporary valve overlap period blow-back gas amount from a predetermined expression:

$$MRESOL_{tmp} = -\sqrt{\frac{1}{RIN \times TIN}} \times PIN \times MRSOLPC$$

where PIN denotes the intake pressure, RIN denotes the gas constant of the intake air, TIN denotes the Kelvin absolute temperature of the intake air, and MRSOLPC denotes a pressure difference term represented by the predetermined expression:

$$MRSOLPC = SQRT[SHEATR \times \{2/(SHEATR+1)\}^{\{(SHEATR+1)/(SHEATR-1)\}}]$$

where SQRT denotes the coefficient and SHEATR denotes the ratio of specific heat.

24. An internal exhaust gas recirculation amount estimation system of an internal combustion engine comprising:

exhaust valve closure timing in-cylinder temperature calculation means for calculating an in-cylinder temperature at an exhaust valve closure timing;

exhaust valve closure timing in-cylinder pressure calculation means for calculating an in-cylinder pressure at the exhaust valve closure timing;

gas constant calculation means for calculating a gas constant corresponding to a change in a composition of exhaust gas, based on an air-fuel mixture ratio;

exhaust valve closure timing in-cylinder residual gas amount calculation means for calculating an in-cylinder residual gas amount at the exhaust valve closure timing, based on at least the in-cylinder temperature, the in-cylinder pressure, and the gas constant;

valve overlap period blow-back gas amount calculation means for calculating a valve overlap period blow-back gas amount defined as a quantity of gas flow from one of intake and exhaust ports via a combustion chamber to the other port during a valve overlap period during which both of intake and exhaust valves are open together, the gas flow being created by a pressure difference between the intake and exhaust ports; and internal EGR amount calculation means for calculating an internal exhaust gas recirculation amount based on the exhaust valve closure timing in-cylinder residual gas amount and the valve overlap period blow-back gas amount.

25. A method of estimating an internal exhaust gas recirculation amount of an internal combustion engine enabling the internal exhaust gas recirculation amount to be varied by changing a valve overlap, the method comprising:

calculating an in-cylinder temperature at an exhaust valve closure timing based on an exhaust temperature;

calculating an in-cylinder pressure at the exhaust valve closure timing based on an exhaust pressure;

calculating a gas constant corresponding to a change in a composition of exhaust gas, based on an air-fuel mixture ratio;

calculating an in-cylinder residual gas amount at the exhaust valve closure timing, based on at least the in-cylinder temperature, the in-cylinder pressure, and the gas constant;

detecting an engine speed;

calculating a valve overlap period integrated effective area for an opening area of the intake valve and an opening area of the exhaust valve during the valve overlap period;

determining the presence or absence of a supercharging phenomenon regarding the gas flow between the intake and exhaust ports via the combustion chamber during the valve overlap period, the gas flow being created by the pressure difference between the intake and exhaust ports, and the presence or absence of a choking phenomenon regarding the gas flow between the intake and exhaust ports via the combustion chamber during the valve overlap period;

calculating a valve overlap period blow-back gas amount, which is defined as a quantity of gas flow from one of intake and exhaust ports via a combustion chamber to the other port during a valve overlap period during which both of intake and exhaust valves are open together, and is based on the engine speed, the valve overlap period integrated effective area, and the supercharging-and-choking phenomena decision result regarding the presence or absence of the supercharging phenomenon, and the presence or absence of the choking phenomenon; and calculating the internal exhaust gas recirculation amount by adding the valve overlap period blow-back gas amount to the exhaust valve closure timing in-cylinder residual gas amount.

26. The method as claimed in claim 25, wherein:
the valve overlap period integrated effective area is calculated based on the valve overlap.

27. The method as claimed in claim 25, wherein:
the valve overlap period integrated effective area is calculated by integrating an effective opening area per unit time from a point of time corresponding to a beginning-of-valve-overlap crank angle to a point of time corresponding to an end-of-valve-overlap crank angle, the effective opening area being set to a smaller one of the opening area of the intake valve and the opening area of exhaust valve.

28. The method as claimed in claim 25, wherein:
the valve overlap period blow-back gas amount is calculated based on the engine speed, the valve overlap period integrated effective area, and a temporary valve overlap period blow-back gas amount determined based on the supercharging-and-choking phenomena decision result, from a predetermined expression:

$$MRESOL=(MRESOL_{tmp} \times ASUMOL \times 60)/(NRPM \times 360)$$

where $MRESOL_{tmp}$ denotes the temporary valve overlap period blow-back gas amount, ASUMOL denotes the valve overlap period integrated effective area, and NRPM denotes the engine speed.

29. The method as claimed in claim 28, wherein:
an unsupercharged and unchoked state, temporary valve overlap period blow-back gas amount is calculated from a predetermined expression:

$$MRESOL_{tmp} = \sqrt{2} \times PEVC \times MRSOLD \times MRSOLP$$

where PEVC denotes the in-cylinder pressure, MRSOLD denotes a density term and MRSOLP denotes a pressure difference term, and the density term MRSOLD and the pressure difference term MRSOLP are represented by predetermined expressions:

$$MRSOLD = SQRT\{1/(REX \times TEVC)\}$$

$$MRSOLP = SQRT[SHEATR/(SHEATR-1) \times \{PINBYEX^{(2/SHEATR)} - PINBYEX^{((SHEATR+1)/SHEATR)}\}]$$

where REX denotes the gas constant, TEVC denotes the in-cylinder temperature, SQRT denotes a coefficient for the gas constant REX and the in-cylinder temperature TEVC, SHEATR denotes a ratio of specific heat of exhaust gas, corresponding to a change in a composition of exhaust gas, obtained when the supercharging phenomenon is absent, and the ratio of specific heat of exhaust gas is replaced with a ratio of specific heat of air-fuel mixture, obtained when the supercharging phenomenon is present, and PINBYEX denotes a pressure ratio of intake pressure to exhaust pressure.

30. The method as claimed in claim 29, wherein:
an unsupercharged and choked state, temporary valve overlap period blow-back gas amount is calculated from a predetermined expression:

$$MRESOL_{tmp} = PEVC \times MRSOLD \times MRSOLPC$$

where PEVC denotes the in-cylinder pressure, MRSOLD denotes the density term and MRSOLPC denotes a pressure difference term, and the density term MRSOLD and the pressure difference term MRSOLPC are represented by predetermined expressions:

$$MRSOLD=SQRT\{1/(REX \times TEVC)\}$$

$$MRSOLPC=SQRT[SHEATR \times \{2/(SHEATR+1)\}^{\{(SHEATR+1)/(SHEATR-1)\}}]$$

where REX denotes the gas constant, TEVC denotes the in-cylinder temperature, SQRT denotes the coefficient for the gas constant REX and the in-cylinder temperature TEVC, and SHEATR denotes the ratio of specific heat.

31. The method as claimed in claim 30, wherein:
a supercharged and unchoked state, temporary valve overlap period blow-back gas amount is calculated from a predetermined expression:

$$MRESOL_{tmp} = -\sqrt{2} \times \sqrt{\frac{1}{RIN \times TIN}} \times PIN \times MRSOLPT$$

where PIN denotes the intake pressure, RIN denotes a gas constant of intake air, TIN denotes a Kelvin absolute temperature of the intake air, and MRSOLPT denotes a pressure difference term represented by a predetermined expression:

$$MRSOLPT = SQRT[SHEATR/(SHEATR-1) \times \{PINBYEX^{(-2/SHEATR)} - PINBYEX^{(-(SHEATR+1)/SHEATR)}\}]$$

where SQRT denotes the coefficient, SHEATR denotes the ratio of specific heat, and PINBYEX denotes the pressure ratio.

32. The method as claimed in claim 30, wherein:
a supercharged and choked state, temporary valve overlap period blow-back gas amount is calculated from a predetermined expression:

$$MRESOL_{tmp} = -\sqrt{\frac{1}{RIN \times TIN}} \times PIN \times MRSOLPC$$

where PIN denotes the intake pressure, RIN denotes the gas constant of the intake air, TIN denotes the Kelvin absolute temperature of the intake air, and MRSOLPC denotes a pressure difference term represented by the predetermined expression:

$$MRSOLPC=SQRT[SHEATR \times \{2/(SHEATR+1)\}^{\{(SHEATR+1)/(SHEATR-1)\}}]$$

where SQRT denotes the coefficient and SHEATR denotes the ratio of specific heat.

* * * * *